(12) United States Patent
Park et al.

(10) Patent No.: US 10,256,933 B2
(45) Date of Patent: Apr. 9, 2019

(54) METHOD AND DEVICE FOR TRANSMITTING PREAMBLE SEQUENCE

(71) Applicant: SAMSUNG ELECTRONICS CO., LTD., Suwon-si (KR)

(72) Inventors: Chang Soon Park, Suwon-si (KR); Young Jun Hong, Suwon-si (KR); Jinesh P Nair, Bangalore (IN); Joon Seong Kang, Suwon-si (KR); Young Soo Kim, Suwon-si (KR); Sujit Jos, Bangalore (IN); Manoj Choudhary, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 15/033,400

(22) PCT Filed: Oct. 30, 2014

(86) PCT No.: PCT/KR2014/010300
§ 371 (c)(1),
(2) Date: Jul. 20, 2016

(87) PCT Pub. No.: WO2015/065064
PCT Pub. Date: May 7, 2015

(65) Prior Publication Data
US 2016/0323056 A1  Nov. 3, 2016

(30) Foreign Application Priority Data

Oct. 30, 2013 (IN) .......................... 4895/CHE/2013
Oct. 30, 2014 (KR) ........................ 10-2014-0148975

(51) Int. Cl.
*H04J 13/16* (2011.01)
*H04J 13/00* (2011.01)
(Continued)

(52) U.S. Cl.
CPC ............ *H04J 13/16* (2013.01); *H04B 1/0475* (2013.01); *H04B 1/7097* (2013.01);
(Continued)

(58) Field of Classification Search
CPC .. H04J 13/16; H04L 25/4923; H04L 25/4925; H04L 1/247; H04L 1/0003;
(Continued)

(56) References Cited

U.S. PATENT DOCUMENTS 5,414,730 A * 5/1995 Lundquist .......... H04B 1/70752
375/150
5,767,738 A 6/1998 Brown et al.
(Continued)

FOREIGN PATENT DOCUMENTS

CN 102246485 A 11/2011
JP 2008-26310 A 2/2008
(Continued)

OTHER PUBLICATIONS

Lei, et al.; "UWB Ranging with Energy Detectors using Ternary Preamble Sequences", Wireless Communications and Networking Conference, IEEE, Apr. 2006, vol. 2, 8 pages total.
(Continued)

*Primary Examiner* — Warner Wong
(74) *Attorney, Agent, or Firm* — NSIP Law

(57) ABSTRACT

A method and device for transmitting a preamble sequence is disclosed. A transmitter according to an embodiment may extract a first sequence for a non-coherent receiver and a second sequence for a coherent receiver, from ternary preamble sequences including elements −1, 0 and 1, and map the first sequence and the second sequence to a preamble including a plurality of bits to generate a third sequence that the non-coherent receiver and coherent receiver support.

22 Claims, 15 Drawing Sheets

(51) Int. Cl.
*H04J 13/10* (2011.01)
*H04L 25/49* (2006.01)
*H04B 1/04* (2006.01)
*H04B 1/7097* (2011.01)
*H04L 27/04* (2006.01)
*H04L 27/38* (2006.01)
*H04L 27/233* (2006.01)
*H04L 1/24* (2006.01)
*H04L 27/26* (2006.01)
*H04L 27/36* (2006.01)

(52) U.S. Cl.
CPC ....... *H04J 13/0011* (2013.01); *H04J 13/0022* (2013.01); *H04J 13/10* (2013.01); *H04J 13/107* (2013.01); *H04L 25/4923* (2013.01); *H04L 27/04* (2013.01); *H04B 2201/70707* (2013.01); *H04B 2201/709709* (2013.01); *H04J 13/0044* (2013.01); *H04L 1/247* (2013.01); *H04L 27/233* (2013.01); *H04L 27/2627* (2013.01); *H04L 27/2692* (2013.01); *H04L 27/36* (2013.01); *H04L 27/38* (2013.01)

(58) Field of Classification Search
CPC ......... H04L 27/04; H04L 27/06; H04L 27/12; H04L 27/14; H04L 27/20; H04L 27/22; H04L 27/227; H04L 27/233; H04L 27/2331; H04L 27/2627; H04L 27/2649; H04L 27/36; H04L 27/38; H04L 27/2692; H04L 5/023; H04L 49/309; H04L 49/3009; H04L 69/161
See application file for complete search history.

(56) References Cited

U.S. PATENT DOCUMENTS

| | | | |
|---|---|---|---|
| 6,097,328 A | 8/2000 | Frankot | |
| 6,297,691 B1* | 10/2001 | Anderson | H04L 27/2273 329/300 |
| 7,103,027 B2* | 9/2006 | Dick | H04B 7/2628 370/335 |
| 7,519,101 B1 | 4/2009 | Wright | |
| 7,801,107 B2 | 9/2010 | Sahinoglu et al. | |
| 2003/0058972 A1* | 3/2003 | Iochi | H04L 7/042 375/343 |
| 2005/0063386 A1* | 3/2005 | Owen | H04W 28/18 370/392 |
| 2007/0019710 A1* | 1/2007 | Lakkis | H04B 1/71632 375/130 |
| 2007/0110126 A1* | 5/2007 | Sekiguchi | H04B 1/71632 375/130 |
| 2008/0207152 A1* | 8/2008 | Welborn | H04W 52/028 455/142 |
| 2008/0247442 A1 | 10/2008 | Orlik et al. | |
| 2008/0259896 A1* | 10/2008 | Sahinoglu | G06K 7/10306 370/345 |
| 2009/0303089 A1 | 12/2009 | Chin et al. | |
| 2010/0158087 A1 | 6/2010 | Chin | |
| 2013/0243111 A1* | 9/2013 | Lee | H04L 25/022 375/285 |
| 2015/0270999 A1* | 9/2015 | Jahan | H04L 27/2613 370/503 |
| 2016/0261359 A1* | 9/2016 | Nair | H04J 13/0011 |

FOREIGN PATENT DOCUMENTS

| | | |
|---|---|---|
| JP | 4656237 B2 | 3/2011 |
| KR | 10-0313926 B1 | 11/2001 |
| KR | 10-2010-0026964 A | 3/2010 |
| KR | 10-2012-0127735 A | 11/2012 |
| WO | 2006/041220 A1 | 4/2006 |

OTHER PUBLICATIONS

Adalan, et al.; "Ultra-Wideband Radio Pulse Shaping Filter Design for IEEE 802.15.4a Transmitter", Wireless Communications and Networking Conference, IEEE, Apr. 2009, 8 pages total.

Search Report dated Feb. 26, 2015, issued by the International Searching Authority in counterpart International Application No. PCT/KR2014/010300 (PCT/ISA/210).

Written Opinion dated Feb. 26, 2015, issued by the International Searching Authority in counterpart International Application No. PCT/KR2014/010300 (PCT/ISA/237).

Communication dated May 3, 2017, issued by the European Patent Office in counterpart European Application No. 14856928.8.

Jian Xing Lee, et al.; "UWB piconet interference suppression using clustered ternary orthogonal signaling scheme", Ultra-Wideband, 2009, ICUWB 2009, IEEE International Conference on, IEEE, Piscataway, NJ, USA, Sep. 9, 2009, pp. 83-87.

Chin, F. et al., "Impulse Radio Signaling for Communication and Ranging". Proceedings of; *IEEE P802.15 Working Group for Wireless Personal Area Networks (WPANs)*, Institute for Ifocomm Research, Singapore, Jul. 18, 2005, (39 Pages).

Japanese Office Action dated Jun. 12, 2018 in Corresponding Japanese Patent Application No. 2016-526894. (2 pages in English, 4 pages in Japanese).

Chinese Office Action dated Nov. 21, 2018 in corresponding Chinese Patent Application No. 201480071842.4 (6 pages in English, 5 pages in Chinese).

* cited by examiner

| Preamble format | | P1 | P2 |
|---|---|---|---|
| Number of repetition $N_{rep}$ | | 4 | 8 |
| Base preamble pattern | | [1 0 0 1 1 0 0 1 1 0 0 1 1 0 0 -1<br>-1 0 0 1 -1 0 0 1 -1 0 0 1 -1 0 0 -1] | [1 0 -1 0 0 -1 0 -1 1 0 1 0 0 -1 0 1<br>1 0 1 0 0 -1 0 1 -1 0 1 0 0 1 0 1] |
| Equivalent base preamble at Rx | Noncoherent Rx | [1 0 0 1 1 0 0 1 1 0 0 1 1 0 0 1<br>1 0 0 1 1 0 0 1 1 0 0 1 1 0 0 1] | [1 0 1 0 0 1 0 1 1 0 1 0 0 1 0 1<br>1 0 1 0 0 1 0 1 1 0 1 0 0 1 0 1] |
| | Coherent Rx | [1 1 1 1 1 1 1 1 1 1 1 1 1 1 1 -1<br>-1 1 1 1 -1 1 1 1 -1 1 1 1 -1 1 1 -1] | [1 -1 1 -1 -1 1 -1 1 1 -1 1 -1 -1 1 -1 1<br>1 -1 1 -1 -1 1 -1 1 -1 1 -1 1 1 -1 1 1] |

1011  1012  1021  1022

METHOD AND DEVICE FOR TRANSMITTING PREAMBLE SEQUENCE

CROSS-REFERENCE TO RELATED APPLICATIONS

This application is a National Stage of International Application No. PCT/KR2014/010300 filed Oct. 30, 2014, and claims priority from Korean Application No. 10-2014-0148975 filed Oct. 30, 2014, and Indian Application No. 4895/CHE/2013 filed Oct. 30, 2013.

BACKGROUND

1. Technical Field

Exemplary embodiments relate to a method and device for transmitting a preamble sequence.

2. Related Art

A modulation scheme in a digital wireless communication system may be classified into a non-coherent modulation and a coherent modulation in general. The non-coherent modulation may be appropriate to a non-coherent receiver with a low complexity operating at low power. The coherent modulation may be appropriate to a coherent receiver operating with a high performance and a relatively low limitation on power and a complexity.

SUMMARY

According to exemplary embodiments, there is provided a transmitter including a sequence extractor configured to extract a first sequence for a non-coherent receiver and a second sequence for a coherent receiver from a ternary preamble sequence including elements −1, 0, and 1, and a sequence generator configured to generate a third sequence supported in the non-coherent receiver and the coherent receiver by mapping the first sequence and the second sequence to a preamble including a plurality of bits.

The first sequence may include elements 0 and 1, and the second sequence includes elements −1 and 1.

The sequence extractor may be configured to extract the first sequence by converting the elements of the ternary preamble sequence into absolute values based on a period of the first sequence.

The sequence extractor may be configured to extract the second sequence by converting an element 0 among the elements of the ternary preamble sequence into an element 1 based on a period of the second sequence.

The sequence generator may include a first mapper configured to map the first sequence to every one or more bits of the preamble, and a second mapper configured to map the second sequence to the first sequence that is mapped to every one or more bits, to generate the third sequence.

The first mapper may be configured to increase an index of the first sequence based on a modulo counter corresponding to a period of the first sequence and map an element of the first sequence corresponding to the index to the one or more bits of the preamble.

The second mapper may be configured to increase an index of the second sequence based on a modulo counter corresponding to a period of the second sequence and map an element of the second sequence corresponding to the index to the first sequence that is mapped to the one or more bits of the preamble.

The second mapper may be configured to multiply the first sequence that is mapped to the one or more bits of the preamble by the second sequence.

The second mapper may be configured to repetitively expand the first sequence to correspond to a ratio between a period of the first sequence and a period of the second sequence and multiply the expanded first sequence by the second sequence.

The sequence generator may include a first binary mapper configured to map the first sequence to every one or more bits in the preamble, and a second binary mapper configured to convert elements of the second sequence into binary values and aggregate the second sequence of which the elements are converted with the first sequence that is mapped to the one or more bits of the preamble.

The second binary mapper may be configured to convert an element −1 into an element 1 in the second sequence and convert the element 1 into an element 0 in the second sequence.

A period of the first sequence may be shorter than a period of the second sequence.

The sequence generator may be configured to generate a base preamble sequence corresponding to one or more bits of the preamble and generate the third sequence by repeating the base preamble sequence a predetermined number of times.

The sequence generator may be configured to generate the base preamble sequence by repetitively expanding the first sequence to correspond to a ratio between a period of the first sequence and a period of the second sequence and multiplying the expanded first sequence by the second sequence.

A preamble format of the preamble may be one of a preamble format P1 and a preamble format P2 of [Table 1], and the base preamble sequence may have a base preamble pattern and a number of repetitions based on the preamble format as presented in [Table 1].

TABLE 1

| Preamble format | Base preamble pattern | Number of repetitions ($N_{rep}$) |
|---|---|---|
| P1 | [1 0 0 1 1 0 0 1 1 0 0 1 1 0 0 −1 −1 0 0 1 −1 0 0 1 −1 0 0 1 −1 0 0 −1] | 4 |
| P2 | [1 0 −1 0 0 1 −0 −1 1 0 1 0 0 −1 0 1 1 0 1 0 0 −1 0 1 −1 0 1 0 0 1 0 −1] | 8 |

The first sequence, a period of the first sequence, the second sequence, and a period of the second sequence may each have a value based on the preamble format as presented in [Table 2].

TABLE 2

| Preamble format | First sequence | Period of first sequence (N1) | Second sequence |
|---|---|---|---|
| P1 | [1 0 0 1] | 4 | [1 1 1 1 1 1 1 1 1 1 1 1 1 1 −1 −1 1 1 1 −1 1 1 1 −1 1 1 1 −1 1 1 1 −1 ] |
| P2 | [1 0 1 0 0 1 0 1] | 8 | [1 1 −1 1 1 1 −1 1 1 1 1 1 −1 1 1 1 1 1 1 1 −1 1 1 1 −1 1 1 1 1 1 1 1 ] |

The transmitter may further include a frame transmitter configured to transmit a transmission frame including a preamble field including the third sequence, a start frame delimiter (SFD) field, a physical layer header (PHR) field, and a physical service data unit (PSDU) field to at least one of the non-coherent receiver or the coherent receiver.

According to exemplary embodiments, there is also provided a device for extracting a sequence, the device including a ternary preamble sequence acquirer configured to acquire a ternary preamble sequence including elements −1, 0, and 1, a first sequence extractor configured to extract a first sequence including elements 0 and 1 for a non-coherent receiver from the ternary preamble sequence, and a second sequence extractor configured to extract a second sequence including elements −1 and 1 for a coherent receiver.

The first sequence extractor may be configured to extract the first sequence by converting the elements of the ternary preamble sequence into absolute values based on a period of the first sequence.

The second sequence extractor may be configured to extract the second sequence by converting an element 0 among the elements of the ternary preamble sequence into an element 1 based on a period of the second sequence.

The device may further include a storage configured to store the first sequence and the second sequence.

According to exemplary embodiments, there is also provided a device for generating a sequence, the device including a first mapper configured to map a first sequence including elements 0 and 1 for a non-coherent receiver to every one or more bits in a preamble, and a second mapper configured to map a second sequence including elements −1 and 1 for a coherent receiver to the first sequence that is mapped to every one or more bits, to generate a third sequence.

The first sequence and the second sequence may be stored in advance.

The first mapper may be configured to increase, with respect to every one or more bits of the preamble, an index of the first sequence based on a modulo counter corresponding to a period of the first sequence and map an element of the first sequence corresponding to the index to the one or more bits of the preamble.

The second mapper may be configured to increase an index of the second sequence based on a modulo counter corresponding to a period of the second sequence and map an element of the second sequence corresponding to the index to the first sequence that is mapped to the one or more bits of the preamble.

The second mapper may be configured to multiply the first sequence that is mapped to the one or more bits of the preamble by the second sequence.

According to exemplary embodiments, there is also provided a transmitter including a base preamble extractor configured to extract a base preamble pattern based on a preamble format of a preamble, and a preamble sequence generator configured to generate a preamble sequence supported in a non-coherent receiver and a coherent receiver by repeating the base preamble pattern through a predetermined number of repetitions.

The base preamble extractor may be configured to extract the base preamble pattern and the predetermined number of repetitions from [Table 3] based on one of a preamble format P1 and a preamble format P2 as presented in [Table 3].

TABLE 3

| Preamble format | Base preamble pattern | Number of repetitions ($N_{rep}$) |
|---|---|---|
| P1 | [1 0 0 1 1 0 0 1 1 0 0 1 1 0 0 −1 −1 0 0 1 −1 0 0 1 −1 0 0 1 −1 0 0 −1] | 4 |

TABLE 3-continued

| Preamble format | Base preamble pattern | Number of repetitions ($N_{rep}$) |
|---|---|---|
| P2 | [1 0 −1 0 0 −1 0 −1 1 0 1 0 0 −1 0 1 1 0 1 0 0 −1 0 1 −1 0 1 0 0 1 0 1] | 8 |

The transmitter may further include a frame transmitter configured to transmit a transmission frame including a preamble field including the preamble sequence, an SFD field, a PHR field, and a PSDU field to at least one of the non-coherent receiver and the coherent receiver.

According to exemplary embodiments, there is also provided a transmitter including a base preamble extractor configured to extract a base preamble pattern and a predetermined number of repetitions from [Table 4] based on one of a preamble format P1 and a preamble format P2 as presented in [Table 4], a preamble sequence generator configured to generate a preamble sequence supported in a non-coherent receiver and a coherent receiver by repeating the base preamble pattern through the predetermined number of repetitions, and a frame transmitter configured to transmit a transmission frame including a preamble field including the preamble sequence, an SFD field, a PHR field, and a PSDU field to at least one of the non-coherent receiver or the coherent receiver.

TABLE 4

| Preamble format | Base preamble pattern | Number of repetitions ($N_{rep}$) |
|---|---|---|
| P1 | [1 0 0 1 1 0 0 1 1 0 0 1 1 0 0 −1 −1 0 0 1 −1 0 0 1 −1 0 0 1 −1 0 0 −1] | 4 |
| P2 | [1 0 −1 0 0 −1 0 −1 1 0 1 0 0 −1 0 1 1 0 1 0 0 −1 0 1 −1 0 1 0 0 1 0 1] | 8 |

BRIEF DESCRIPTION OF DRAWINGS

FIG. 10 is a diagram illustrating an example of generating a ternary sequence according to an exemplary embodiment of the present invention.

DETAILED DESCRIPTION

Figure 1:
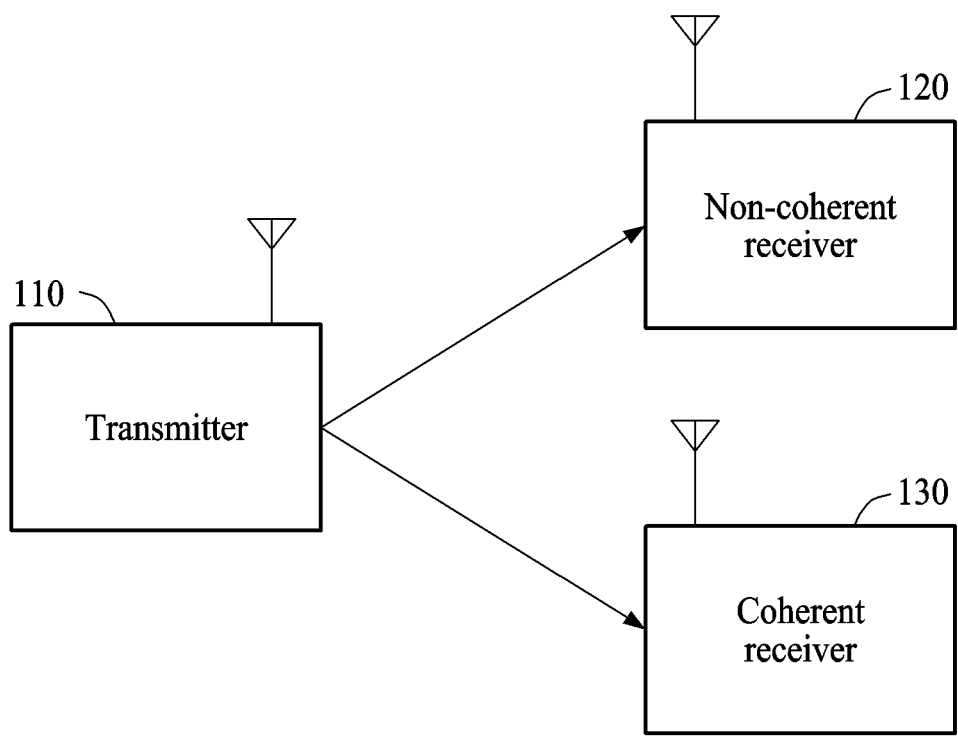
FIG. 1 is a diagram illustrating a wireless communication system according to an exemplary embodiment of the present invention.

Hereinafter, exemplary embodiments will be described in detail with reference to the accompanying drawings. Like reference numerals refer to the like elements throughout.

It should be understood, however, that there is no intent to limit this disclosure to the particular exemplary embodiments disclosed. On the contrary, exemplary embodiments are to cover all modifications, equivalents, and alternatives falling within the scope of the exemplary embodiments.

As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which these exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a diagram illustrating a wireless communication system according to an exemplary embodiment of the present invention.

Referring to FIG. 1, the wireless communication system may include a coherent transmitter 110, a non-coherent receiver 120, and a coherent receiver 130. The coherent transmitter 110 may transmit data based on a unit of packet. A packet may include a preamble to temporally synchronize the coherent transmitter 110 with receivers, for example, the non-coherent receiver 120 and the coherent receiver 130. The preamble may be positioned in a head portion of the packet and indicate a symbol sequence having a predetermined pattern.

The coherent transmitter 110 may modulate the preamble based on a coherent modulation scheme. In the coherent modulation scheme, the coherent transmitter 110 may modulate the preamble to be in a form of sequence using elements $\{-1, 0, +1\}$, and transmit the packet in which the preamble is modulated to the non-coherent receiver 120 and the coherent receiver 130. In an exemplary embodiment, a preamble sequence including the elements $\{-1, 0, +1\}$ may be expressed as a ternary preamble sequence. Also, a sequence including elements $\{0, +1\}$ may be expressed as a unipolar preamble sequence, and a sequence including elements $\{-1, 1\}$ may be expressed as a bipolar preamble sequence. Here, an element +1 may indicate that a phase value of a carrier signal is set to be 0, and an element 0 may indicate that the carrier signal enters an off-state. Also, an element −1 may indicate that the phase value of the carrier signal is set to be 180°. When the non-coherent receiver 120 receives the packet from the coherent transmitter 110, the non-coherent receiver 120 may demodulate the preamble based on a non-coherent demodulation scheme. In this example, the non-coherent receiver 120 does not distinguish different phases of the carrier signal. Thus, the non-coherent receiver 120 does not distinguish between the element +1 and the element −1, and may recognize the ternary preamble sequence of the preamble as the unipolar preamble sequence. When the coherent receiver 130 receives the packet from the coherent transmitter 110, the coherent receiver 130 may demodulate the preamble based on a coherent demodulation. In this example, dissimilarly to the non-coherent receiver 120, the coherent receiver 130 may correctly recognize the ternary preamble sequence of the preamble.

The preamble of the coherent transmitter 110 may be in a structure in which the ternary preamble sequence is repeated a multiple number of times. Thus, the preamble demodulated by the non-coherent receiver 120 may be in a structure in which the unipolar preamble sequence is repeated the multiple number of times, and the preamble demodulated by the coherent receiver 130 may be in a structure in which the ternary preamble sequence is repeated the multiple number of times. The non-coherent receiver 120 may have less complexity and operate with less power when compared to the coherent receiver 130. For this reason, a repetition period of the unipolar preamble sequence may be set to be relatively short in the preamble of the non-coherent receiver 120, and a repetition period of the ternary preamble sequence may be set to be relatively long in the preamble of the coherent receiver 130. By setting the repetition period of the unipolar preamble sequence to be relatively short, an amount of calculation and a storage space of received samples may be reduced during a signal processing performed in the non-coherent receiver 120 so as to be appropriate for a low complexity and a low power operation of the non-coherent receiver 120.

The coherent transmitter 110 may divide the ternary preamble sequence applicable to the non-coherent receiver 120 and the coherent receiver 130 into the unipolar preamble sequence and the bipolar preamble sequence. Also, the coherent transmitter 110 may generate a common preamble sequence by restructuring the unipolar preamble sequence and the bipolar preamble sequence, and then transmit the common preamble sequence to the non-coherent receiver 120 and the coherent receiver 130.

When the coherent transmitter 110 divides the ternary preamble sequence into the unipolar preamble sequence and the bipolar preamble sequence, an amount of data stored in the coherent transmitter 110 may be reduced. Also, it is possible to flexibly react in response to a request for correcting a preamble sequence of one of the non-coherent receiver 120 or the coherent receiver 130.

Hereinafter, a method of designing the ternary preamble sequence applicable to the non-coherent receiver 120 and the coherent receiver 130 will be described in detail with reference to FIGS. 2 and 3.

Also, a method of transmitting a preamble to the non-coherent receiver 120 and the coherent receiver 130 based on the designed ternary preamble sequence will be described in detail with reference to FIGS. 4 through 13.

<Designing of Ternary Preamble Sequence>

A method of acquiring a non-coherent spreading sequence having elements or alphabets for variable spreading factors will be described according to an exemplary embodiment.

Spreading sequences for the variable spreading factors may be defined as $C=\{c_m | m \in \mathcal{N}_{SF}\}$, and spreading factors may be expressed as $m \in \mathcal{N}_{SF}=\{2, 4, 8, 16, \ldots\}$. Here, m denotes a spreading factor, and $C_m$ denotes a spreading sequence for the spreading factor m.

When a preamble symbol length is M, preamble sequences may be $1_M \otimes c_m$.

Here, a length of a vector $1_m$, for example, all one vector having elements 1 only may be m, and $\otimes$ denotes a Kronecker product operation.

A codebook for the variable spreading factors may be expressed as $W=\{w_m \triangleq 1_{N/m} \otimes c_m | m \in \mathcal{N}_{SF}\}$. Here, $\mathcal{N}$ denotes a correlator size. $w_m[w_1 \ w_2 \ \ldots \ w_N]$ may be a codeword for the spreading factor m. $\forall l, w_l \in \{0, 1\}$ and $v_m=[v_1 \ v_2 \ \ldots \ v_N]$. may be correlation sequences, and $\forall l$, $v_l \triangleq 2w_l-1 \in \{-1, 1\}$ and $y_n[y_n \ y_{n+1} \ \ldots \ y_{n+N-1}]$ may be input sequences. A correlation output for the spreading factor may be expressed as $$\sum_n (w_m) = y_n \cdot v_m = \sum_{l=1}^{N} y_{n+l-1} \cdot v_l.$$

Based on the correlation output, a blind detection and a packet detection of the spreading factor may be determined by $$\hat{N}_{SF} = \arg\max_{m \in N_{SF}} \sum_n (w_m) \text{ and } \max_{m \in N_{SF}} \sum_n (w_m) \overset{\mathcal{H}_1}{\underset{\mathcal{H}_0}{\gtrless}} \gamma_{pd}.$$

Here, $\mathcal{H}_0$ indicates that a packet is not transmitted, $\mathcal{H}_1$ indicates that the packet is transmitted, and $\gamma_{pd}$ denotes a threshold for the packet detection.

To improve a performance of the preamble, an orthogonal sequence design based on a circular shift equivalent set for the variable spreading factors may be required.

The circular shift equivalent set may be defined as $\mathbb{C}(c_m)=\{c_m^{[l]} | c_m^{[0]}=c_m, c_m^{[l]}=[c_{m-l+1} \ldots c_m \ c_1 \ c_2 \ldots c_{m-l}]$ for $0<l<m\}$ with $c_m=[c_1 \ c_2 \ldots c_m]$.

A solution for non-coherent variable spreading factor sequences will be described below. In consideration of a repetitive structure of the preamble having the spreading sequence, the following properties may be used.

Property 1. 0/1 balanced property

Property 2. Non-repetition property: for preventing an ambiguity due to consecutive elements 1 or 0, which may be expressed as $$\{c_m=[c_{m/2,1}c_{m/2,2}] | c_{m/2,1} \neq c_{m/2,2}\}.$$

Property 3. Non-circular property: for preventing an ambiguity due to nested codewords, which may be expressed as $$\{c_m | c_m \neq [1_{m/n} \otimes c_n] \mathbb{C}_l, 0 \leq l < m, m=2^t, n=2^s, t>s\}.$$

Property 4. Conjugate property: expressed as $$\{c_m=[c_{m/2,1}c_{m/2,2}] | c_{m/2,2}=\tilde{c}_{m/2,1}\}.$$

Based on the properties 1 through 4, the circular shift equivalent set according to the spreading factor m may be represented as Table 1 below.

TABLE 1

| m = 4: | 1 set |
|---|---|
| m = 8: | 2 set |
| m = 16: | 16 set |

In an exemplary embodiment, based on the circular shift equivalent set for the variable spreading factors, a hierarchical codebook structure may be extracted by combining different codewords from each of the spreading factors.

To acquire the aforementioned properties 1 through 4, orthogonal expansions of two types of preamble sequences may be provided.

A first orthogonal expansion may be expressed by equations $$c_m=[1_{m/4} \otimes c_2 1_{m/4} \otimes \tilde{c}_2] \text{ for } m \triangleq 2^t \text{ and } t \geq 2 \text{ and}$$

$c_2=[1 \ 0]$, $c_4=[1 \ 0 \ 0 \ 1]$, $c_8=[1 \ 0 \ 1 \ 0 \ 0 \ 1 \ 0 \ 1]$, $c_{16}=[1 \ 0 \ 1 \ 0 \ 1 \ 0 \ 0 \ 1 \ 0 \ 1 \ 0 \ 1 \ 0 \ 1]$, and also expressed as shown in Table 2 below.

TABLE 2

| m = 2  | 1 | 0 | 1 | 0 | 1 | 0 | 1 | 0 | 1 | 0 | 1 | 0 | 1 | 0 | 1 | 0 |
| m = 4  | 1 | 0 | 0 | 1 | 1 | 0 | 0 | 1 | 1 | 0 | 0 | 1 | 1 | 0 | 0 | 1 |
| m = 8  | 1 | 0 | 1 | 0 | 0 | 1 | 0 | 1 | 1 | 0 | 1 | 0 | 0 | 1 | 0 | 1 |
| m = 16 | 1 | 0 | 1 | 0 | 1 | 0 | 0 | 1 | 0 | 1 | 0 | 1 | 0 | 1 | 0 | 1 |

A second orthogonal expansion may be expressed as equations $$c_m=[c_{m/2}\tilde{c}_{m/2}] \text{ for } m \triangleq 2^t \text{ and } t \geq 2 \text{ and}$$

$c_2=[1 \ 0]$, $c_4=[1 \ 0 \ 0 \ 1]$, $c_8=[1 \ 0 \ 0 \ 1 \ 0 \ 1 \ 1 \ 0]$, $c_{16}=[1 \ 0 \ 0 \ 1 \ 0 \ 1 \ 1 \ 0 \ 0 \ 1 \ 1 \ 0 \ 1 \ 0 \ 0 \ 1]$ and also be expressed as shown in Table 3 below.

TABLE 3

| | | | | | | | | | | | | | | | | |
|---|---|---|---|---|---|---|---|---|---|---|---|---|---|---|---|---|
| m = 2 | 1 | 0 | 1 | 0 | 1 | 0 | 1 | 0 | 1 | 0 | 1 | 0 | 1 | 0 | 1 | 0 |
| m = 4 | 1 | 0 | 0 | 1 | 1 | 0 | 0 | 1 | 1 | 0 | 0 | 1 | 1 | 0 | 0 | 1 |
| m = 8 | 1 | 0 | 0 | 1 | 0 | 1 | 1 | 0 | 1 | 0 | 0 | 1 | 0 | 1 | 1 | 0 |

Here, the conjugate sequence may be defined as $\tilde{c}_m = c_m \otimes \mathbf{1}_m$, and $\otimes$ denotes a binary exclusive or operation or an exclusive or (XOR) operation.

Table 4 shows a circular shift equivalent set in a case in which the spreading factor m is 4.

TABLE 4

| | Set 1 | | | | | | | |
|---|---|---|---|---|---|---|---|---|
| Index | $c_0$ | $c_1$ | $c_2$ | $c_3$ | $\omega_H$ | min $d_H$ | min $d_E$ | $\rho$ |
| 3 | 1 | 1 | 0 | 0 | 2 | 2 | $\sqrt{2}$ | 0 |
| 6 | 0 | 1 | 1 | 0 | 2 | 2 | $\sqrt{2}$ | 0 |
| 9 | 1 | 0 | 0 | 1 | 2 | 2 | $\sqrt{2}$ | 0 |
| 12 | 0 | 0 | 1 | 1 | 2 | 2 | $\sqrt{2}$ | 0 |

Tables 5 and 6 show circular shift equivalent sets in a case in which the spreading factor m is 8.

TABLE 5

| | Set 1 | | | | | | | | | | |
|---|---|---|---|---|---|---|---|---|---|---|---|
| Index | $c_0$ | $c_1$ | $c_2$ | $c_3$ | $c_4$ | $c_5$ | $c_6$ | $c_7$ | $\omega_H$ | min $d_H$ | min $d_E$ | $\rho$ |
| 15 | 1 | 1 | 1 | 1 | 0 | 0 | 0 | 0 | 4 | 4 | 2 | 0 |
| 30 | 0 | 1 | 1 | 1 | 1 | 0 | 0 | 0 | 4 | 4 | 2 | 0 |
| 60 | 0 | 0 | 1 | 1 | 1 | 1 | 0 | 0 | 4 | 4 | 2 | 0 |

TABLE 5-continued

| | Set 1 | | | | | | | | | | |
|---|---|---|---|---|---|---|---|---|---|---|---|
| Index | $c_0$ | $c_1$ | $c_2$ | $c_3$ | $c_4$ | $c_5$ | $c_6$ | $c_7$ | $\omega_H$ | min $d_H$ | min $d_E$ | $\rho$ |
| 120 | 0 | 0 | 0 | 1 | 1 | 1 | 1 | 0 | 4 | 4 | 2 | 0 |
| 135 | 1 | 1 | 1 | 0 | 0 | 0 | 0 | 1 | 4 | 4 | 2 | 0 |
| 195 | 1 | 1 | 0 | 0 | 0 | 0 | 1 | 1 | 4 | 4 | 2 | 0 |
| 225 | 1 | 0 | 0 | 0 | 0 | 1 | 1 | 1 | 4 | 4 | 2 | 0 |
| 240 | 0 | 0 | 0 | 0 | 1 | 1 | 1 | 1 | 4 | 4 | 2 | 0 |

TABLE 6

| | Set 2 | | | | | | | | | | |
|---|---|---|---|---|---|---|---|---|---|---|---|
| Index | $c_0$ | $c_1$ | $c_2$ | $c_3$ | $c_4$ | $c_5$ | $c_6$ | $c_7$ | $\omega_H$ | min $d_H$ | min $d_E$ | $\rho$ |
| 45 | 1 | 0 | 1 | 1 | 0 | 1 | 0 | 0 | 4 | 4 | 2 | 0 |
| 75 | 1 | 1 | 0 | 1 | 0 | 0 | 1 | 0 | 4 | 4 | 2 | 0 |
| 90 | 0 | 1 | 0 | 1 | 1 | 0 | 1 | 0 | 4 | 4 | 2 | 0 |
| 105 | 1 | 0 | 0 | 1 | 0 | 1 | 1 | 0 | 4 | 4 | 2 | 0 |
| 150 | 0 | 1 | 1 | 0 | 1 | 0 | 0 | 1 | 4 | 4 | 2 | 0 |
| 165 | 1 | 0 | 1 | 0 | 0 | 1 | 0 | 1 | 4 | 4 | 2 | 0 |
| 180 | 0 | 0 | 1 | 0 | 1 | 1 | 0 | 1 | 4 | 4 | 2 | 0 |
| 210 | 0 | 1 | 0 | 0 | 1 | 0 | 1 | 1 | 4 | 4 | 2 | 0 |

Tables 7 through 22 show circular shift equivalent sets in a case in which the spreading factor m is 16.

TABLE 7

| | Set 1 | | | | | | | | | | | | | | | | | | |
|---|---|---|---|---|---|---|---|---|---|---|---|---|---|---|---|---|---|---|---|
| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $\omega_H$ | min $d_H$ | min $d_E$ | $\rho$ |
| 255 | 1 | 1 | 1 | 1 | 1 | 1 | 1 | 1 | 0 | 0 | 0 | 0 | 0 | 0 | 0 | 0 | 8 | 8 | $\sqrt{8}$ | 0 |
| 510 | 0 | 1 | 1 | 1 | 1 | 1 | 1 | 1 | 1 | 0 | 0 | 0 | 0 | 0 | 0 | 0 | 8 | 8 | $\sqrt{8}$ | 0 |
| 1020 | 0 | 0 | 1 | 1 | 1 | 1 | 1 | 1 | 1 | 1 | 0 | 0 | 0 | 0 | 0 | 0 | 8 | 8 | $\sqrt{8}$ | 0 |
| 2040 | 0 | 0 | 0 | 1 | 1 | 1 | 1 | 1 | 1 | 1 | 1 | 0 | 0 | 0 | 0 | 0 | 8 | 8 | $\sqrt{8}$ | 0 |
| 4080 | 0 | 0 | 0 | 0 | 1 | 1 | 1 | 1 | 1 | 1 | 1 | 1 | 0 | 0 | 0 | 0 | 8 | 8 | $\sqrt{8}$ | 0 |
| 8160 | 0 | 0 | 0 | 0 | 0 | 1 | 1 | 1 | 1 | 1 | 1 | 1 | 1 | 0 | 0 | 0 | 8 | 8 | $\sqrt{8}$ | 0 |
| 16320 | 0 | 0 | 0 | 0 | 0 | 0 | 1 | 1 | 1 | 1 | 1 | 1 | 1 | 1 | 0 | 0 | 8 | 8 | $\sqrt{8}$ | 0 |
| 32640 | 0 | 0 | 0 | 0 | 0 | 0 | 0 | 1 | 1 | 1 | 1 | 1 | 1 | 1 | 1 | 0 | 8 | 8 | $\sqrt{8}$ | 0 |
| 32895 | 1 | 1 | 1 | 1 | 1 | 1 | 1 | 0 | 0 | 0 | 0 | 0 | 0 | 0 | 1 | 1 | 8 | 8 | $\sqrt{8}$ | 0 |
| 49215 | 1 | 1 | 1 | 1 | 1 | 1 | 0 | 0 | 0 | 0 | 0 | 0 | 0 | 1 | 1 | 1 | 8 | 8 | $\sqrt{8}$ | 0 |
| 57375 | 1 | 1 | 1 | 1 | 1 | 0 | 0 | 0 | 0 | 0 | 0 | 0 | 1 | 1 | 1 | 1 | 8 | 8 | $\sqrt{8}$ | 0 |
| 61455 | 1 | 1 | 1 | 1 | 0 | 0 | 0 | 0 | 0 | 0 | 0 | 1 | 1 | 1 | 1 | 1 | 8 | 8 | $\sqrt{8}$ | 0 |
| 63495 | 1 | 1 | 1 | 0 | 0 | 0 | 0 | 0 | 0 | 0 | 1 | 1 | 1 | 1 | 1 | 1 | 8 | 8 | $\sqrt{8}$ | 0 |
| 64515 | 1 | 1 | 0 | 0 | 0 | 0 | 0 | 0 | 0 | 1 | 1 | 1 | 1 | 1 | 1 | 1 | 8 | 8 | $\sqrt{8}$ | 0 |
| 65025 | 1 | 0 | 0 | 0 | 0 | 0 | 0 | 0 | 1 | 1 | 1 | 1 | 1 | 1 | 1 | 1 | 8 | 8 | $\sqrt{8}$ | 0 |
| 65280 | 0 | 0 | 0 | 0 | 0 | 0 | 0 | 0 | 1 | 1 | 1 | 1 | 1 | 1 | 1 | 1 | 8 | 8 | $\sqrt{8}$ | 0 |

TABLE 8

| | Set 2 | | | | | | | | | | | | | | | | | | |
|---|---|---|---|---|---|---|---|---|---|---|---|---|---|---|---|---|---|---|---|
| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $\omega_H$ | min $d_H$ | min $d_E$ | $\rho$ |
| 765 | 1 | 0 | 1 | 1 | 1 | 1 | 1 | 0 | 1 | 0 | 0 | 0 | 0 | 0 | 0 | 0 | 8 | 8 | $\sqrt{8}$ | 0 |
| 1530 | 0 | 1 | 0 | 1 | 1 | 1 | 1 | 1 | 0 | 1 | 0 | 0 | 0 | 0 | 0 | 0 | 8 | 8 | $\sqrt{8}$ | 0 |
| 3060 | 0 | 0 | 1 | 0 | 1 | 1 | 1 | 1 | 1 | 0 | 1 | 0 | 0 | 0 | 0 | 0 | 8 | 8 | $\sqrt{8}$ | 0 |
| 6120 | 0 | 0 | 0 | 1 | 0 | 1 | 1 | 1 | 1 | 1 | 0 | 1 | 0 | 0 | 0 | 0 | 8 | 8 | $\sqrt{8}$ | 0 |
| 12240 | 0 | 0 | 0 | 0 | 1 | 0 | 1 | 1 | 1 | 1 | 1 | 0 | 1 | 0 | 0 | 0 | 8 | 8 | $\sqrt{8}$ | 0 |
| 16575 | 1 | 1 | 1 | 1 | 1 | 0 | 1 | 0 | 0 | 0 | 0 | 0 | 0 | 1 | 0 | 0 | 8 | 8 | $\sqrt{8}$ | 0 |
| 24480 | 0 | 0 | 0 | 0 | 0 | 1 | 0 | 1 | 1 | 1 | 1 | 1 | 0 | 1 | 0 | 0 | 8 | 8 | $\sqrt{8}$ | 0 |
| 32385 | 1 | 0 | 0 | 0 | 0 | 0 | 1 | 0 | 1 | 1 | 1 | 1 | 1 | 0 | 1 | 0 | 8 | 8 | $\sqrt{8}$ | 0 |

TABLE 8-continued

Set 2

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $\omega_H$ | min $d_H$ | min $d_E$ | $\rho$ |
|---|---|---|---|---|---|---|---|---|---|---|---|---|---|---|---|---|---|---|---|---|
| 33150 | 0 | 1 | 1 | 1 | 1 | 1 | 1 | 0 | 1 | 0 | 0 | 0 | 0 | 0 | 0 | 1 | 8 | 8 | $\sqrt{8}$ | 0 |
| 41055 | 1 | 1 | 1 | 1 | 1 | 0 | 1 | 0 | 0 | 0 | 0 | 0 | 1 | 0 | 1 | 0 | 8 | 8 | $\sqrt{8}$ | 0 |
| 48960 | 0 | 0 | 0 | 0 | 0 | 0 | 1 | 0 | 1 | 1 | 1 | 1 | 1 | 1 | 0 | 1 | 8 | 8 | $\sqrt{8}$ | 0 |
| 53295 | 1 | 1 | 1 | 1 | 0 | 1 | 0 | 0 | 0 | 0 | 0 | 1 | 0 | 1 | 1 | 1 | 8 | 8 | $\sqrt{8}$ | 0 |
| 59415 | 1 | 1 | 1 | 0 | 1 | 0 | 0 | 0 | 0 | 0 | 1 | 0 | 1 | 1 | 1 | 1 | 8 | 8 | $\sqrt{8}$ | 0 |
| 62475 | 1 | 1 | 0 | 1 | 0 | 0 | 0 | 0 | 0 | 1 | 0 | 1 | 1 | 1 | 1 | 1 | 8 | 8 | $\sqrt{8}$ | 0 |
| 64005 | 1 | 0 | 1 | 0 | 0 | 0 | 0 | 0 | 1 | 0 | 1 | 1 | 1 | 1 | 1 | 1 | 8 | 8 | $\sqrt{8}$ | 0 |
| 64770 | 0 | 1 | 0 | 0 | 0 | 0 | 0 | 0 | 1 | 0 | 1 | 1 | 1 | 1 | 1 | 1 | 8 | 8 | $\sqrt{8}$ | 0 |

TABLE 9

Set 3

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $\omega_H$ | min $d_H$ | min $d_E$ | $\rho$ |
|---|---|---|---|---|---|---|---|---|---|---|---|---|---|---|---|---|---|---|---|---|
| 1275 | 1 | 1 | 0 | 1 | 1 | 1 | 1 | 1 | 0 | 0 | 1 | 0 | 0 | 0 | 0 | 0 | 8 | 8 | $\sqrt{8}$ | 0 |
| 2550 | 0 | 1 | 1 | 0 | 1 | 1 | 1 | 1 | 1 | 0 | 0 | 1 | 0 | 0 | 0 | 0 | 8 | 8 | $\sqrt{8}$ | 0 |
| 5100 | 0 | 0 | 1 | 1 | 0 | 1 | 1 | 1 | 1 | 1 | 0 | 0 | 1 | 0 | 0 | 0 | 8 | 8 | $\sqrt{8}$ | 0 |
| 10200 | 0 | 0 | 0 | 1 | 1 | 0 | 1 | 1 | 1 | 1 | 1 | 0 | 0 | 1 | 0 | 0 | 8 | 8 | $\sqrt{8}$ | 0 |
| 16065 | 1 | 0 | 0 | 0 | 0 | 0 | 1 | 1 | 0 | 1 | 1 | 1 | 1 | 1 | 0 | 0 | 8 | 8 | $\sqrt{8}$ | 0 |
| 20400 | 0 | 0 | 0 | 0 | 1 | 1 | 0 | 1 | 1 | 1 | 1 | 1 | 0 | 0 | 1 | 0 | 8 | 8 | $\sqrt{8}$ | 0 |
| 24735 | 1 | 1 | 1 | 1 | 1 | 0 | 0 | 1 | 0 | 0 | 0 | 0 | 1 | 1 | 0 | 0 | 8 | 8 | $\sqrt{8}$ | 0 |
| 32130 | 0 | 1 | 0 | 0 | 0 | 0 | 0 | 1 | 1 | 0 | 1 | 1 | 1 | 1 | 1 | 0 | 8 | 8 | $\sqrt{8}$ | 0 |
| 33405 | 1 | 0 | 1 | 1 | 1 | 1 | 1 | 0 | 0 | 1 | 0 | 0 | 0 | 0 | 0 | 1 | 8 | 8 | $\sqrt{8}$ | 0 |
| 40800 | 0 | 0 | 0 | 0 | 0 | 1 | 1 | 0 | 1 | 1 | 1 | 1 | 1 | 0 | 0 | 1 | 8 | 8 | $\sqrt{8}$ | 0 |
| 45135 | 1 | 1 | 1 | 1 | 0 | 0 | 1 | 0 | 0 | 0 | 0 | 1 | 1 | 0 | 1 | 1 | 8 | 8 | $\sqrt{8}$ | 0 |
| 49470 | 0 | 1 | 1 | 1 | 1 | 1 | 0 | 0 | 1 | 0 | 0 | 0 | 0 | 1 | 1 | 1 | 8 | 8 | $\sqrt{8}$ | 0 |
| 55335 | 1 | 1 | 1 | 0 | 0 | 1 | 0 | 0 | 0 | 0 | 1 | 1 | 0 | 1 | 0 | 1 | 8 | 8 | $\sqrt{8}$ | 0 |
| 60435 | 1 | 1 | 0 | 0 | 1 | 0 | 0 | 0 | 0 | 1 | 1 | 0 | 1 | 1 | 1 | 1 | 8 | 8 | $\sqrt{8}$ | 0 |
| 62985 | 1 | 0 | 0 | 1 | 0 | 0 | 0 | 0 | 1 | 1 | 0 | 1 | 1 | 1 | 1 | 1 | 8 | 8 | $\sqrt{8}$ | 0 |
| 64260 | 0 | 0 | 1 | 0 | 0 | 0 | 0 | 0 | 1 | 1 | 0 | 1 | 1 | 1 | 1 | 1 | 8 | 8 | $\sqrt{8}$ | 0 |

TABLE 10

Set 4

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $\omega_H$ | min $d_H$ | min $d_E$ | $\rho$ |
|---|---|---|---|---|---|---|---|---|---|---|---|---|---|---|---|---|---|---|---|---|
| 1785 | 1 | 0 | 0 | 1 | 1 | 1 | 1 | 1 | 0 | 1 | 1 | 0 | 0 | 0 | 0 | 0 | 8 | 8 | $\sqrt{8}$ | 0 |
| 3570 | 0 | 1 | 0 | 0 | 1 | 1 | 1 | 1 | 1 | 0 | 1 | 1 | 0 | 0 | 0 | 0 | 8 | 8 | $\sqrt{8}$ | 0 |
| 7140 | 0 | 0 | 1 | 0 | 0 | 1 | 1 | 1 | 1 | 1 | 0 | 1 | 1 | 0 | 0 | 0 | 8 | 8 | $\sqrt{8}$ | 0 |
| 8415 | 1 | 1 | 1 | 1 | 1 | 0 | 1 | 1 | 0 | 0 | 0 | 0 | 1 | 0 | 0 | 0 | 8 | 8 | $\sqrt{8}$ | 0 |
| 14280 | 0 | 0 | 0 | 1 | 0 | 0 | 1 | 1 | 1 | 1 | 1 | 0 | 1 | 1 | 0 | 0 | 8 | 8 | $\sqrt{8}$ | 0 |
| 16530 | 0 | 1 | 1 | 1 | 1 | 1 | 0 | 1 | 1 | 0 | 0 | 0 | 0 | 1 | 0 | 0 | 8 | 8 | $\sqrt{8}$ | 0 |
| 28560 | 0 | 0 | 0 | 0 | 1 | 0 | 0 | 1 | 1 | 1 | 1 | 1 | 0 | 1 | 1 | 0 | 8 | 8 | $\sqrt{8}$ | 0 |
| 31875 | 1 | 1 | 0 | 0 | 0 | 0 | 1 | 0 | 0 | 1 | 1 | 1 | 1 | 1 | 0 | 0 | 8 | 8 | $\sqrt{8}$ | 0 |
| 33660 | 0 | 0 | 1 | 1 | 1 | 1 | 0 | 1 | 1 | 0 | 0 | 0 | 0 | 0 | 1 | 0 | 8 | 8 | $\sqrt{8}$ | 0 |
| 36975 | 1 | 1 | 1 | 1 | 0 | 1 | 1 | 0 | 0 | 0 | 0 | 1 | 0 | 0 | 1 | 0 | 8 | 8 | $\sqrt{8}$ | 0 |
| 48705 | 1 | 0 | 0 | 0 | 0 | 1 | 0 | 0 | 1 | 1 | 1 | 1 | 0 | 1 | 1 | 0 | 8 | 8 | $\sqrt{8}$ | 0 |
| 51255 | 1 | 1 | 1 | 0 | 1 | 1 | 0 | 0 | 0 | 0 | 1 | 0 | 0 | 1 | 1 | 0 | 8 | 8 | $\sqrt{8}$ | 0 |
| 57120 | 0 | 0 | 0 | 0 | 1 | 0 | 0 | 1 | 1 | 1 | 1 | 0 | 1 | 1 | 0 | 1 | 8 | 8 | $\sqrt{8}$ | 0 |
| 58395 | 1 | 1 | 0 | 1 | 1 | 0 | 0 | 0 | 0 | 1 | 0 | 0 | 1 | 1 | 1 | 0 | 8 | 8 | $\sqrt{8}$ | 0 |
| 61965 | 1 | 0 | 1 | 1 | 0 | 0 | 0 | 0 | 1 | 0 | 0 | 1 | 1 | 1 | 1 | 0 | 8 | 8 | $\sqrt{8}$ | 0 |
| 63750 | 0 | 1 | 1 | 0 | 0 | 0 | 0 | 1 | 0 | 0 | 1 | 1 | 1 | 1 | 1 | 0 | 8 | 8 | $\sqrt{8}$ | 0 |

TABLE 11

Set 5

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $\omega_H$ | min $d_H$ | min $d_E$ | $\rho$ |
|---|---|---|---|---|---|---|---|---|---|---|---|---|---|---|---|---|---|---|---|---|
| 2295  | 1 | 1 | 1 | 0 | 1 | 1 | 1 | 1 | 0 | 0 | 0 | 1 | 0 | 0 | 0 | 0 | 8 | 8 | $\sqrt{8}$ | 0 |
| 4590  | 0 | 1 | 1 | 1 | 0 | 1 | 1 | 1 | 1 | 0 | 0 | 0 | 1 | 0 | 0 | 0 | 8 | 8 | $\sqrt{8}$ | 0 |
| 7905  | 1 | 0 | 0 | 0 | 0 | 1 | 1 | 1 | 0 | 1 | 1 | 1 | 1 | 0 | 0 | 0 | 8 | 8 | $\sqrt{8}$ | 0 |
| 9180  | 0 | 0 | 1 | 1 | 1 | 0 | 1 | 1 | 1 | 1 | 0 | 0 | 0 | 1 | 0 | 0 | 8 | 8 | $\sqrt{8}$ | 0 |
| 15810 | 0 | 1 | 0 | 0 | 0 | 0 | 1 | 1 | 1 | 0 | 1 | 1 | 1 | 1 | 0 | 0 | 8 | 8 | $\sqrt{8}$ | 0 |
| 18360 | 0 | 0 | 0 | 1 | 1 | 1 | 0 | 1 | 1 | 1 | 1 | 0 | 0 | 0 | 1 | 0 | 8 | 8 | $\sqrt{8}$ | 0 |
| 28815 | 1 | 1 | 1 | 1 | 0 | 0 | 0 | 1 | 0 | 0 | 0 | 0 | 1 | 1 | 1 | 0 | 8 | 8 | $\sqrt{8}$ | 0 |
| 31620 | 0 | 0 | 1 | 0 | 0 | 0 | 0 | 1 | 1 | 1 | 0 | 1 | 1 | 1 | 1 | 0 | 8 | 8 | $\sqrt{8}$ | 0 |
| 33915 | 1 | 1 | 0 | 1 | 1 | 1 | 1 | 0 | 0 | 0 | 1 | 0 | 0 | 0 | 0 | 1 | 8 | 8 | $\sqrt{8}$ | 0 |
| 35720 | 0 | 0 | 0 | 1 | 0 | 0 | 0 | 1 | 1 | 1 | 0 | 1 | 0 | 0 | 0 | 1 | 8 | 8 | $\sqrt{8}$ | 0 |
| 47175 | 1 | 1 | 1 | 0 | 0 | 0 | 1 | 0 | 0 | 0 | 0 | 1 | 1 | 1 | 0 | 1 | 8 | 8 | $\sqrt{8}$ | 0 |
| 49725 | 1 | 0 | 1 | 1 | 1 | 1 | 0 | 0 | 0 | 1 | 0 | 0 | 0 | 0 | 1 | 1 | 8 | 8 | $\sqrt{8}$ | 0 |
| 56355 | 1 | 1 | 0 | 0 | 0 | 1 | 0 | 0 | 0 | 0 | 1 | 1 | 1 | 0 | 1 | 1 | 8 | 8 | $\sqrt{8}$ | 0 |
| 57630 | 0 | 1 | 1 | 1 | 1 | 0 | 0 | 0 | 1 | 0 | 0 | 0 | 0 | 1 | 1 | 1 | 8 | 8 | $\sqrt{8}$ | 0 |
| 60945 | 1 | 0 | 0 | 0 | 1 | 0 | 0 | 0 | 0 | 1 | 1 | 1 | 0 | 1 | 1 | 1 | 8 | 8 | $\sqrt{8}$ | 0 |
| 63240 | 0 | 0 | 0 | 1 | 0 | 0 | 0 | 0 | 1 | 1 | 1 | 0 | 1 | 1 | 1 | 1 | 8 | 8 | $\sqrt{8}$ | 0 |

TABLE 12

Set 6

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_N$ | min $d_R$ | min $d_g$ | $\rho$ |
|---|---|---|---|---|---|---|---|---|---|---|---|---|---|---|---|---|---|---|---|---|
| 2805  | 1 | 0 | 1 | 0 | 1 | 1 | 1 | 1 | 0 | 1 | 0 | 1 | 0 | 0 | 0 | 0 | 8 | 8 | $\sqrt{8}$ | 0 |
| 5610  | 0 | 1 | 0 | 1 | 0 | 1 | 1 | 1 | 1 | 0 | 1 | 0 | 1 | 0 | 0 | 0 | 8 | 8 | $\sqrt{8}$ | 0 |
| 11220 | 0 | 0 | 1 | 0 | 1 | 0 | 1 | 1 | 1 | 1 | 0 | 1 | 0 | 1 | 0 | 0 | 8 | 8 | $\sqrt{8}$ | 0 |
| 17085 | 1 | 0 | 1 | 1 | 1 | 1 | 0 | 1 | 0 | 1 | 0 | 0 | 0 | 0 | 1 | 0 | 8 | 8 | $\sqrt{8}$ | 0 |
| 20655 | 1 | 1 | 1 | 1 | 0 | 1 | 0 | 1 | 0 | 0 | 0 | 0 | 1 | 0 | 1 | 0 | 8 | 8 | $\sqrt{8}$ | 0 |
| 22440 | 0 | 0 | 0 | 1 | 0 | 1 | 0 | 1 | 1 | 1 | 1 | 0 | 1 | 0 | 1 | 0 | 8 | 8 | $\sqrt{8}$ | 0 |
| 24225 | 1 | 0 | 0 | 0 | 0 | 1 | 0 | 1 | 0 | 1 | 1 | 1 | 1 | 0 | 1 | 0 | 8 | 8 | $\sqrt{8}$ | 0 |
| 31365 | 1 | 0 | 1 | 0 | 0 | 0 | 0 | 1 | 0 | 1 | 0 | 1 | 1 | 1 | 1 | 0 | 8 | 8 | $\sqrt{8}$ | 0 |
| 34170 | 0 | 1 | 0 | 1 | 1 | 1 | 1 | 0 | 1 | 0 | 1 | 0 | 0 | 0 | 0 | 1 | 8 | 8 | $\sqrt{8}$ | 0 |
| 41310 | 0 | 1 | 1 | 1 | 1 | 0 | 1 | 0 | 1 | 0 | 0 | 0 | 0 | 1 | 0 | 1 | 8 | 8 | $\sqrt{8}$ | 0 |
| 43095 | 1 | 1 | 1 | 0 | 1 | 0 | 1 | 0 | 0 | 0 | 0 | 1 | 0 | 1 | 0 | 1 | 8 | 8 | $\sqrt{8}$ | 0 |
| 44880 | 0 | 0 | 0 | 0 | 1 | 0 | 1 | 0 | 1 | 1 | 1 | 1 | 0 | 1 | 0 | 1 | 8 | 8 | $\sqrt{8}$ | 0 |
| 48450 | 0 | 1 | 0 | 0 | 0 | 0 | 1 | 0 | 1 | 0 | 1 | 1 | 1 | 1 | 0 | 1 | 8 | 8 | $\sqrt{8}$ | 0 |
| 54315 | 1 | 1 | 0 | 1 | 0 | 1 | 0 | 0 | 0 | 0 | 1 | 0 | 1 | 0 | 1 | 1 | 8 | 8 | $\sqrt{8}$ | 0 |
| 59925 | 1 | 0 | 1 | 0 | 1 | 0 | 0 | 0 | 0 | 1 | 0 | 1 | 0 | 1 | 1 | 1 | 8 | 8 | $\sqrt{8}$ | 0 |
| 62730 | 0 | 1 | 0 | 1 | 0 | 0 | 0 | 0 | 1 | 0 | 1 | 0 | 1 | 1 | 1 | 1 | 8 | 8 | $\sqrt{8}$ | 0 |

TABLE 13

Set 7

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_N$ | min $d_R$ | min $d_g$ | $\rho$ |
|---|---|---|---|---|---|---|---|---|---|---|---|---|---|---|---|---|---|---|---|---|
| 3315  | 1 | 1 | 0 | 0 | 1 | 1 | 1 | 1 | 0 | 0 | 1 | 1 | 0 | 0 | 0 | 0 | 8 | 8 | $\sqrt{8}$ | 0 |
| 6630  | 0 | 1 | 1 | 0 | 0 | 1 | 1 | 1 | 1 | 0 | 0 | 1 | 1 | 0 | 0 | 0 | 8 | 8 | $\sqrt{8}$ | 0 |
| 12495 | 1 | 1 | 1 | 1 | 0 | 0 | 1 | 1 | 0 | 0 | 0 | 0 | 1 | 1 | 0 | 0 | 8 | 8 | $\sqrt{8}$ | 0 |
| 13260 | 0 | 0 | 1 | 1 | 0 | 0 | 1 | 1 | 1 | 1 | 0 | 0 | 1 | 1 | 0 | 0 | 8 | 8 | $\sqrt{8}$ | 0 |
| 15555 | 1 | 1 | 0 | 0 | 0 | 0 | 1 | 1 | 0 | 0 | 1 | 1 | 1 | 1 | 0 | 0 | 8 | 8 | $\sqrt{8}$ | 0 |
| 24990 | 0 | 1 | 1 | 1 | 1 | 0 | 0 | 1 | 1 | 0 | 0 | 0 | 0 | 1 | 1 | 0 | 8 | 8 | $\sqrt{8}$ | 0 |
| 26520 | 0 | 0 | 0 | 1 | 1 | 0 | 0 | 1 | 1 | 1 | 1 | 0 | 0 | 1 | 1 | 0 | 8 | 8 | $\sqrt{8}$ | 0 |
| 31110 | 0 | 1 | 1 | 0 | 0 | 0 | 0 | 1 | 1 | 0 | 0 | 1 | 1 | 1 | 1 | 0 | 8 | 8 | $\sqrt{8}$ | 0 |
| 34425 | 1 | 0 | 0 | 1 | 1 | 1 | 1 | 0 | 0 | 1 | 1 | 0 | 0 | 0 | 0 | 1 | 8 | 8 | $\sqrt{8}$ | 0 |
| 39015 | 1 | 1 | 1 | 0 | 0 | 1 | 1 | 0 | 0 | 0 | 0 | 1 | 1 | 0 | 0 | 1 | 8 | 8 | $\sqrt{8}$ | 0 |
| 40545 | 1 | 0 | 0 | 0 | 0 | 1 | 1 | 0 | 0 | 1 | 1 | 1 | 1 | 0 | 0 | 1 | 8 | 8 | $\sqrt{8}$ | 0 |
| 49980 | 0 | 0 | 1 | 1 | 1 | 1 | 0 | 0 | 1 | 1 | 0 | 0 | 0 | 0 | 1 | 1 | 8 | 8 | $\sqrt{8}$ | 0 |
| 52275 | 1 | 1 | 0 | 0 | 1 | 1 | 0 | 0 | 0 | 0 | 1 | 1 | 0 | 0 | 1 | 1 | 8 | 8 | $\sqrt{8}$ | 0 |
| 53040 | 0 | 0 | 0 | 0 | 1 | 1 | 0 | 0 | 1 | 1 | 1 | 1 | 0 | 0 | 1 | 1 | 8 | 8 | $\sqrt{8}$ | 0 |
| 58905 | 1 | 0 | 0 | 1 | 1 | 0 | 0 | 0 | 0 | 1 | 1 | 0 | 0 | 1 | 1 | 1 | 8 | 8 | $\sqrt{8}$ | 0 |
| 62220 | 0 | 0 | 1 | 1 | 0 | 0 | 0 | 0 | 1 | 1 | 0 | 0 | 1 | 1 | 1 | 1 | 8 | 8 | $\sqrt{8}$ | 0 |

TABLE 14

Set 8

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_N$ | min $d_R$ | min $d_g$ | $\rho$ |
|---|---|---|---|---|---|---|---|---|---|---|---|---|---|---|---|---|---|---|---|---|
| 3825 | 1 | 0 | 0 | 0 | 1 | 1 | 1 | 1 | 0 | 1 | 1 | 1 | 0 | 0 | 0 | 0 | 8 | 8 | $\sqrt{8}$ | 0 |
| 4335 | 1 | 1 | 1 | 1 | 0 | 1 | 1 | 1 | 0 | 0 | 0 | 0 | 1 | 0 | 0 | 0 | 8 | 8 | $\sqrt{8}$ | 0 |
| 7650 | 0 | 1 | 0 | 0 | 0 | 1 | 1 | 1 | 1 | 0 | 1 | 1 | 1 | 0 | 0 | 0 | 8 | 8 | $\sqrt{8}$ | 0 |
| 8670 | 0 | 1 | 1 | 1 | 1 | 0 | 1 | 1 | 1 | 0 | 0 | 0 | 1 | 0 | 0 | 0 | 8 | 8 | $\sqrt{8}$ | 0 |
| 15300 | 0 | 0 | 1 | 0 | 0 | 0 | 1 | 1 | 1 | 1 | 0 | 1 | 1 | 1 | 0 | 0 | 8 | 8 | $\sqrt{8}$ | 0 |
| 17340 | 0 | 0 | 1 | 1 | 1 | 1 | 0 | 1 | 1 | 1 | 0 | 0 | 0 | 0 | 1 | 0 | 8 | 8 | $\sqrt{8}$ | 0 |
| 30600 | 0 | 0 | 0 | 1 | 0 | 0 | 0 | 1 | 1 | 1 | 1 | 0 | 1 | 1 | 1 | 0 | 8 | 8 | $\sqrt{8}$ | 0 |
| 30855 | 1 | 1 | 1 | 0 | 0 | 0 | 1 | 0 | 0 | 0 | 1 | 1 | 1 | 1 | 0 | 0 | 8 | 8 | $\sqrt{8}$ | 0 |
| 34680 | 0 | 0 | 0 | 1 | 1 | 1 | 0 | 1 | 1 | 1 | 0 | 0 | 0 | 0 | 1 | 0 | 8 | 8 | $\sqrt{8}$ | 0 |
| 34935 | 1 | 1 | 1 | 0 | 1 | 1 | 1 | 0 | 0 | 0 | 1 | 0 | 0 | 0 | 0 | 1 | 8 | 8 | $\sqrt{8}$ | 0 |
| 48195 | 1 | 1 | 0 | 0 | 0 | 0 | 1 | 0 | 0 | 0 | 1 | 1 | 1 | 1 | 0 | 1 | 8 | 8 | $\sqrt{8}$ | 0 |
| 50235 | 1 | 1 | 0 | 1 | 1 | 1 | 0 | 0 | 0 | 0 | 1 | 0 | 0 | 0 | 1 | 1 | 8 | 8 | $\sqrt{8}$ | 0 |
| 56865 | 1 | 0 | 0 | 0 | 0 | 1 | 0 | 0 | 0 | 1 | 1 | 1 | 1 | 0 | 1 | 1 | 8 | 8 | $\sqrt{8}$ | 0 |
| 57885 | 1 | 0 | 1 | 1 | 1 | 0 | 0 | 0 | 0 | 1 | 1 | 0 | 0 | 1 | 1 | 1 | 8 | 8 | $\sqrt{8}$ | 0 |
| 61200 | 0 | 0 | 0 | 0 | 1 | 0 | 0 | 0 | 1 | 1 | 1 | 1 | 0 | 1 | 1 | 1 | 8 | 8 | $\sqrt{8}$ | 0 |
| 61710 | 0 | 1 | 1 | 1 | 0 | 0 | 0 | 0 | 1 | 0 | 0 | 0 | 1 | 1 | 1 | 1 | 8 | 8 | $\sqrt{8}$ | 0 |

TABLE 15

Set 9

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_N$ | min $d_R$ | min $d_g$ | $\rho$ |
|---|---|---|---|---|---|---|---|---|---|---|---|---|---|---|---|---|---|---|---|---|
| 4845 | 1 | 0 | 1 | 1 | 0 | 1 | 1 | 1 | 0 | 1 | 0 | 0 | 1 | 0 | 0 | 0 | 8 | 8 | $\sqrt{8}$ | 0 |
| 9690 | 0 | 1 | 0 | 1 | 1 | 0 | 1 | 1 | 1 | 0 | 1 | 0 | 0 | 1 | 0 | 0 | 8 | 8 | $\sqrt{8}$ | 0 |
| 11985 | 1 | 0 | 0 | 0 | 1 | 0 | 1 | 1 | 0 | 1 | 1 | 0 | 1 | 0 | 0 | 0 | 8 | 8 | $\sqrt{8}$ | 0 |
| 27595 | 1 | 1 | 0 | 1 | 1 | 1 | 0 | 1 | 0 | 0 | 1 | 0 | 0 | 0 | 1 | 0 | 8 | 8 | $\sqrt{8}$ | 0 |
| 19380 | 0 | 0 | 1 | 0 | 1 | 1 | 0 | 1 | 1 | 1 | 0 | 1 | 0 | 0 | 1 | 0 | 8 | 8 | $\sqrt{8}$ | 0 |
| 23070 | 0 | 1 | 0 | 0 | 0 | 1 | 0 | 1 | 1 | 0 | 1 | 1 | 1 | 0 | 1 | 0 | 8 | 8 | $\sqrt{8}$ | 0 |
| 26775 | 1 | 1 | 1 | 0 | 1 | 0 | 0 | 1 | 0 | 0 | 0 | 1 | 1 | 0 | 1 | 0 | 8 | 8 | $\sqrt{8}$ | 0 |
| 30345 | 1 | 0 | 0 | 1 | 0 | 0 | 0 | 1 | 0 | 1 | 1 | 0 | 1 | 1 | 1 | 0 | 8 | 8 | $\sqrt{8}$ | 0 |
| 35190 | 0 | 1 | 1 | 0 | 1 | 1 | 1 | 0 | 1 | 0 | 0 | 1 | 0 | 0 | 0 | 1 | 8 | 8 | $\sqrt{8}$ | 0 |
| 38760 | 0 | 0 | 0 | 1 | 0 | 1 | 1 | 0 | 1 | 1 | 1 | 0 | 1 | 0 | 0 | 1 | 8 | 8 | $\sqrt{8}$ | 0 |
| 41565 | 1 | 0 | 1 | 1 | 1 | 0 | 1 | 0 | 0 | 1 | 0 | 0 | 0 | 1 | 0 | 1 | 8 | 8 | $\sqrt{8}$ | 0 |
| 46155 | 1 | 1 | 0 | 1 | 0 | 0 | 1 | 0 | 0 | 0 | 1 | 0 | 1 | 1 | 0 | 1 | 8 | 8 | $\sqrt{8}$ | 0 |
| 47940 | 0 | 0 | 1 | 0 | 0 | 0 | 1 | 0 | 1 | 1 | 0 | 1 | 1 | 0 | 1 | 1 | 8 | 8 | $\sqrt{8}$ | 0 |
| 53550 | 0 | 1 | 1 | 1 | 0 | 1 | 0 | 0 | 1 | 0 | 0 | 1 | 0 | 1 | 1 | 1 | 8 | 8 | $\sqrt{8}$ | 0 |
| 55845 | 1 | 0 | 1 | 0 | 0 | 1 | 0 | 0 | 0 | 1 | 0 | 1 | 1 | 0 | 1 | 1 | 8 | 8 | $\sqrt{8}$ | 0 |
| 60690 | 0 | 1 | 0 | 0 | 1 | 0 | 0 | 0 | 1 | 0 | 1 | 1 | 0 | 1 | 1 | 1 | 8 | 8 | $\sqrt{8}$ | 0 |

TABLE 16

Set 10

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_N$ | min $d_R$ | min $d_g$ | $\rho$ |
|---|---|---|---|---|---|---|---|---|---|---|---|---|---|---|---|---|---|---|---|---|
| 5355 | 1 | 1 | 0 | 1 | 0 | 1 | 1 | 1 | 0 | 0 | 1 | 0 | 1 | 0 | 0 | 0 | 8 | 8 | $\sqrt{8}$ | 0 |
| 10710 | 0 | 1 | 1 | 0 | 1 | 0 | 1 | 1 | 1 | 0 | 0 | 1 | 0 | 1 | 0 | 0 | 8 | 8 | $\sqrt{8}$ | 0 |
| 15045 | 1 | 0 | 1 | 0 | 0 | 0 | 1 | 1 | 0 | 1 | 0 | 1 | 1 | 1 | 0 | 0 | 8 | 8 | $\sqrt{8}$ | 0 |
| 20145 | 1 | 0 | 0 | 0 | 1 | 1 | 0 | 1 | 0 | 1 | 1 | 1 | 0 | 0 | 1 | 0 | 8 | 8 | $\sqrt{8}$ | 0 |
| 21420 | 0 | 0 | 1 | 1 | 0 | 1 | 0 | 1 | 1 | 1 | 0 | 0 | 1 | 0 | 1 | 0 | 8 | 8 | $\sqrt{8}$ | 0 |
| 22695 | 1 | 1 | 1 | 0 | 0 | 1 | 0 | 1 | 0 | 0 | 0 | 1 | 1 | 0 | 1 | 0 | 8 | 8 | $\sqrt{8}$ | 0 |
| 25245 | 1 | 0 | 1 | 1 | 1 | 0 | 0 | 1 | 0 | 0 | 0 | 1 | 1 | 0 | 1 | 0 | 8 | 8 | $\sqrt{8}$ | 0 |
| 30090 | 0 | 1 | 0 | 1 | 0 | 0 | 0 | 1 | 1 | 0 | 1 | 0 | 1 | 1 | 1 | 0 | 8 | 8 | $\sqrt{8}$ | 0 |
| 35445 | 1 | 0 | 1 | 0 | 1 | 1 | 1 | 0 | 0 | 1 | 0 | 1 | 0 | 0 | 0 | 1 | 8 | 8 | $\sqrt{8}$ | 0 |
| 40290 | 0 | 1 | 0 | 0 | 0 | 1 | 1 | 0 | 1 | 0 | 1 | 1 | 1 | 0 | 0 | 1 | 8 | 8 | $\sqrt{8}$ | 0 |
| 42840 | 0 | 0 | 0 | 1 | 1 | 0 | 1 | 0 | 1 | 1 | 0 | 0 | 1 | 0 | 1 | 1 | 8 | 8 | $\sqrt{8}$ | 0 |
| 44113 | 1 | 1 | 0 | 0 | 1 | 0 | 1 | 0 | 0 | 0 | 1 | 0 | 1 | 0 | 1 | 1 | 8 | 8 | $\sqrt{8}$ | 0 |
| 45390 | 0 | 1 | 1 | 1 | 0 | 0 | 1 | 0 | 0 | 0 | 1 | 1 | 0 | 1 | 1 | 1 | 8 | 8 | $\sqrt{8}$ | 0 |
| 50490 | 0 | 1 | 0 | 1 | 1 | 1 | 0 | 0 | 1 | 0 | 1 | 0 | 0 | 1 | 1 | 1 | 8 | 8 | $\sqrt{8}$ | 0 |
| 54825 | 1 | 0 | 0 | 1 | 0 | 1 | 0 | 0 | 0 | 1 | 0 | 1 | 0 | 1 | 1 | 1 | 8 | 8 | $\sqrt{8}$ | 0 |
| 60180 | 0 | 0 | 1 | 0 | 1 | 0 | 0 | 0 | 1 | 1 | 0 | 1 | 0 | 1 | 1 | 1 | 8 | 8 | $\sqrt{8}$ | 0 |

TABLE 17

Set 11

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_N$ | min $d_R$ | min $d_g$ | $\rho$ |
|---|---|---|---|---|---|---|---|---|---|---|---|---|---|---|---|---|---|---|---|---|
| 5865 | 1 | 0 | 0 | 1 | 0 | 1 | 1 | 1 | 0 | 1 | 1 | 0 | 1 | 0 | 0 | 0 | 8 | 8 | $\sqrt{8}$ | 0 |
| 8925 | 1 | 0 | 1 | 1 | 1 | 0 | 1 | 1 | 0 | 1 | 0 | 0 | 0 | 1 | 0 | 0 | 8 | 8 | $\sqrt{8}$ | 0 |
| 11730 | 0 | 1 | 0 | 0 | 1 | 0 | 1 | 1 | 1 | 0 | 1 | 1 | 0 | 1 | 0 | 0 | 8 | 8 | $\sqrt{8}$ | 0 |
| 17850 | 0 | 1 | 0 | 1 | 1 | 1 | 0 | 1 | 1 | 0 | 1 | 0 | 0 | 0 | 1 | 0 | 8 | 8 | $\sqrt{8}$ | 0 |
| 18615 | 1 | 1 | 1 | 1 | 1 | 1 | 0 | 1 | 0 | 0 | 0 | 1 | 0 | 0 | 1 | 0 | 8 | 8 | $\sqrt{8}$ | 0 |
| 23460 | 0 | 0 | 1 | 0 | 0 | 1 | 0 | 1 | 1 | 1 | 0 | 1 | 1 | 0 | 1 | 0 | 8 | 8 | $\sqrt{8}$ | 0 |
| 28305 | 1 | 0 | 0 | 0 | 1 | 0 | 0 | 1 | 0 | 1 | 1 | 1 | 0 | 1 | 1 | 0 | 8 | 8 | $\sqrt{8}$ | 0 |
| 29835 | 1 | 1 | 0 | 1 | 0 | 0 | 0 | 1 | 0 | 0 | 1 | 0 | 1 | 1 | 1 | 0 | 8 | 8 | $\sqrt{8}$ | 0 |
| 35700 | 0 | 0 | 1 | 0 | 1 | 1 | 1 | 0 | 1 | 1 | 0 | 1 | 0 | 0 | 0 | 1 | 8 | 8 | $\sqrt{8}$ | 0 |
| 37230 | 0 | 1 | 1 | 1 | 0 | 1 | 1 | 0 | 1 | 0 | 0 | 1 | 0 | 0 | 0 | 1 | 8 | 8 | $\sqrt{8}$ | 0 |
| 42075 | 1 | 1 | 0 | 1 | 1 | 0 | 1 | 0 | 0 | 0 | 1 | 0 | 0 | 1 | 0 | 1 | 8 | 8 | $\sqrt{8}$ | 0 |
| 46920 | 0 | 0 | 0 | 1 | 0 | 0 | 1 | 0 | 1 | 1 | 1 | 0 | 1 | 1 | 0 | 1 | 8 | 8 | $\sqrt{8}$ | 0 |
| 47685 | 1 | 0 | 1 | 0 | 0 | 0 | 1 | 0 | 0 | 1 | 0 | 1 | 1 | 1 | 0 | 1 | 8 | 8 | $\sqrt{8}$ | 0 |
| 53805 | 1 | 0 | 1 | 1 | 0 | 1 | 0 | 0 | 0 | 1 | 0 | 0 | 1 | 0 | 1 | 1 | 8 | 8 | $\sqrt{8}$ | 0 |
| 56610 | 0 | 1 | 0 | 0 | 0 | 1 | 0 | 0 | 1 | 0 | 1 | 1 | 1 | 0 | 1 | 1 | 8 | 8 | $\sqrt{8}$ | 0 |
| 59670 | 0 | 1 | 1 | 0 | 1 | 0 | 0 | 0 | 1 | 0 | 0 | 1 | 0 | 1 | 1 | 1 | 8 | 8 | $\sqrt{8}$ | 0 |

TABLE 18

Set 12

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_N$ | min $d_R$ | min $d_g$ | $\rho$ |
|---|---|---|---|---|---|---|---|---|---|---|---|---|---|---|---|---|---|---|---|---|
| 6375 | 1 | 1 | 1 | 0 | 0 | 1 | 1 | 1 | 0 | 0 | 0 | 1 | 1 | 0 | 0 | 0 | 8 | 8 | $\sqrt{8}$ | 0 |
| 7395 | 1 | 1 | 0 | 0 | 0 | 1 | 1 | 1 | 0 | 1 | 1 | 1 | 0 | 0 | 0 | 0 | 8 | 8 | $\sqrt{8}$ | 0 |
| 12750 | 0 | 1 | 1 | 1 | 0 | 0 | 1 | 1 | 1 | 0 | 0 | 0 | 1 | 1 | 0 | 0 | 8 | 8 | $\sqrt{8}$ | 0 |
| 14535 | 1 | 1 | 1 | 0 | 0 | 1 | 1 | 0 | 0 | 0 | 1 | 1 | 1 | 0 | 0 | 0 | 8 | 8 | $\sqrt{8}$ | 0 |
| 14790 | 0 | 1 | 1 | 0 | 0 | 0 | 1 | 1 | 1 | 0 | 1 | 1 | 1 | 0 | 0 | 0 | 8 | 8 | $\sqrt{8}$ | 0 |
| 25500 | 0 | 0 | 1 | 1 | 1 | 0 | 0 | 1 | 1 | 1 | 0 | 0 | 0 | 1 | 1 | 0 | 8 | 8 | $\sqrt{8}$ | 0 |
| 29070 | 0 | 1 | 1 | 1 | 0 | 0 | 0 | 1 | 1 | 0 | 0 | 0 | 1 | 1 | 1 | 0 | 8 | 8 | $\sqrt{8}$ | 0 |
| 29580 | 0 | 0 | 1 | 1 | 0 | 0 | 0 | 1 | 1 | 1 | 0 | 0 | 1 | 1 | 1 | 0 | 8 | 8 | $\sqrt{8}$ | 0 |
| 35955 | 1 | 1 | 0 | 0 | 1 | 1 | 1 | 0 | 0 | 0 | 1 | 1 | 0 | 0 | 0 | 1 | 8 | 8 | $\sqrt{8}$ | 0 |
| 36465 | 1 | 0 | 0 | 0 | 1 | 1 | 1 | 0 | 0 | 1 | 1 | 1 | 0 | 0 | 0 | 1 | 8 | 8 | $\sqrt{8}$ | 0 |
| 40035 | 1 | 1 | 0 | 0 | 0 | 1 | 1 | 0 | 0 | 1 | 1 | 1 | 0 | 0 | 0 | 1 | 8 | 8 | $\sqrt{8}$ | 0 |
| 50745 | 1 | 0 | 0 | 1 | 1 | 1 | 0 | 0 | 0 | 1 | 1 | 0 | 0 | 0 | 1 | 1 | 8 | 8 | $\sqrt{8}$ | 0 |
| 51000 | 0 | 0 | 0 | 1 | 1 | 1 | 0 | 0 | 1 | 1 | 1 | 0 | 0 | 0 | 1 | 1 | 8 | 8 | $\sqrt{8}$ | 0 |
| 52785 | 1 | 0 | 0 | 0 | 1 | 1 | 0 | 0 | 0 | 1 | 1 | 0 | 0 | 1 | 1 | 1 | 8 | 8 | $\sqrt{8}$ | 0 |
| 58140 | 0 | 0 | 1 | 1 | 1 | 0 | 0 | 0 | 1 | 1 | 0 | 0 | 1 | 0 | 1 | 1 | 8 | 8 | $\sqrt{8}$ | 0 |
| 59160 | 0 | 0 | 0 | 1 | 1 | 0 | 0 | 0 | 1 | 1 | 1 | 0 | 0 | 1 | 1 | 1 | 8 | 8 | $\sqrt{8}$ | 0 |

TABLE 19

Set 13

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_N$ | min $d_R$ | min $d_g$ | $\rho$ |
|---|---|---|---|---|---|---|---|---|---|---|---|---|---|---|---|---|---|---|---|---|
| 6885 | 1 | 0 | 1 | 0 | 0 | 1 | 1 | 1 | 0 | 1 | 0 | 1 | 1 | 0 | 0 | 0 | 8 | 8 | $\sqrt{8}$ | 0 |
| 10355 | 1 | 1 | 1 | 0 | 1 | 0 | 1 | 1 | 0 | 0 | 0 | 1 | 0 | 1 | 0 | 0 | 8 | 8 | $\sqrt{8}$ | 0 |
| 13770 | 0 | 1 | 0 | 1 | 0 | 0 | 1 | 1 | 1 | 0 | 1 | 0 | 1 | 1 | 0 | 0 | 8 | 8 | $\sqrt{8}$ | 0 |
| 18103 | 1 | 0 | 0 | 1 | 1 | 1 | 0 | 1 | 0 | 1 | 0 | 0 | 0 | 1 | 0 | 0 | 8 | 8 | $\sqrt{8}$ | 0 |
| 20910 | 0 | 1 | 1 | 1 | 0 | 1 | 0 | 1 | 1 | 0 | 0 | 0 | 1 | 0 | 1 | 0 | 8 | 8 | $\sqrt{8}$ | 0 |
| 23715 | 1 | 1 | 0 | 0 | 0 | 1 | 0 | 1 | 0 | 0 | 1 | 1 | 1 | 0 | 1 | 0 | 8 | 8 | $\sqrt{8}$ | 0 |
| 27540 | 0 | 0 | 1 | 0 | 1 | 0 | 0 | 1 | 1 | 1 | 0 | 1 | 0 | 1 | 1 | 0 | 8 | 8 | $\sqrt{8}$ | 0 |
| 29325 | 1 | 0 | 1 | 1 | 0 | 0 | 0 | 1 | 0 | 1 | 0 | 0 | 1 | 1 | 1 | 0 | 8 | 8 | $\sqrt{8}$ | 0 |
| 36210 | 0 | 1 | 0 | 0 | 1 | 1 | 1 | 0 | 1 | 0 | 1 | 1 | 0 | 0 | 0 | 1 | 8 | 8 | $\sqrt{8}$ | 0 |
| 37995 | 1 | 1 | 0 | 1 | 0 | 1 | 1 | 0 | 0 | 0 | 1 | 0 | 1 | 0 | 0 | 1 | 8 | 8 | $\sqrt{8}$ | 0 |
| 41820 | 0 | 0 | 1 | 1 | 1 | 0 | 1 | 0 | 1 | 1 | 0 | 0 | 0 | 1 | 0 | 1 | 8 | 8 | $\sqrt{8}$ | 0 |
| 44625 | 1 | 0 | 0 | 0 | 1 | 0 | 1 | 0 | 0 | 1 | 1 | 0 | 1 | 0 | 1 | 1 | 8 | 8 | $\sqrt{8}$ | 0 |
| 47430 | 0 | 1 | 1 | 0 | 0 | 0 | 1 | 0 | 0 | 0 | 1 | 1 | 0 | 1 | 1 | 1 | 8 | 8 | $\sqrt{8}$ | 0 |
| 51765 | 1 | 0 | 1 | 0 | 1 | 1 | 0 | 0 | 1 | 0 | 1 | 0 | 0 | 1 | 1 | 1 | 8 | 8 | $\sqrt{8}$ | 0 |
| 55080 | 0 | 0 | 0 | 1 | 0 | 1 | 0 | 0 | 1 | 1 | 0 | 1 | 0 | 1 | 1 | 1 | 8 | 8 | $\sqrt{8}$ | 0 |
| 58650 | 0 | 1 | 0 | 1 | 1 | 0 | 0 | 0 | 1 | 0 | 1 | 0 | 0 | 1 | 1 | 1 | 8 | 8 | $\sqrt{8}$ | 0 |

TABLE 20

Set 14

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_N$ | min $d_R$ | min $d_g$ | $\rho$ |
|---|---|---|---|---|---|---|---|---|---|---|---|---|---|---|---|---|---|---|---|---|
| 9235  | 1 | 1 | 0 | 1 | 1 | 0 | 1 | 1 | 0 | 0 | 1 | 0 | 0 | 1 | 0 | 0 | 8 | 8 | $\sqrt{8}$ | 0 |
| 9945  | 1 | 0 | 0 | 1 | 1 | 0 | 1 | 1 | 0 | 1 | 1 | 0 | 0 | 1 | 0 | 0 | 8 | 8 | $\sqrt{8}$ | 0 |
| 14025 | 1 | 0 | 0 | 1 | 0 | 0 | 1 | 1 | 0 | 1 | 1 | 0 | 1 | 1 | 0 | 0 | 8 | 8 | $\sqrt{8}$ | 0 |
| 18870 | 0 | 1 | 1 | 0 | 1 | 1 | 0 | 1 | 1 | 0 | 0 | 1 | 0 | 0 | 1 | 0 | 8 | 8 | $\sqrt{8}$ | 0 |
| 19890 | 0 | 1 | 0 | 0 | 1 | 1 | 0 | 1 | 1 | 0 | 1 | 1 | 0 | 0 | 1 | 0 | 8 | 8 | $\sqrt{8}$ | 0 |
| 25755 | 1 | 1 | 0 | 1 | 1 | 0 | 0 | 1 | 0 | 0 | 1 | 0 | 0 | 1 | 1 | 0 | 8 | 8 | $\sqrt{8}$ | 0 |
| 27795 | 1 | 1 | 0 | 0 | 1 | 0 | 0 | 1 | 0 | 0 | 1 | 1 | 0 | 1 | 1 | 0 | 8 | 8 | $\sqrt{8}$ | 0 |
| 28050 | 0 | 1 | 0 | 0 | 1 | 0 | 0 | 1 | 1 | 0 | 1 | 1 | 0 | 1 | 1 | 0 | 8 | 8 | $\sqrt{8}$ | 0 |
| 37485 | 1 | 0 | 1 | 1 | 0 | 1 | 1 | 0 | 0 | 1 | 0 | 0 | 1 | 0 | 0 | 1 | 8 | 8 | $\sqrt{8}$ | 0 |
| 37740 | 0 | 0 | 1 | 1 | 0 | 1 | 1 | 0 | 1 | 1 | 0 | 0 | 1 | 0 | 0 | 1 | 8 | 8 | $\sqrt{8}$ | 0 |
| 39780 | 0 | 0 | 1 | 0 | 0 | 1 | 1 | 0 | 1 | 1 | 0 | 1 | 1 | 0 | 0 | 1 | 8 | 8 | $\sqrt{8}$ | 0 |
| 45645 | 1 | 0 | 1 | 1 | 0 | 0 | 1 | 0 | 0 | 1 | 0 | 0 | 1 | 1 | 0 | 1 | 8 | 8 | $\sqrt{8}$ | 0 |
| 46665 | 1 | 0 | 0 | 1 | 0 | 0 | 1 | 0 | 0 | 1 | 1 | 0 | 1 | 1 | 0 | 1 | 8 | 8 | $\sqrt{8}$ | 0 |
| 51510 | 0 | 1 | 1 | 0 | 1 | 1 | 0 | 0 | 1 | 0 | 0 | 1 | 0 | 0 | 1 | 1 | 8 | 8 | $\sqrt{8}$ | 0 |
| 55590 | 0 | 1 | 1 | 0 | 0 | 1 | 0 | 0 | 1 | 0 | 0 | 1 | 1 | 0 | 1 | 1 | 8 | 8 | $\sqrt{8}$ | 0 |
| 56100 | 0 | 0 | 1 | 0 | 0 | 1 | 0 | 0 | 1 | 1 | 0 | 1 | 1 | 0 | 1 | 1 | 8 | 8 | $\sqrt{8}$ | 0 |

TABLE 21

Set 15

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_N$ | min $d_R$ | min $d_g$ | $\rho$ |
|---|---|---|---|---|---|---|---|---|---|---|---|---|---|---|---|---|---|---|---|---|
| 10965 | 1 | 0 | 1 | 0 | 1 | 0 | 1 | 1 | 0 | 1 | 0 | 1 | 0 | 1 | 0 | 0 | 8 | 8 | $\sqrt{8}$ | 0 |
| 19125 | 1 | 0 | 1 | 0 | 1 | 1 | 0 | 1 | 0 | 1 | 0 | 1 | 0 | 0 | 1 | 0 | 8 | 8 | $\sqrt{8}$ | 0 |
| 21163 | 1 | 0 | 1 | 1 | 0 | 0 | 1 | 0 | 1 | 0 | 0 | 1 | 0 | 1 | 1 | 0 | 8 | 8 | $\sqrt{8}$ | 0 |
| 21675 | 1 | 1 | 0 | 1 | 0 | 1 | 0 | 1 | 0 | 0 | 1 | 0 | 1 | 0 | 1 | 0 | 8 | 8 | $\sqrt{8}$ | 0 |
| 21930 | 0 | 1 | 0 | 1 | 0 | 1 | 0 | 1 | 1 | 0 | 1 | 0 | 1 | 0 | 1 | 0 | 8 | 8 | $\sqrt{8}$ | 0 |
| 22185 | 1 | 0 | 0 | 1 | 0 | 1 | 0 | 1 | 0 | 1 | 1 | 0 | 1 | 0 | 1 | 0 | 8 | 8 | $\sqrt{8}$ | 0 |
| 23205 | 1 | 0 | 1 | 0 | 0 | 1 | 0 | 1 | 0 | 1 | 1 | 0 | 1 | 1 | 0 | 0 | 8 | 8 | $\sqrt{8}$ | 0 |
| 27285 | 1 | 0 | 1 | 0 | 1 | 0 | 0 | 1 | 0 | 1 | 0 | 1 | 1 | 1 | 0 | 0 | 8 | 8 | $\sqrt{8}$ | 0 |
| 38250 | 0 | 1 | 0 | 1 | 0 | 1 | 1 | 0 | 1 | 0 | 1 | 0 | 1 | 0 | 0 | 1 | 8 | 8 | $\sqrt{8}$ | 0 |
| 42330 | 0 | 1 | 0 | 1 | 1 | 0 | 1 | 0 | 1 | 0 | 0 | 1 | 0 | 1 | 0 | 1 | 8 | 8 | $\sqrt{8}$ | 0 |
| 43350 | 0 | 1 | 1 | 0 | 1 | 0 | 1 | 0 | 1 | 0 | 0 | 1 | 0 | 1 | 0 | 1 | 8 | 8 | $\sqrt{8}$ | 0 |
| 43605 | 1 | 0 | 1 | 0 | 1 | 0 | 1 | 0 | 0 | 1 | 0 | 1 | 0 | 1 | 0 | 1 | 8 | 8 | $\sqrt{8}$ | 0 |
| 43860 | 0 | 0 | 1 | 0 | 1 | 0 | 1 | 1 | 1 | 0 | 1 | 0 | 1 | 0 | 0 | 1 | 8 | 8 | $\sqrt{8}$ | 0 |
| 44370 | 0 | 1 | 0 | 0 | 1 | 0 | 1 | 0 | 1 | 1 | 0 | 1 | 0 | 1 | 0 | 1 | 8 | 8 | $\sqrt{8}$ | 0 |
| 46410 | 0 | 1 | 0 | 1 | 0 | 0 | 1 | 0 | 1 | 0 | 0 | 1 | 1 | 0 | 1 | 1 | 8 | 8 | $\sqrt{8}$ | 0 |
| 54570 | 0 | 1 | 0 | 1 | 0 | 1 | 0 | 0 | 1 | 0 | 1 | 0 | 1 | 0 | 1 | 1 | 8 | 8 | $\sqrt{8}$ | 0 |

TABLE 22

Set 16

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_N$ | min $d_R$ | min $d_g$ | $\rho$ |
|---|---|---|---|---|---|---|---|---|---|---|---|---|---|---|---|---|---|---|---|---|
| 11475 | 1 | 1 | 0 | 0 | 1 | 0 | 1 | 1 | 0 | 0 | 1 | 1 | 0 | 1 | 0 | 0 | 8 | 8 | $\sqrt{8}$ | 0 |
| 13005 | 1 | 0 | 1 | 1 | 0 | 0 | 1 | 1 | 0 | 1 | 0 | 0 | 1 | 1 | 0 | 0 | 8 | 8 | $\sqrt{8}$ | 0 |
| 13515 | 1 | 1 | 0 | 1 | 0 | 0 | 1 | 1 | 0 | 0 | 1 | 0 | 1 | 1 | 0 | 0 | 8 | 8 | $\sqrt{8}$ | 0 |
| 19635 | 1 | 1 | 0 | 0 | 1 | 1 | 0 | 1 | 0 | 0 | 1 | 1 | 0 | 0 | 1 | 0 | 8 | 8 | $\sqrt{8}$ | 0 |
| 22950 | 0 | 1 | 1 | 0 | 0 | 1 | 0 | 1 | 1 | 0 | 1 | 1 | 0 | 1 | 0 | 0 | 8 | 8 | $\sqrt{8}$ | 0 |
| 26010 | 0 | 1 | 0 | 1 | 1 | 0 | 0 | 1 | 1 | 0 | 1 | 0 | 0 | 1 | 1 | 0 | 8 | 8 | $\sqrt{8}$ | 0 |
| 26265 | 1 | 0 | 0 | 1 | 1 | 0 | 0 | 1 | 0 | 1 | 1 | 0 | 0 | 1 | 1 | 0 | 8 | 8 | $\sqrt{8}$ | 0 |
| 27030 | 0 | 1 | 1 | 0 | 1 | 0 | 0 | 1 | 1 | 0 | 1 | 0 | 1 | 1 | 0 | 0 | 8 | 8 | $\sqrt{8}$ | 0 |
| 38505 | 1 | 0 | 0 | 1 | 0 | 1 | 1 | 0 | 0 | 1 | 1 | 0 | 1 | 0 | 0 | 1 | 8 | 8 | $\sqrt{8}$ | 0 |
| 39270 | 0 | 1 | 1 | 0 | 0 | 1 | 1 | 0 | 1 | 0 | 0 | 1 | 1 | 0 | 0 | 1 | 8 | 8 | $\sqrt{8}$ | 0 |
| 39525 | 1 | 0 | 1 | 0 | 0 | 1 | 1 | 0 | 0 | 1 | 0 | 1 | 1 | 0 | 0 | 1 | 8 | 8 | $\sqrt{8}$ | 0 |
| 42585 | 1 | 0 | 0 | 1 | 1 | 0 | 1 | 0 | 0 | 1 | 0 | 0 | 1 | 0 | 1 | 1 | 8 | 8 | $\sqrt{8}$ | 0 |
| 45900 | 0 | 0 | 1 | 1 | 0 | 0 | 1 | 0 | 1 | 1 | 0 | 0 | 1 | 1 | 0 | 1 | 8 | 8 | $\sqrt{8}$ | 0 |
| 52020 | 0 | 0 | 1 | 0 | 1 | 1 | 0 | 0 | 1 | 1 | 0 | 1 | 0 | 0 | 1 | 1 | 8 | 8 | $\sqrt{8}$ | 0 |
| 52530 | 0 | 1 | 0 | 0 | 1 | 1 | 0 | 1 | 0 | 1 | 1 | 0 | 0 | 1 | 0 | 1 | 8 | 8 | $\sqrt{8}$ | 0 |
| 54060 | 0 | 0 | 1 | 1 | 0 | 1 | 0 | 0 | 1 | 1 | 0 | 0 | 1 | 0 | 1 | 1 | 8 | 8 | $\sqrt{8}$ | 0 |

Table 23 shows contents on non-coherent sequences according to an exemplary embodiment. A number of repetitions of a basic sequence may correspond to a length of a sequence and a number of elements 1 in the sequence.

TABLE 23

| Label | Basic Sequence | Repetition | Length | Number of 1s |
|---|---|---|---|---|
| OOK-2 or ½-OOK | 1 0 | 32 | 64 | 32 |
| OOK-4 or ¼-OOK | 1 0 0 1 | 32 | 128 | 64 |
| OOK-8 or ⅛-OOK | 1 0 1 0 0 1 0 1 | 32 | 256 | 128 |
| OOK-16 or ¹⁄₁₆-OOK | 1 0 1 0 1 0 1 0 0 1 0 1 0 1 0 1 | 32 | 512 | 256 |

The non-coherent sequences may be equivalent in a non-coherent mode. A result sequence indicating a result of an envelope detector being applied to a ternary sequence in a receiver may correspond to the non-coherent sequence of Table 23. In a coherent mode, elements 1 of the non-coherent sequence may be elements $\{1$ or $-1\}$. Elements 0 of the non-coherent sequence do not change.

The ternary sequence being acquired from the non-coherent sequence may result in the following.

a. Elements or alphabets of the ternary sequence may be $\{-1, 0, 1\}$.

b. Positions of elements 0 may be set based on the non-coherent sequence of Table 23.

c. Elements 1 of the non-coherent sequence may have values of $\{-1, 1\}$.

d. Thus, ternary sequences for all modes, for example, on-off keying (OOK)-2, OOK-4, OOK-8 and OOK-16 may be required to have good correlation properties.

A ternary sequence with which a correlation is established may have a length sufficient to acquire a good processing gain. In a low-power communication, the length of the ternary sequence may be set not to cause an excessive usage of a memory. In an exemplary embodiment, the length of the ternary sequence may be, for example, 16, 32, or 64 bits. A ternary designing method in a case in which the length of the ternary sequence is 16 bits may be the same as that of a case in which the length of the ternary sequence is 32 bits, and this may be verified through an approach based search. When a 64 bits ternary sequence is designed using a method the same as those of a 16 bits ternary sequence and a 32 bits ternary sequence, a search space may increase and thus, a time consumption of the ternary sequence may also increase. Thus, a different method may be applied to design the 64-bits ternary sequence.

The length of the ternary sequence may determine a period of the ternary sequence. A plurality of periods may be used to improve a synchronization performance of the ternary sequence.

A method of designing a 16 bits ternary sequence and a 32 bits ternary sequence is described below.

Figure 2:
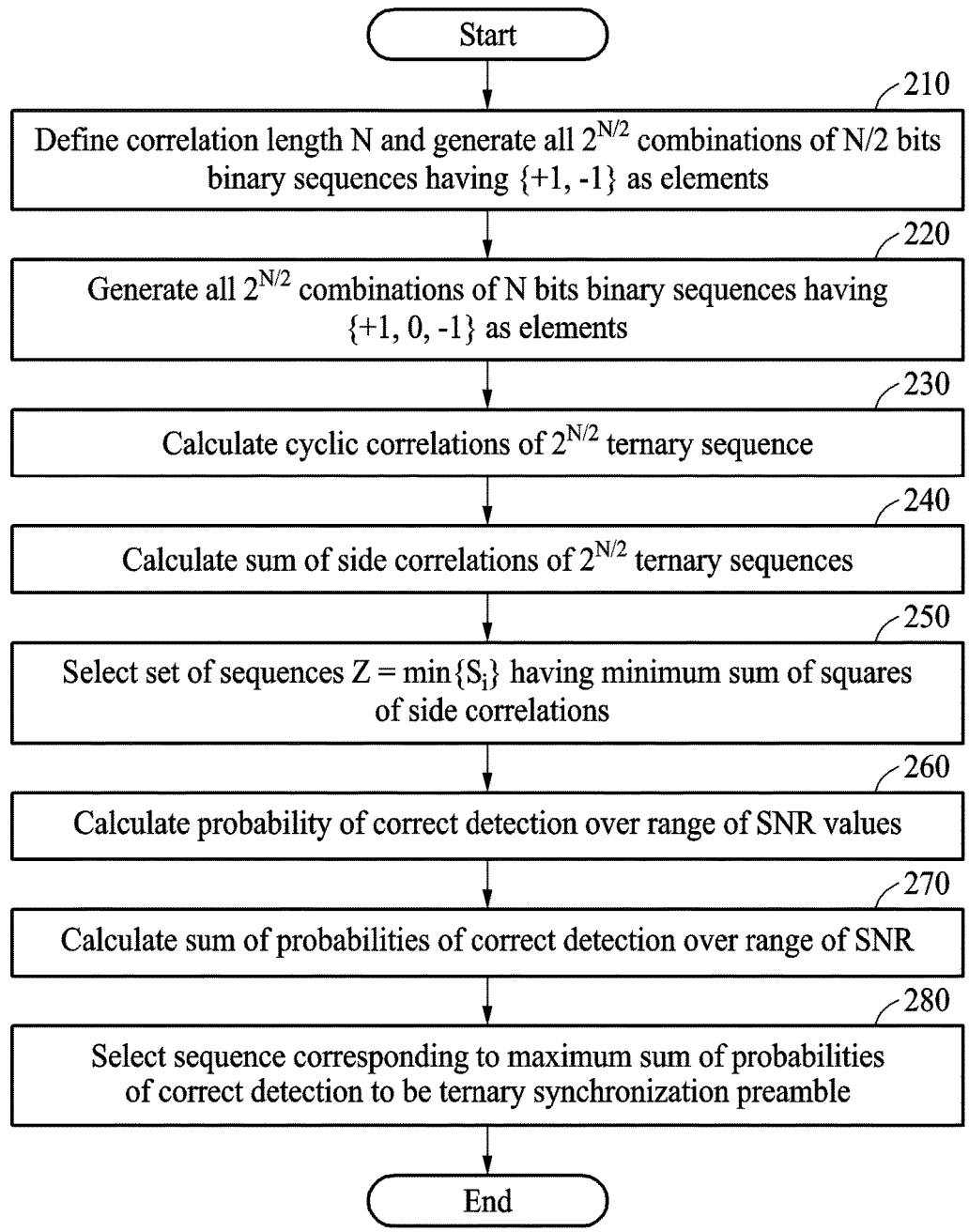
FIG. 2 is a flowchart illustrating a method of generating a 32 or 16 bits ternary preamble according to an exemplary embodiment of the present invention.

FIG. 2 is a flowchart illustrating a method of generating a 32 or 16 bits ternary preamble according to an exemplary embodiment of the present invention. A method of designing a ternary sequence in a case in which N=16 and in a case in which N=32, N being a length of the ternary sequence, will be described with reference to FIG. 2.

In operation 210, as a first operation, a correlation length N may be defined and all $2^{N/2}$ combinations of N/2 bits binary sequences having $\{+1, -1\}$ as elements may be generated.

In operation 220, as a second operation, all $2^{N/2}$ combinations of N bits binary sequences having $\{+1, 0, -1\}$ as elements may be generated. Such type of sequence may be expressed as $A_i = \{a_0^i, a_1^i, a_2^i, \ldots a_{N-1}^i\}$, $0 \leq i \leq 2^{N/2}-1$. In this case, positions of elements 0 may be set. The positions of the elements 0 may be determined based on the non-coherent sequences as shown in Table 23. Positions of N/2 elements 1 in N bits sequences may be replaced with those of elements $\{1$ or $-1\}$, and the $2^{N/2}$ combinations may be generated.

A method of acquiring a ternary synchronization preamble from the ternary sequences acquired in the second operation will be described below.

In operation 230, as a third operation, cyclic correlations, for example, $$R_{aa}^i(\tau) = \sum_{n=0}^{P-1} a_n^i a_{(n+\tau) \bmod P}^i, 0 \leq i \leq 2^{N/2}-1$$

of the $2^{N/2}$ ternary sequences may be calculated.

In operation 240, as a fourth operation, a sum of side correlations, for example, $$S_i = \sum_{\tau=1}^{P-1} [R_{aa}^i(\tau)]^2, 0 \leq i \leq 2^{N/2}-1$$

of the $2^{N/2}$ ternary sequences may be calculated.

In operation 250, as a fifth operation, a set of sequences $Z = \min\{S_i\}$ having a minimum sum of the squares of the side correlations may be selected. The number of such sequences may be significantly less than $2^{N/2}$ in general. For example, when N=32, the number of such sequences may be less than $2^{16}/50$ in general.

A method of acquiring a ternary synchronization preamble from the set of sequences acquired in the fifth operation will be described below.

In operation 260, as a sixth operation, a probability of correct detection over a range of signal-to-noise ratio (SNR) values may be calculated to reduce the set of sequences. The range of SNR values may be determined in a range from an SNR value corresponding to a case in which the probability of correct detection is 0.1 to a minimum SNR value among SNR values corresponding to a case in which the probability of correct detection is 1.

To acquire the range of SNR values, a ternary sequence in a set of ternary sequences may be used. The probability of correct detection may be calculated for various SNRs. A range of SNR values corresponding to a case in which the probability of correct detection is from 0.1 to 1 may appear.

The range of SNR values may be a set of the range of SNR values on which the probability of correct detection is calculated. In the range of SNR values, the probability of correct detection may be calculated for all sequences.

The probability of correct detection may be calculated based on the following method.

The ternary sequence preamble may be included in a 20-byte data payload to form a packet. Random integer offsets may be added to the packet. Thus, passing through an additive white Gaussian noise channel may be allowed. A received signal may be correlated with the same ternary sequence preamble.

$$R_{ay}(\tau) = \frac{\sum_{n=0}^{N-1} a_n y(n+\tau)}{N\sigma_x \sigma_y} \qquad \text{[Equation 1]}$$

In Equation 1, $\sigma_a$ and $\sigma_y$ denote standard deviation of the ternary sequence and the received signal. The correlation may be compared to a predetermined threshold. When a correlation $R_{ay}(\tau)$ exceeds the threshold, a packet may be detected. When detection is performed on a correct index the packet may be detected accurately. Such a repetitive trial may be performed on various packets and various random offsets, and an average probability of correct detection may be calculated. The foregoing may be performed for the range of SNR values.

In operation 270, as a seventh operation, a sum of probabilities of correct detection over the range of SNR may be calculated for each sequence of Z. In operation 280, a sequence corresponding to a maximum sum of probabilities of correct detection calculated in the sixth operation may be selected to be the ternary synchronization preamble.

The aforementioned method of designing the ternary sequence may be used for a predetermined length N. A search space for the sequence may increase exponentially.

Exemplary codes in a case in which a length for correlation, for example, N=32 are shown in Table 24 below. Exemplary codes in a case in which N=16 are shown in Table 25 below. To improve a performance, a plurality of ternary sequences may be used for synchronization preamble sequences.

TABLE 24

| Label | Equivalent Ternary Sequence with N = 32 |
|---|---|
| OOK-2 ½ OOK | [-1 0 -1 0 1 0 1 0 -1 0 -1 0 1 0 -1 0<br>1 0 1 0 1 0 -1 0 -1 0 1 0 -1 0 -1 0 ] |
| OOK-4 ¼-OOK | [1 0 0 1 1 0 0 1 1 0 0 1 1 0 0 - 1 -1<br>0 0 1 -1 0 0 1 -1 0 0 1 -1 0 0 -1 ] |
| OOK-8 ⅛-OOK | [1 0 -1 0 0 -1 0 -1 1 0 1 0 0 -1 0 1<br>1 0 1 0 0 -1 0 1 -1 0 1 0 0 1 0 1]; |
| OOK-16 1/16-OOK | [ -1 0 -1 0 -1 0 -1 0 0 0 -1 0 1 0 -1 -1<br>0 1 0 -1 0 1 0 0 1 0 1 0 -1 0 -1]; |

TABLE 25

| Label | Equivalent Ternary Sequence with N = 16 |
|---|---|
| OOK-2 ½ OOK | Seq1 = [-1 0 1 0 1 0 1 0 1 0 -1 0 1 0 -1 0]; |
| OOK-4 ¼-OOK | Seq1 = [ -1 0 0 1 1 0 0 -1 1 0 0 1 1 0 0 1]<br>Seq2 = [ -1 0 0 1 -1 0 0 1 1 0 0 1 -1 0 0 -1] |
| OOK-8 ⅛-OOK | Seq1 = [1 0 -1 0 0 -1 0 1 1 0 1 0 0 1 0 1];<br>Seq2 = [-1 0 -1 0 0 -1 0 -1 1 0 -1 0 0 -1 0 1]; |
| OOK-16 1/16-OOK | Seq1 = [1 0 -1 0 -1 0 1 0 0 1 0 -1 0 -1 0 -1];<br>Seq2 = [ -1 0 -1 0 1 0 1 0 0 1 0 -1 0 1 0 1]; |

A method of designing a 64 bits ternary sequence is described below.

Figure 3:
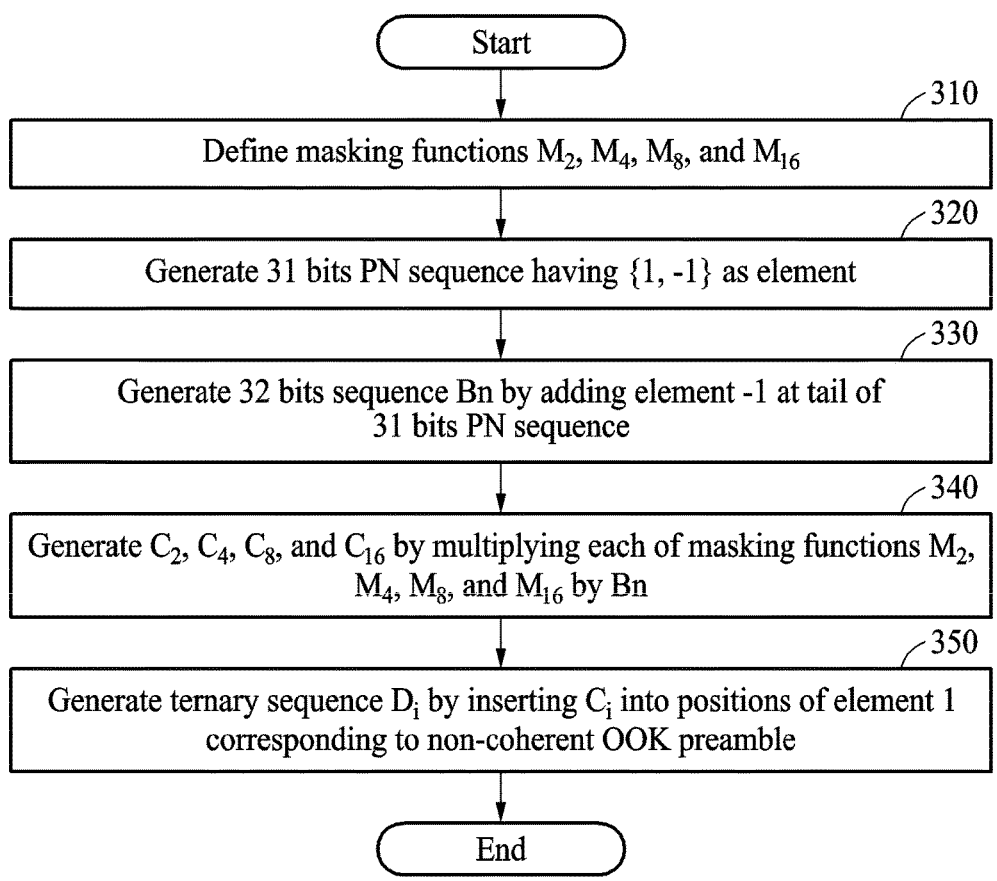
FIG. 3 is a flowchart illustrating a method of generating a 64 bits ternary preamble according to an exemplary embodiment of the present invention.

FIG. 3 is a flowchart illustrating a method of generating a 64 bits ternary preamble according to an exemplary embodiment of the present invention. Referring to FIG. 3, when the method of designing the ternary sequence is applied to a case in which N=64, N being a length obtained through an auto-correlation, a search space may increase significantly.

In an exemplary embodiment, good correlation properties may be acquired by unbalancing ternary sequences. For example, the number of elements 1, $n_p$, may be greater than or less than the number of elements −1, $n_m$. In a ternary sequence having a perfect periodic correlation, allowable values of the elements 1 and −1, for example, $n_p$ and $n_m$ may be (3, 1), (6, 3), (10, 6), (15, 10), and (21, 15).

The method of designing the ternary sequence may be performed on a 64 bits ternary sequence including 32 elements 0 and 32 elements (+1, −1). Among the aforementioned values, the 64 bits ternary sequence may be designed based on (21, 15). Here, (21, 15) may indicate that the number of elements +1 is six more than the number of elements −1. The method of designing the 64 bits ternary sequence based on (21, 15) will be described below.

In a first operation, a 32 bits PN sequence may be generated. In the generated sequence, $n_p$=16 and $n_m$=15, n, being the number of elements +1 and $n_m$ being the number of elements −1. A 32 bits balanced sequence may be generated by arranging an element −1 at a tail. To generate corresponding 32 bits ternary sequences, sequences including elements {+1, −1} may be inserted into positions of elements 1 in each of the sequences OOK-2, OOK-4, OOK-8, and OOK-16. Accordingly, maximum side correlations for sequences may be 8 and a peak correlation may be +32. To acquire side correlations less than 8, masking function operators may be defined based on the PN sequence as described below.

In operation 310, as a second operation, masking functions may be defined as $M_2$, $M_4$, $M_8$, and $M_{16}$ in the sequences OOK-2, OOK-4, OOK-8, and OOK-16, respectively. The masking functions may be defined to allow the number of elements +1 to be unbalanced in the 32 bits sequences acquired by adding the element −1 to a 31 bits PN sequence. In operation 320, the 31 bits PN sequence having $\{1, -1\}$ as an element may be generated. In operation 330, a 32 bits sequence $B_n$ may be generated by adding the element −1 at a tail of the 31 bits PN sequence. The 32 bits sequence may be expressed as, for example, $B_n = \{b_0, b_1, \ldots b_{N/2-1}\}$.

a. The masking function $M_2$ for the sequence OOK-2 may be defined as below.

$M_2 = \{m_i^2\}_{i=1}^{32}$: $m_i^2 = -1$ for i=$\{17, 30\}$ and $m_i^2 = 1$ otherwise Here, when an index i is 17 and 30, an element of the masking function may be −1. In a case of the other indices, an element of the masking function may be 1.

b. The masking function $M_4$ for the sequence OOK-4 may be defined as below.

$M_4 = \{m_i^4\}_{i=1}^{32}$: $m_i^4 = -1$ for i=$\{7, 9, 17, 30\}$ and $m_i^4 = 1$ otherwise Here, when the index i is 7, 9, 17, and 30, the element of the masking function may be −1. In a case of the other indices, the element of the masking function may be 1.

c. The masking function $M_8$ for the sequence OOK-8 may be defined as below.

$M_8 = \{(m_i^8\}_{i=1}^{32}$: $m_i^8 = -1$ for i=(2, 13, 31) and m=1 otherwise

Here, when the index i is 2, 13, and 31, the element of the masking function may be −1. In a case of the other indices, the element of the masking function may be 1.

d. The masking function $M_{16}$ for the sequence OOK-16 may be defined as below.

$M_{16} = \{m_i^{16}\} m_i^{32}$: $m_i^{16} = -1$ for i=$\{7, 9, 17, 31\}$ and $m_i^{16} = 1$ otherwise Here, when the index i is 7, 9, 17, and 31, the element of the masking function may be −1. In a case of the other indices, the element of the masking function may be 1.

In operation 340, as a third operation, $C_2$, $C_4$, $C_8$, and $C_{16}$ may be generated by performing an element wise multiplication (*) on each of the masking functions $M_2$, $M_4$, $M_8$, and $M_{16}$ and the 32 bits sequence $B_n$ described in the second operation as shown in Equation 3.

$$C_i = B_n \cdot M_i, i = \{2,4,8,16\} \quad \text{[Equation 3]}$$

In the first operation, a maximum side correlation of a balanced ternary sequence may be 8. The sequences acquired in the third operation may be less than 8 that is the maximum side correlation and thus, may be useful than the balanced ternary sequence in the first operation.

In an exemplary embodiment, various masking functions may be generated, and correlation properties of result sequences may be examined for each of the masking functions. In all result sequences, sequences having a minimum value of the maximum side correlation may be selected to be candidate ternary sequences.

In operation 350, as a fourth operation, the 32 bits sequences $C_2$, $C_4$, $C_8$, and $C_{16}$ may be inserted into positions of an element 1 in 64 bits non-coherent sequences associated with the sequences OOK-2, OOK-4, OOK-8, and OOK-16, thereby acquiring 64 bits ternary sequences corresponding thereto.

For example, a 64 bits non-coherent OOK-2 preamble may be formed by repeating a sequence {1 0} 32 times. To acquire a 64 bits ternary sequence $D_2$ for the sequence OOK-2, the 32 bits sequence $C_2$ may be inserted into a position of the element 1 in the sequence {1 0}.

A 64 bits non-coherent OOK-4 preamble may be formed by repeating a sequence {1 0 0 1} 16 times. To acquire a 64 bits ternary sequence $D_4$ for the sequence OOK-4, the 32 bits sequence $C_4$ may be inserted into positions of the element 1 in the sequence {1 0 0 1}.

A 64 bits non-coherent OOK-8 preamble may be formed by repeating a sequence {1 0 1 0 0 1 0 1} 8 times. To acquire a 64 bits ternary sequence $D_8$ for the sequence OOK-8, the 32 bits sequence $C_8$ may be inserted into positions of the element 1 in the sequence {1 0 1 0 0 1 0 1}.

A 64 bits non-coherent OOK-16 preamble may be formed by repeating a sequence {1 0 1 0 1 0 1 0 0 1 0 1 0 1 0 1} 4 times. To acquire a 64 bits ternary sequence $D_{16}$ for the sequence OOK-16, the 32 bits sequence $C_{16}$ may be inserted into positions of the element 1 in the sequence {1 0 1 0 1 0 0 1 0 1 0 1 0 1}.

In a fifth operation, a synchronization sequence may include the 64 bits ternary sequence $D_2$, $D_4$, $D_8$, or $D_{16}$ repeated the multiple number of times based on a requirement as shown in Table 26 below.

TABLE 26

| Label | Equivalent Ternary Sequence with N = 64 |
|---|---|
| OOK-2 | $D_2$ = [ 1 0 −1 0 −1 0 −1 0 −1 0 1 0 −1 0 1 0 −1 0 1 0 1 0 −1 0 1 0 1 0 −1 0 1 0 −1 0 1 0 1 0 1 0 −1 0 −1 0 1 0 1 0 1 0 1 0 −1 0 1 0 1 0 −1 0 1 0 −1 0 ] |
| OOK-4 | $D_4$ = [1 0 0 −1 −1 0 0 −1 −1 0 0 1 1 0 0 1 1 0 0 1 1 −1 0 0 1 1 0 0 −1 1 0 0 −1 −1 0 0 1 1 0 0 1 1 0 0 −1 −1 0 0 1 1 0 0 −1 −1] |
| OOK-8 | $D_8$ = [ 1 0 1 0 0 −1 0 −1 −1 0 1 0 0 −1 0 1 −1 0 1 0 0 1 0 1 1 0 1 0 0 1 0 −1 −1 0 −1 −1 0 0 1 0 1 1 0 1 1 0 0 1 0 −1 −1 0 1 0 0 1 0 −1 −1] |
| OOK-16 | $D_{16}$ = [ 1 0 −1 0 −1 0 −1 0 0 −1 0 1 0 1 0 1 1 0 1 0 1 0 0 −1 0 1 0 1 0 −1 1 0 −1 0 1 0 1 0 0 1 0 1 0 1 0 −1 −1 0 1 0 1 0 −1 0 0 1 0 1 0 −1 0 ] |

Table 27 shows representative spreading sequences. The spreading sequences of Table 27 may be used to spread data symbols. Spreading factors may be 1, 2, 4, and 8.

TABLE 27

| M | L | Nomenclature | Orthogonal Sequences (symbols: '0' / '1') |
|---|---|---|---|
| 1 | 1 | ⅟₁-OOK | 1/0 |
|  | 2 | ½-OOK | 1 0/ 0 −1 |
|  | 4 | ¼ -OOK | +1 0 0 +1/0 −1 −1 0 |
|  | 8 | ⅛ -OOK | 1 0 −1 0 0 −1 0 1 / 0 −1 0 1 1 0 −1 0 |

Table 28 shows representative spreading sequences used as preamble sequences. The spreading sequences of Table 28 are also described with reference to Table 23.

TABLE 28

| Preamble Def | Spreading Factor (SF) | Base Preamble Sequence | Number of Repetitions (Nrep) | Number Of Bits | Number Of Chips |
|---|---|---|---|---|---|
| P1 | 2 | −1 0 −1 0 1 0<br>1 0 −1 0 −1 0<br>1 0 −1 0 1 0<br>1 0 1 0 −1 0 −1<br>0 1 0 −1 0 −1<br>0 | 2 | 32 | 64 |
| P2 | 4 | 1 0 0 1 1 0<br>0 1 1 0 0 1<br>1 0 0 −1 −1 0<br>0 1 −1 0 0 1 −1<br>0 0 1 −1 0<br>0 −1 | 4 | 32 | 128 |
| P3 | 8 | 1 0 −1 0 0 −1<br>0 −1 1 0 1 0<br>0 −1 0 1 1 0<br>1 0 0 −1 0 1 −1<br>0 1 0 0 1<br>0 1 | 8 | 32 | 256 |
| P4 | 16 | −1 0 −1 0 −1<br>0 −1 0 0 −1 0 1<br>0 1 0 −1 −1<br>0 1 0 −1 0 1 0<br>0 1 0 1 0 −1<br>0 −1 | 16 | 32 | 512 |

Table 29 shows start frame delimiter formats. In this example, the number of +1 may be the same as the number of −1

TABLE 29

| Format | Spreading Factor $N_{SFD}$ | Bit | Chip Sequence |
|---|---|---|---|
| S1 | 2 | 0 | [+1 0 ] |
|  |  | 1 | [ 0 −1 ] |
| S2 | 4 | 0 | [+1 0 0 +1] |
|  |  | 1 | [0 −1 −1 0] |
| S3 | 8 | 0 | [+1 0 −1 0 0 −1 0 +1] |
|  |  | 1 | [0 −1 0 +1 +1 0 −1 0] |
| S4 | 16 | 0 | [+1 0 −1 0 −1 0 +1 0 0 +1 0 −1 0 −1 0 +1] |
|  |  | 1 | [0 −1 0 +1 0 +1 0 −1 −1 0 +1 0 +1 0 −1 0] |

Table 30 including Table 30-1, Table 30-2, and Table 30-3 shows various modulation formats, that is, spreading sequences used for an orthogonal variable spreading factor OOK, single pulses, and pseudo-random multi-pulse position modulations.

TABLE 30-1

| Format | Nomenclature | Bits-per-Symbol M | Chips-per-Symbol l | Base Sequence $c_0c_1\text{-}c_{l-2}$ | Index | $b_0$ | $b_1$ | $b_2$ | $b_3$ | $b_4$ | $c_0$ | $c_1$ | $c_2$ | $c_3$ | $c_4$ | $c_5$ | $c_6$ | $c_7$ | $c_8$ |
|---|---|---|---|---|---|---|---|---|---|---|---|---|---|---|---|---|---|---|---|
| D1 | 1/1-OOK | 1 | 1 | {0} | 0 | 0 | | | | | 0 | | | | | | | | |
| | | | | {±1} | 1 | 1 | | | | | ±1 | | | | | | | | |
| | 1/2-OOK | 1 | 2 | {+10} | 0 | 0 | | | | | +1 | 0 | | | | | | | |
| | | | | {0−1} | 1 | 1 | | | | | 0 | −1 | | | | | | | |
| D2 | 2/4-SPPM | 2 | 4 | {±1000} | 0 | 0 | 0 | | | | +1 | 0 | 0 | 0 | | | | | |
| | | | | | 1 | 1 | 0 | | | | 0 | −1 | 0 | 0 | | | | | |
| | | | | | 3 | 1 | 1 | | | | 0 | 0 | −1 | 0 | | | | | |
| | | | | | 2 | 0 | 1 | | | | 0 | 0 | 0 | +1 | | | | | |
| D3 | 3/8-MPPM | 3 | 8 | {000 + 1 − 10 + 1 + 1} | 0 | 0 | 0 | 0 | | | 0 | 0 | 0 | +1 | −1 | 0 | +1 | +1 | |
| | | | | | 1 | 1 | 0 | 0 | | | +1 | 0 | 0 | 0 | +1 | −1 | 0 | +1 | |
| | | | | | 3 | 1 | 1 | 0 | | | +1 | +1 | 0 | 0 | 0 | +1 | −1 | 0 | |
| | | | | | 2 | 0 | 1 | 0 | | | 0 | +1 | +1 | 0 | 0 | 0 | +1 | −1 | |
| | | | | | 6 | 0 | 1 | 1 | | | −1 | 0 | +1 | +1 | 0 | 0 | 0 | +1 | |
| | | | | | 7 | 1 | 1 | 1 | | | +1 | −1 | 0 | +1 | +1 | 0 | 0 | 0 | |
| | | | | | 5 | 1 | 0 | 1 | | | 0 | +1 | −1 | 0 | +1 | +1 | 0 | 0 | |
| | | | | | 4 | 0 | 0 | 1 | | | 0 | 0 | +1 | −1 | 0 | +1 | +1 | 0 | |
| | 3/8-SPPM | 3 | 8 | {±10000000} | 0 | 0 | 0 | 0 | | | +1 | 0 | 0 | 0 | 0 | 0 | 0 | 0 | |
| | | | | | 1 | 1 | 0 | 0 | | | 0 | −1 | 0 | 0 | 0 | 0 | 0 | 0 | |
| | | | | | 3 | 1 | 1 | 0 | | | 0 | 0 | −1 | 0 | 0 | 0 | 0 | 0 | |
| | | | | | 2 | 0 | 1 | 0 | | | 0 | 0 | 0 | +1 | 0 | 0 | 0 | 0 | |
| | | | | | 6 | 0 | 1 | 1 | | | 0 | 0 | 0 | 0 | +1 | 0 | 0 | 0 | |
| | | | | | 7 | 1 | 1 | 1 | | | 0 | 0 | 0 | 0 | 0 | −1 | 0 | 0 | |
| | | | | | 5 | 1 | 0 | 1 | | | 0 | 0 | 0 | 0 | 0 | 0 | −1 | 0 | |
| | | | | | 4 | 0 | 0 | 1 | | | 0 | 0 | 0 | 0 | 0 | 0 | 0 | +1 | |

| Format | $c_9$ | $c_{10}$ | $c_{11}$ | $c_{12}$ | $c_{13}$ | $c_{14}$ | $c_{15}$ | $c_{16}$ | $c_{17}$ | $c_{18}$ | $c_{19}$ | $c_{20}$ | $c_{21}$ | $c_{22}$ | $c_{23}$ | $c_{24}$ | $c_{25}$ | $c_{26}$ | $c_{27}$ | $c_{28}$ | $c_{29}$ | $c_{30}$ | $c_{31}$ |
|---|---|---|---|---|---|---|---|---|---|---|---|---|---|---|---|---|---|---|---|---|---|---|---|
| D1 | | | | | | | | | | | | | | | | | | | | | | | |
| D2 | | | | | | | | | | | | | | | | | | | | | | | |
| D3 | | | | | | | | | | | | | | | | | | | | | | | |

TABLE 30-2

| Format | Nomenclature | M | l | Base Sequence | Index | $b_0$ | $b_1$ | $b_2$ | $b_3$ | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ |
|---|---|---|---|---|---|---|---|---|---|---|---|---|---|---|---|---|---|---|---|---|---|---|---|---|---|
| D4 | 1/4-OOK | 1 | 4 | {+100 − 1} | 0 | 0 | | | | +1 | 0 | 0 | +1 | | | | | | | | | | | | |
| | | | | {0 − 1 + 10} | 1 | 1 | | | | 0 | −1 | −1 | 0 | | | | | | | | | | | | |
| D5 | 4/16-MPPM | 4 | 16 | {+1 − 1000 + 10 − 100 + 1 + 10 + 1 + 1} | 0 | 0 | 0 | 0 | 0 | +1 | −1 | 0 | 0 | 0 | 0 | +1 | 0 | −1 | 0 | 0 | +1 | 0 | +1 | 0 | +1 | +1 |
| | | | | | 1 | 1 | 0 | 0 | 0 | +1 | +1 | −1 | 0 | 0 | 0 | 0 | +1 | 0 | −1 | 0 | 0 | +1 | +1 | 0 | +1 | |
| | | | | | 3 | 1 | 1 | 0 | 0 | +1 | +1 | +1 | −1 | 0 | 0 | 0 | 0 | +1 | 0 | −1 | 0 | 0 | +1 | +1 | 0 | |
| | | | | | 2 | 0 | 1 | 0 | 0 | 0 | +1 | +1 | +1 | −1 | 0 | 0 | 0 | 0 | +1 | 0 | −1 | 0 | 0 | +1 | +1 | |
| | | | | | 6 | 0 | 1 | 1 | 0 | +1 | 0 | +1 | +1 | +1 | −1 | 0 | 0 | 0 | 0 | +1 | 0 | −1 | 0 | 0 | +1 | |
| | | | | | 7 | 1 | 1 | 1 | 0 | +1 | +1 | 0 | +1 | +1 | +1 | −1 | 0 | 0 | 0 | 0 | +1 | 0 | −1 | 0 | 0 | |
| | | | | | 5 | 1 | 0 | 1 | 0 | 0 | +1 | +1 | 0 | +1 | +1 | +1 | −1 | 0 | 0 | 0 | 0 | +1 | 0 | −1 | 0 | |
| | | | | | 4 | 0 | 0 | 1 | 0 | 0 | 0 | +1 | +1 | 0 | +1 | +1 | +1 | −1 | 0 | 0 | 0 | 0 | +1 | 0 | −1 | |
| | | | | | 12 | 0 | 0 | 1 | 1 | −1 | 0 | 0 | 0 | +1 | +1 | 0 | +1 | +1 | +1 | −1 | 0 | 0 | 0 | 0 | +1 | |
| | | | | | 13 | 1 | 0 | 1 | 1 | 0 | −1 | 0 | 0 | 0 | +1 | +1 | 0 | +1 | +1 | +1 | −1 | 0 | 0 | 0 | 0 | +1 |
| | | | | | 15 | 1 | 1 | 1 | 1 | +1 | 0 | −1 | 0 | 0 | 0 | +1 | +1 | 0 | +1 | +1 | +1 | −1 | 0 | 0 | 0 | 0 |
| | | | | | 14 | 0 | 1 | 1 | 1 | 0 | +1 | 0 | −1 | 0 | 0 | 0 | +1 | +1 | 0 | +1 | +1 | +1 | −1 | 0 | 0 | 0 |
| | | | | | 10 | 0 | 1 | 0 | 1 | 0 | 0 | +1 | 0 | −1 | 0 | 0 | 0 | +1 | +1 | 0 | +1 | +1 | +1 | −1 | 0 | 0 |
| | | | | | 11 | 1 | 1 | 0 | 1 | 0 | 0 | 0 | +1 | 0 | −1 | 0 | 0 | 0 | +1 | +1 | 0 | +1 | +1 | +1 | −1 | 0 |
| | | | | | 9 | 1 | 0 | 0 | 1 | 0 | 0 | 0 | 0 | +1 | 0 | −1 | 0 | 0 | 0 | +1 | +1 | 0 | +1 | +1 | +1 | −1 |
| | | | | | 8 | 0 | 0 | 0 | 1 | −1 | 0 | 0 | 0 | 0 | +1 | 0 | −1 | 0 | 0 | 0 | +1 | +1 | 0 | +1 | +1 | +1 |
| | 4/16-SPPM | 4 | 16 | {±1000000000000000} | 0 | 0 | 0 | 0 | 0 | +1 | 0 | 0 | 0 | 0 | 0 | 0 | +1 | 0 | 0 | 0 | 0 | 0 | 0 | 0 | 0 | 0 |
| | | | | | 1 | 1 | 0 | 0 | 0 | 0 | −1 | 0 | 0 | 0 | 0 | 0 | 0 | 0 | 0 | 0 | 0 | 0 | 0 | 0 | 0 | 0 |
| | | | | | 3 | 1 | 1 | 0 | 0 | 0 | 0 | −1 | 0 | 0 | 0 | 0 | 0 | 0 | 0 | 0 | 0 | 0 | 0 | 0 | 0 | 0 |
| | | | | | 2 | 0 | 1 | 0 | 0 | 0 | 0 | 0 | +1 | 0 | 0 | 0 | 0 | 0 | 0 | 0 | 0 | 0 | 0 | 0 | 0 | 0 |
| | | | | | 6 | 0 | 1 | 1 | 0 | 0 | 0 | 0 | 0 | +1 | 0 | 0 | 0 | 0 | 0 | 0 | 0 | 0 | 0 | 0 | 0 | 0 |
| | | | | | 7 | 1 | 1 | 1 | 0 | 0 | 0 | 0 | 0 | 0 | −1 | 0 | 0 | 0 | 0 | 0 | 0 | 0 | 0 | 0 | 0 | 0 |
| | | | | | 5 | 1 | 0 | 1 | 0 | 0 | 0 | 0 | 0 | 0 | 0 | −1 | 0 | 0 | 0 | 0 | 0 | 0 | 0 | 0 | 0 | 0 |
| | | | | | 4 | 0 | 0 | 1 | 0 | 0 | 0 | 0 | 0 | 0 | 0 | 0 | +1 | 0 | 0 | 0 | 0 | 0 | 0 | 0 | 0 | 0 |
| | | | | | 12 | 0 | 0 | 1 | 1 | 0 | 0 | 0 | 0 | 0 | 0 | 0 | 0 | +1 | 0 | 0 | 0 | 0 | 0 | 0 | 0 | 0 |
| | | | | | 13 | 1 | 0 | 1 | 1 | 0 | 0 | 0 | 0 | 0 | 0 | 0 | 0 | 0 | −1 | 0 | 0 | 0 | 0 | 0 | 0 | 0 |
| | | | | | 15 | 1 | 1 | 1 | 1 | 0 | 0 | 0 | 0 | 0 | 0 | 0 | 0 | 0 | 0 | −1 | 0 | 0 | 0 | 0 | 0 | 0 |
| | | | | | 14 | 0 | 1 | 1 | 1 | 0 | 0 | 0 | 0 | 0 | 0 | 0 | 0 | 0 | 0 | 0 | +1 | 0 | 0 | 0 | 0 | 0 |
| | | | | | 10 | 0 | 1 | 0 | 1 | 0 | 0 | 0 | 0 | 0 | 0 | 0 | 0 | 0 | 0 | 0 | 0 | +1 | 0 | 0 | 0 | 0 |

TABLE 30-2-continued

| | | | | | | | | | | | | | | | | | | | | | |
|---|---|---|---|---|---|---|---|---|---|---|---|---|---|---|---|---|---|---|---|---|---|
| | | 11 | 1 | 1 | 0 | 1 | 0 | 0 | 0 | 0 | 0 | 0 | 0 | 0 | 0 | 0 | 0 | 0 | 0 | -1 | 0 | 0 |
| | | 9 | 1 | 0 | 0 | 1 | 0 | 0 | 0 | 0 | 0 | 0 | 0 | 0 | 0 | 0 | 0 | 0 | 0 | 0 | -1 | 0 |
| | | 8 | 0 | 0 | 0 | 1 | 0 | 0 | 0 | 0 | 0 | 0 | 0 | 0 | 0 | 0 | 0 | 0 | 0 | 0 | 0 | +1 |

TABLE 30-3

| | | | | | | | | | | | | | | | | | | | | | | |
|---|---|---|---|---|---|---|---|---|---|---|---|---|---|---|---|---|---|---|---|---|---|---|
| D6 | 5/32-MPPM | 5 | 32 | {−100 + 10 + 1 − 10 − 1 − 1 + 1 − 10 + 10 + 1000 + 100 + 1 + 1 − 100000 + 1 + 1} | 0 | 0 | 0 | 0 | 0 | 0 | −1 | 0 | 0 | +1 | 0 | +1 | −1 | 0 | −1 | −1 | +1 | −1 |
| | | | | | 1 | 1 | 0 | 0 | 0 | 0 | +1 | −1 | 0 | 0 | +1 | 0 | +1 | −1 | 0 | −1 | −1 | +1 |
| | | | | | 3 | 1 | 1 | 0 | 0 | 0 | +1 | +1 | −1 | 0 | 0 | +1 | 0 | +1 | −1 | 0 | −1 | −1 |
| | | | | | 2 | 0 | 1 | 0 | 0 | 0 | 0 | +1 | +1 | −1 | 0 | 0 | +1 | 0 | +1 | −1 | 0 | −1 |
| | | | | | 6 | 0 | 1 | 1 | 0 | 0 | 0 | 0 | +1 | +1 | −1 | 0 | 0 | +1 | 0 | +1 | −1 | 0 |
| | | | | | 7 | 1 | 1 | 1 | 0 | 0 | 0 | 0 | 0 | +1 | +1 | −1 | 0 | 0 | +1 | 0 | +1 | −1 |
| | | | | | 5 | 1 | 0 | 1 | 0 | 0 | 0 | 0 | 0 | 0 | +1 | +1 | −1 | 0 | 0 | +1 | 0 | +1 |
| | | | | | 4 | 0 | 0 | 1 | 0 | 0 | 0 | 0 | 0 | 0 | 0 | +1 | +1 | −1 | 0 | 0 | +1 | 0 |
| | | | | | 12 | 0 | 0 | 1 | 1 | 0 | −1 | 0 | 0 | 0 | 0 | 0 | +1 | +1 | −1 | 0 | 0 | +1 |
| | | | | | 13 | 1 | 0 | 1 | 1 | 0 | +1 | −1 | 0 | 0 | 0 | 0 | 0 | +1 | +1 | −1 | 0 | 0 |
| | | | | | 15 | 1 | 1 | 1 | 1 | 0 | +1 | +1 | −1 | 0 | 0 | 0 | 0 | 0 | +1 | +1 | −1 | 0 |
| | | | | | 14 | 0 | 1 | 1 | 1 | 0 | 0 | +1 | +1 | −1 | 0 | 0 | 0 | 0 | 0 | +1 | +1 | −1 |
| | | | | | 10 | 0 | 1 | 0 | 1 | 0 | 0 | 0 | +1 | +1 | −1 | 0 | 0 | 0 | 0 | 0 | +1 | +1 |
| | | | | | 11 | 1 | 1 | 0 | 1 | 0 | +1 | 0 | 0 | +1 | +1 | −1 | 0 | 0 | 0 | 0 | 0 | +1 |
| | | | | | 9 | 1 | 0 | 0 | 1 | 0 | 0 | +1 | 0 | 0 | +1 | +1 | −1 | 0 | 0 | 0 | 0 | 0 |
| | | | | | 8 | 0 | 0 | 0 | 1 | 0 | 0 | 0 | +1 | 0 | 0 | +1 | +1 | −1 | 0 | 0 | 0 | 0 |
| | | | | | 24 | 0 | 0 | 0 | 1 | 1 | 0 | 0 | 0 | +1 | 0 | 0 | +1 | +1 | −1 | 0 | 0 | 0 |
| | | | | | 25 | 1 | 0 | 0 | 1 | 1 | +1 | 0 | 0 | 0 | +1 | 0 | 0 | +1 | +1 | −1 | 0 | 0 |
| | | | | | 27 | 1 | 1 | 0 | 1 | 1 | 0 | +1 | 0 | 0 | 0 | +1 | 0 | 0 | +1 | +1 | −1 | 0 |
| | | | | | 26 | 0 | 1 | 0 | 1 | 1 | +1 | 0 | +1 | 0 | 0 | 0 | +1 | 0 | 0 | +1 | +1 | −1 |
| | | | | | 30 | 0 | 1 | 1 | 1 | 1 | 0 | +1 | 0 | +1 | 0 | 0 | 0 | +1 | 0 | 0 | +1 | +1 |
| | | | | | 31 | 1 | 1 | 1 | 1 | 1 | −1 | 0 | +1 | 0 | +1 | 0 | 0 | 0 | +1 | 0 | 0 | +1 |
| | | | | | 29 | 1 | 0 | 1 | 1 | 1 | 0 | −1 | 0 | +1 | 0 | +1 | 0 | 0 | 0 | +1 | 0 | 0 |
| | | | | | 28 | 0 | 0 | 1 | 1 | 1 | −1 | +1 | −1 | 0 | +1 | 0 | +1 | 0 | 0 | 0 | +1 | 0 |
| | | | | | 20 | 0 | 0 | 1 | 0 | 1 | −1 | −1 | +1 | −1 | 0 | +1 | 0 | +1 | 0 | 0 | 0 | +1 |
| | | | | | 21 | 1 | 0 | 1 | 0 | 1 | 0 | −1 | −1 | +1 | −1 | 0 | +1 | 0 | +1 | 0 | 0 | 0 |
| | | | | | 23 | 1 | 1 | 1 | 0 | 1 | 0 | 0 | −1 | −1 | +1 | −1 | 0 | +1 | 0 | +1 | 0 | 0 |
| | | | | | 22 | 0 | 1 | 1 | 0 | 1 | +1 | 0 | −1 | −1 | +1 | −1 | 0 | +1 | 0 | +1 | 0 | 0 |
| | | | | | 18 | 0 | 1 | 0 | 0 | 1 | 0 | +1 | 0 | −1 | −1 | +1 | −1 | 0 | +1 | 0 | +1 | 0 |
| | | | | | 19 | 1 | 1 | 0 | 0 | 1 | +1 | 0 | +1 | 0 | −1 | −1 | +1 | −1 | 0 | +1 | 0 | +1 |
| | | | | | 17 | 1 | 0 | 0 | 0 | 1 | 0 | +1 | 0 | +1 | 0 | −1 | −1 | +1 | −1 | 0 | +1 | 0 |
| | | | | | 16 | 0 | 0 | 0 | 0 | 1 | 0 | 0 | +1 | 0 | +1 | 0 | −1 | −1 | +1 | −1 | 0 | +1 |
| D7 | 1/8-OOK | 1 | 8 | {+10 − 100 − 10 + 1} | 0 | 0 | | | | | +1 | 0 | −1 | 0 | 0 | −1 | 0 | +1 | | | | |
| | | | | {0 − 10 + 1 + 10 − 10} | 1 | 1 | | | | | 0 | −1 | 0 | +1 | +1 | 0 | −1 | 0 | | | | |
| | 1/16-OOK | 1 | 16 | {+10 − 10 − 10 + 100 + 10 − 10 − 10 + 1} | 0 | 0 | | | | | +1 | 0 | −1 | 0 | −1 | 0 | +1 | 0 | 0 | 0 | 0 | −1 |
| | | | | {0 − 10 + 10 + 10 − 1 − 10 + 10 + 10 − 10} | 1 | 1 | | | | | 0 | −1 | 0 | +1 | 0 | +1 | 0 | −1 | −1 | 0 | +1 | 0 |
| | | | | D6 | 0 | +1 | 0 | +1 | 0 | 0 | 0 | +1 | 0 | 0 | +1 | +1 | −1 | 0 | 0 | 0 | 0 | +1 | +1 |
| | | | | | −1 | 0 | +1 | 0 | +1 | 0 | 0 | 0 | +1 | 0 | 0 | +1 | +1 | −1 | 0 | 0 | 0 | 0 | +1 |
| | | | | | +1 | −1 | 0 | +1 | 0 | +1 | 0 | 0 | 0 | +1 | 0 | 0 | +1 | +1 | −1 | 0 | 0 | 0 | 0 |
| | | | | | −1 | +1 | −1 | 0 | +1 | 0 | +1 | 0 | 0 | 0 | +1 | 0 | 0 | +1 | +1 | −1 | 0 | 0 | 0 |
| | | | | | −1 | −1 | +1 | −1 | 0 | +1 | 0 | +1 | 0 | 0 | 0 | +1 | 0 | 0 | +1 | +1 | −1 | 0 | 0 |
| | | | | | 0 | −1 | −1 | +1 | −1 | 0 | +1 | 0 | +1 | 0 | 0 | 0 | +1 | 0 | 0 | +1 | +1 | −1 | 0 |
| | | | | | −1 | 0 | −1 | −1 | +1 | −1 | 0 | +1 | 0 | +1 | 0 | 0 | 0 | +1 | 0 | 0 | +1 | +1 | −1 |
| | | | | | +1 | −1 | 0 | −1 | −1 | +1 | −1 | 0 | +1 | 0 | +1 | 0 | 0 | 0 | +1 | 0 | 0 | +1 | +1 |
| | | | | | 0 | +1 | −1 | 0 | −1 | −1 | +1 | −1 | 0 | +1 | 0 | +1 | 0 | 0 | 0 | +1 | 0 | 0 | +1 |
| | | | | | +1 | 0 | +1 | −1 | 0 | −1 | −1 | +1 | −1 | 0 | +1 | 0 | +1 | 0 | 0 | 0 | +1 | 0 | 0 |
| | | | | | 0 | +1 | 0 | +1 | −1 | 0 | −1 | −1 | +1 | −1 | 0 | +1 | 0 | +1 | 0 | 0 | 0 | +1 | 0 |
| | | | | | 0 | 0 | +1 | 0 | +1 | −1 | 0 | −1 | −1 | +1 | −1 | 0 | +1 | 0 | +1 | 0 | 0 | 0 | +1 | 0 |
| | | | | | −1 | 0 | 0 | +1 | 0 | +1 | −1 | 0 | −1 | −1 | +1 | −1 | 0 | +1 | 0 | +1 | 0 | 0 | 0 | +1 |
| | | | | | +1 | −1 | 0 | 0 | +1 | 0 | +1 | −1 | 0 | −1 | −1 | +1 | −1 | 0 | +1 | 0 | +1 | 0 | 0 | 0 |
| | | | | | +1 | +1 | −1 | 0 | 0 | +1 | 0 | +1 | −1 | 0 | −1 | −1 | +1 | −1 | 0 | +1 | 0 | +1 | 0 | 0 |
| | | | | | 0 | +1 | +1 | −1 | 0 | 0 | +1 | 0 | +1 | −1 | 0 | −1 | −1 | +1 | −1 | 0 | +1 | 0 | +1 | 0 |
| | | | | | 0 | 0 | +1 | +1 | −1 | 0 | 0 | +1 | 0 | +1 | −1 | 0 | −1 | −1 | +1 | −1 | 0 | +1 | 0 | +1 |
| | | | | | 0 | 0 | 0 | +1 | +1 | −1 | 0 | 0 | +1 | 0 | +1 | −1 | 0 | −1 | −1 | +1 | −1 | 0 | +1 | 0 |
| | | | | | 0 | 0 | 0 | 0 | +1 | +1 | −1 | 0 | 0 | +1 | 0 | +1 | −1 | 0 | −1 | −1 | +1 | −1 | 0 | +1 |
| | | | | | −1 | 0 | 0 | 0 | 0 | +1 | +1 | −1 | 0 | 0 | +1 | 0 | +1 | −1 | 0 | −1 | −1 | +1 | −1 | 0 |
| | | | | | +1 | −1 | 0 | 0 | 0 | 0 | +1 | +1 | −1 | 0 | 0 | +1 | 0 | +1 | −1 | 0 | −1 | −1 | +1 | −1 |
| | | | | | +1 | +1 | −1 | 0 | 0 | 0 | 0 | +1 | +1 | −1 | 0 | 0 | +1 | 0 | +1 | −1 | 0 | −1 | −1 | +1 |
| | | | | | 0 | +1 | +1 | −1 | 0 | 0 | 0 | 0 | +1 | +1 | −1 | 0 | 0 | +1 | 0 | +1 | −1 | 0 | −1 | −1 |
| | | | | | 0 | +1 | +1 | −1 | 0 | 0 | +1 | 0 | +1 | −1 | 0 | −1 | −1 | +1 | −1 | 0 | +1 | 0 | +1 |
| | | | | | 0 | 0 | +1 | +1 | −1 | 0 | 0 | +1 | 0 | −1 | −1 | +1 | −1 | 0 | +1 | 0 | +1 |
| | | | | | 0 | +1 | 0 | +1 | −1 | 0 | 0 | 0 | +1 | −1 | 0 | 0 | +1 | −1 | 0 | 0 | +1 |
| | | | | | 0 | 0 | +1 | 0 | +1 | +1 | −1 | 0 | 0 | 0 | 0 | +1 | −1 | 0 | 0 | +1 |
| | | | | | 0 | 0 | +1 | 0 | +1 | +1 | −1 | 0 | 0 | 0 | 0 | 0 | +1 | +1 | −1 | 0 | 0 |
| | | | | | +1 | 0 | 0 | 0 | +1 | 0 | 0 | +1 | +1 | −1 | 0 | 0 | 0 | 0 | +1 | +1 | −1 | 0 | 0 |

TABLE 30-3-continued

|   |   |   |   |   |   |   |   |   |   |   |   |   |   |   |   |   |   |   |   |
|---|---|---|---|---|---|---|---|---|---|---|---|---|---|---|---|---|---|---|---|
|   | 0 | +1 | 0 | 0 | 0 | +1 | 0 | 0 | +1 | +1 | −1 | 0 | 0 | 0 | 0 | 0 | +1 | +1 | −1 | 0 |
|   | +1 | 0 | +1 | 0 | 0 | 0 | +1 | 0 | 0 | +1 | +1 | −1 | 0 | 0 | 0 | 0 | 0 | +1 | +1 | −1 |
| D7 |   |   |   |   |   |   |   |   |   |   |   |   |   |   |   |   |   |   |   |   |
|   | 0 | −1 | 0 | +1 |   |   |   |   |   |   |   |   |   |   |   |   |   |   |   |   |
|   | +1 | 0 | −1 | 0 |   |   |   |   |   |   |   |   |   |   |   |   |   |   |   |   |

Table 31 shows a representative transmission mode using modulations, variable spreading sequences in a start frame delimiter (SFD), a data portion, and a preamble. Format labels for the preamble, the SFD, and a payload may be acquired from Table 28 and Table 29.

TABLE 31

| Proposal Format | | | 2.4 GHz Channel | | | Modulation | | | | |
|---|---|---|---|---|---|---|---|---|---|---|
| Preamble | SFD Sequence | Payload | Chip Rate [Mcps] | Maximum Symbol Rate [kbps] l = 0 | Minimum Symbol Rate [kbps] l = 50 | Spreading Sequence | Bits-per-Symbol M | Chips-per-Symbol L | Spreading Factor | Duty Cycle |
| P2 | S2 | D1 | 1 | 809.5 | 76.9 | 1/1-OOK | 1 | 1 | 1 | 1/2 |
|    |    |    | 1 | 404.8 | 38.5 | 1/2-OOK | 1 | 2 | 2 | 1/2 |
| P2 | S2 | D2 | 1 | 404.8 | 38.5 | 2/4-SPPM | 2 | 4 | 2 | 1/4 |
| P3 | S3 | D3 | 1 | 303.6 | 28.8 | 3/8-MPPM | 3 | 8 | 8/3 = 2.67 | 1/2 |
|    |    |    | 1 | 303.6 | 28.8 | 3/8-SPPM | 3 | 8 | 8/3 = 2.67 | 1/8 |
| P3 | S3 | D4 | 1 | 202.4 | 19.2 | 1/4-OOK | 1 | 4 | 4 | 1/2 |
| P3 | S3 | D5 | 1 | 202.4 | 19.2 | 4/16-MPPM | 4 | 16 | 4 | 1/2 |
|    |    |    | 1 | 202.4 | 19.2 | 4/16-SPPM | 4 | 16 | 4 | 1/16 |
| P4 | S4 | D6 | 1 | 126.5 | 12.0 | 5/32-MPPM | 5 | 32 | 32/5 = 6.4 | 1/2 |
| P4 | S4 | D7 | 1 | 101.2 | 9.6 | 1/8-OOK | 1 | 8 | 8 | 1/2 |
|    |    |    | 1 | 50.6 | 4.8 | 1/16-OOK | 1 | 16 | 16 | 1/2 |
| P2 |    | D1 | 2 | 1619.0 | 153.8 | 1/1-OOK | 1 | 1 | 1 | 1/2 |
|    |    |    | 2 | 809.5 | 76.9 | 1/2-OOK | 1 | 2 | 2 | 1/2 |
| P2 |    | D2 | 2 | 809.5 | 76.9 | 2/4-SPPM | 2 | 4 | 2 | 1/4 |
| P3 |    | D3 | 2 | 607.1 | 57.7 | 3/8-MPPM | 3 | 8 | 8/3 = 2.67 | 1/2 |
|    |    |    | 2 | 607.1 | 57.7 | 3/8-SPPM | 3 | 8 | 8/3 = 2.67 | 1/8 |
| P3 |    | D4 | 2 | 404.8 | 38.5 | 1/4-OOK | 1 | 4 | 4 | 1/2 |
| P3 |    | D5 | 2 | 404.8 | 38.5 | 4/16-MPPM | 4 | 16 | 4 | 1/2 |
|    |    |    | 2 | 404.8 | 38.5 | 4/16-SPPM | 4 | 16 | 4 | 1/16 |
| P4 |    | D6 | 2 | 253.0 | 24.0 | 5/32-MPPM | 5 | 32 | 32/5 = 6.4 | 1/2 |
| P4 |    | D7 | 2 | 202.4 | 19.2 | 1/8-OOK | 1 | 8 | 8 | 1/2 |
|    |    |    | 2 | 101.2 | 9.6 | 1/16-OOK | 1 | 16 | 16 | 1/2 |

| Proposal Format | | | Interleaving | Coding | | |
|---|---|---|---|---|---|---|
| Preamble | SFD Sequence | Payload | Interleaver Depth d | Code Rate r | Shortening Bit l | Forward Error Correction |
| P2 | S2 | D1 | 1 or 2 or 3 | (51-1)/(63-1) | 1 | (63, 51, 2)BCH |
|    |    |    | 1 |   |   |   |
| P2 | S2 | D2 | 2 |   |   |   |
| P3 | S3 | D3 | 3 |   |   |   |
|    |    |    | 3 |   |   |   |
| P3 | S3 | D4 | 1 |   |   |   |
| P3 | S3 | D5 | 4 |   |   |   |
|    |    |    | 4 |   |   |   |
| P4 | S4 | D6 | 5 |   |   |   |
| P4 | S4 | D7 | 1 |   |   |   |
|    |    |    | 1 |   |   |   |
| P2 |    | D1 | 1 or 2 or 3 | (51-1)/(63-1) | 1 | (63, 51, 2)BCH |
|    |    |    | 1 |   |   |   |
| P2 |    | D2 | 2 |   |   |   |
| P3 |    | D3 | 3 |   |   |   |
|    |    |    | 3 |   |   |   |
| P3 |    | D4 | 1 |   |   |   |
| P3 |    | D5 | 4 |   |   |   |
|    |    |    | 4 |   |   |   |
| P4 |    | D6 | 5 |   |   |   |
| P4 |    | D7 | 1 |   |   |   |
|    |    |    | 1 |   |   |   |

<Transmission Method of Ternary Preamble Sequence>

Hereinafter, a method of transmitting the designed ternary preamble sequence from a transmitter to a receiver will be described. Hereinafter, a scheme of generating a preamble sequence or a ternary preamble sequence may also be referred to as, for example, a ternary amplitude shift keying (TASK) and an ultra low power-ternary amplitude shift keying (ULP-TASK).

Figure 4:
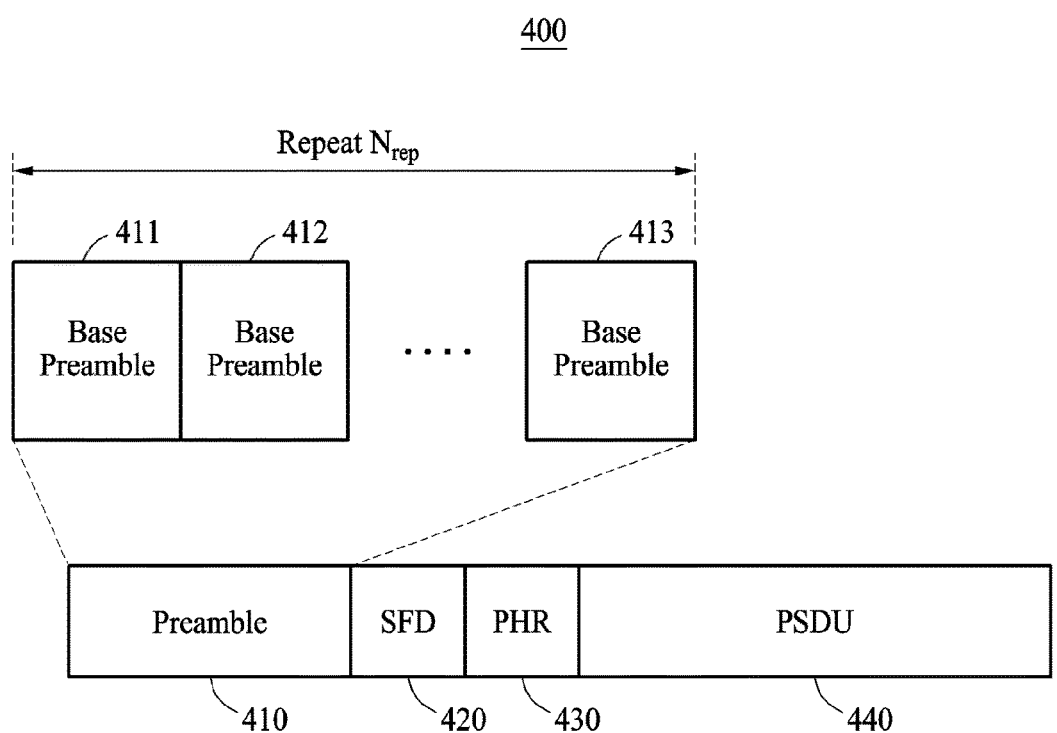
FIG. 4 is a diagram illustrating a transmission frame according to an exemplary embodiment of the present invention.

FIG. 4 is a diagram illustrating a transmission frame according to an exemplary embodiment of the present invention.

Referring to FIG. 4, a transmission frame 400 may include a preamble 410, a start frame delimiter (SFD) 420, a physical layer header (PHR) 430, and a physical service data unit (PSDU) 440. In an exemplary embodiment, a packet may be interchangeably used with the transmission frame 400.

The preamble 410 may be a bit string recorded at a head of the transmission frame 400. The preamble 410 may include a predetermined bit-pattern for time synchronization. The SFD 420 may identify a beginning of the frame, and identify re-verification of synchronization. Also, the SFD 420 may indicate a field for acquiring frame synchronization. The PHR 430 may be a field including information associated with a physical layer. For example, the information may be information on a length indicator, information on a used modulation scheme, and information on a used coding scheme. Also, the PHR 430 may include a field on a format of the PSDU 440 and a header check sequence (HCS). Here, the HCS may be used to determine whether an error occurs in the PHR 430.

The PSDU 440 may be a unit of uncoded data provided in a form of bits and transferred from an upper layer of the physical layer. The PSDU 440 may include data that is actually transmitted and received in the upper layer of the physical layer. In an exemplary embodiment, the PSDU 440 may also be expressed as a payload.

The preamble 410 may include $N_{rep}$ repetitive base preambles, for example, base preambles 411, 412, and 413. Each of the base preambles 411, 412, and 413 may be configured to be a base preamble sequence, i.e., a basic preamble sequence. For example, a bit corresponding to one base preamble sequence may be a base preamble. In an exemplary embodiment, base preamble sequences of a plurality of spreading factors corresponding to a plurality of coding schemes may be set to have correlation values orthogonal to one another.

Figure 5:
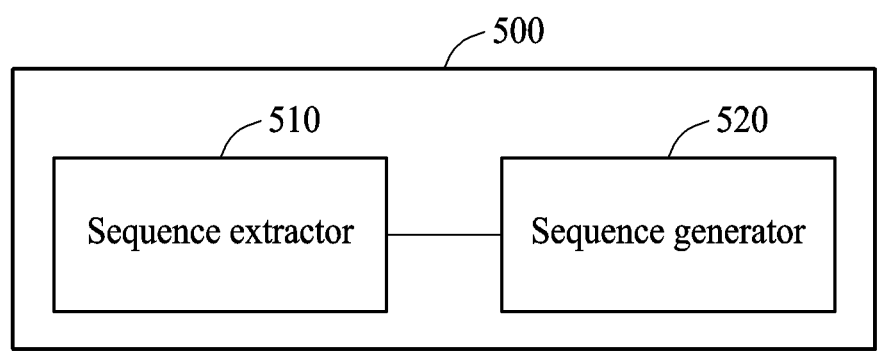
FIG. 5 is a block diagram illustrating an example of a transmitter according to an exemplary embodiment of the present invention.

FIG. 5 is a block diagram illustrating an example of a transmitter according to an exemplary embodiment of the present invention.

Referring to FIG. 5, a transmitter 500 may include a sequence extractor 510 and a sequence generator 520. Here, the transmitter 500 may correspond to, for example, the coherent transmitter 110 of FIG. 1.

The sequence extractor 510 may extract a first sequence and a second sequence from a ternary preamble sequence including elements −1, 0, and 1. Here, the ternary preamble sequence may indicate an entire preamble sequence transmitted from the transmitter 500 to a receiver, and may also indicate a base preamble sequence configuring a preamble. The first sequence may be a sequence including elements 0 and 1 for a non-coherent receiver. The second sequence may be a sequence including elements −1 and 1 for a coherent receiver. In an exemplary embodiment, the first sequence may also be expressed as a unipolar preamble sequence or a unipolar sequence, and the second sequence may also be expressed as a bipolar preamble sequence or a bipolar sequence. Also, elements included in the ternary preamble sequence, the first sequence, and the second sequence may also be expressed as chips.

The sequence extractor 510 may divide the ternary preamble sequence into the first sequence and the second sequence. In an example, the sequence extractor 510 may extract the first sequence by converting the elements of the ternary preamble sequence into absolute values based on a period of the first sequence. Here, the period of the first sequence may be determined in advance. For example, when a period N1 of the first sequence is 4, and when the ternary preamble sequence is [1 0 0 1 1 0 0 1 1 0 0 1 1 0 0 −1 −1 0 0 1 −1 0 0 1 −1 0 0 1 −1 0 0 −1], the sequence extractor 510 may convert the elements of the ternary preamble sequence into absolute values and extract a sequence [1 0 0 1 1 0 0 1 1 0 0 1 1 0 0 1 1 0 0 1 1 0 0 1 1 0 0 1] in which a sequence [1 0 0 1] is repeated. The transmitter 500 may extract the sequence [1 0 0 1] having N1 elements from the extracted sequence as the first sequence, N1 being the period of the first sequence.

In another example, the sequence extractor 510 may extract the second sequence by converting an element 0 of the elements of the ternary preamble sequence into an element 1 based on a period of the second sequence. Here, the period of the second sequence may be determined in advance. Thus, an element −1 of the ternary preamble sequence may remain as the element −1 in the second sequence, and the element 0 and the element 1 of the ternary preamble sequence may be the elements 1 in the second sequence. Also, the period of the second sequence may be longer than the period of the first sequence because the coherent receiver using the second sequence has a complexity and operational power greater than those of the non-coherent receiver using the first sequence.

For example, when a period N2 of the second sequence is 32, and when the ternary preamble sequence is [1 0 0 1 1 0 0 1 1 0 0 1 1 0 0 −1 −1 0 0 1 −1 0 0 1 −1 0 0 1 −1 0 0 −1], the sequence extractor 510 may convert the element 0 of the elements of the ternary preamble sequence into the element 1 and extract a sequence [1 1 1 1 1 1 1 1 1 1 1 1 1 1 1 −1 −1 1 1 1 −1 1 1 1 −1 1 1 1 −1 1 1 −1]. In this example, since the number of elements of the extracted sequence is 32, the period N2 is the same as the number of elements, 32. Thus, the transmitter 500 may determine the extracted sequence to be the second sequence.

In an exemplary embodiment, the transmitter 500 may include a storage (not shown) to store the first sequence and the second sequence extracted by the sequence extractor 510.

The sequence generator 520 may reconstruct the ternary preamble sequence using the first sequence and the second sequence extracted by the sequence extractor 510. The sequence generator 520 may generate a third sequence by mapping the first sequence and the second sequence to a preamble sequence including a plurality of bits. Here, the third sequence may indicate the reconstructed ternary preamble sequence and may be supported in the non-coherent receiver and the coherent receiver.

A preamble may be in a structure in which a base preamble is repeated $N_{rep}$ times. In this instance, the base preamble may correspond to one or more bits of the preamble. A preamble sequence included in the preamble may be in a structure in which at least one base preamble sequence is repeated. For example, when the preamble includes 32 bits, one base preamble may correspond to one bit of the preamble and also correspond to 32 bits of the preamble. When one base preamble sequence corresponds to one bit of the preamble, the preamble sequence may be in a structure in which 32 base preamble sequences are repeated. When one base preamble sequence corresponds to 32 bits of the preamble, the preamble sequence may be configured with the one base preamble sequence. The number of bits corresponding to the base preamble sequence may be determined in advance. In consideration of the structures of the preamble, the sequence generator 520 may generate the third sequence by reconstructing the first sequence and the second sequence.

In an exemplary embodiment, the sequence generator 520 may include a first mapper (not shown) and a second mapper (not shown). For example, the first mapper and the second mapper may also be expressed as a first chip value mapper and a second chip value mapper, respectively.

The first mapper may map the first sequence to every one or more bits of the preamble with respect to the plurality of bits of the preamble. Here, the one or more bits may indicate a bit corresponding to the base preamble sequence in the preamble, and may also indicate a predetermined number of bits irrespective of the base preamble. The first mapper may map the first sequence of one period to the one or more bits. For example, when the at least one unit is one bit, the first mapper may assign N1 elements to every one bit based on the period N1 of the first sequence. Also, the first mapper may map an element corresponding to each index to one bit while sequentially increasing an index. In this example, the sequence generator 520 may use a modulo counter based on the period N1 of the first sequence, that is, a modulo N1 counter as an index counter to increase the index of the first sequence.

The second mapper may generate the third mapper by mapping the second sequence to the first sequence that is mapped to every one or more bits of the preamble. For example, the one or more bits to which the first sequence is assigned is one bit, the second mapper may assign N2 elements to every one bit based on the period N2 of the second sequence. Also, the second mapper may map an element corresponding to each index to one bit while sequentially increasing an index. In this example, the sequence generator 520 may use a modulo counter based on the period N2 of the second sequence, that is, a modulo N2 counter as an index counter to increase the index of the second sequence.

The second mapper may multiply the first sequence mapped to the one or more bits of the preamble by the second sequence. For example, when the first sequence mapped to the one or more bits of the preamble is [1 0 0 1], and when the second sequence is [1 1 1 1 1 1 1 1 1 1 1 1 1 1 −1 −1 1 1 1 −1 1 1 1 −1 1 1 1 −1 1 1 1 −1 1 1 1 −1], the second mapper may multiply the first sequence by second sequence to generate the third sequence [1 0 0 1 1 0 0 1 1 0 0 1 1 0 0 −1 −1 0 0 1 −1 0 0 1 −1 0 0 1 −1 0 0 −1]. In this example, the period N1 of the first sequence may be 4 and the period N2 of the second sequence may be 32. Thus, the second mapper may expand the first sequence by repeating the first sequence eight times corresponding to a ratio between the period N1 of the first sequence and the period N2 of the second sequence and multiply the expanded first sequence [1 0 0 1 1 0 0 1 1 0 0 1 1 0 0 1 1 0 0 1 1 0 0 1 1 0 0 1 1 0 0 1] by the second sequence, thereby generating the third sequence [1 0 0 1 1 0 0 1 1 0 0 1 1 0 0 −1 −1 0 0 1 −1 0 0 1 −1 0 0 1 −1 0 0 −1].

In an example, the sequence generator 520 may include a first binary mapper and a second binary mapper. The first binary mapper may map the first sequence to every one or more bits of the preamble. Since the first sequence includes the elements 0 and 1, the first binary mapper may fully use the first sequence.

The second binary mapper may convert the elements of the second sequence into binary values. In this example, the second sequence may include the elements −1 and 1 and −1 is not a binary value. Thus, the second binary mapper cannot use the second sequence. Accordingly, the second binary mapper may convert the elements of the second sequence into the binary values by converting the element −1 of the second sequence into the element 1 and converting the element 1 into the element 0. The second binary mapper may aggregate the first sequence that is mapped to the one or more bits of the preamble with the second sequence of which the elements are converted into the binary values, thereby generating the third sequence. The third sequence generated by aggregating the first sequence with the second sequence may be a sequence having an $n^{th}$ sub-sequence of which a length is 2. In the $n^{th}$ sub-sequence, a first element may correspond to an $n^{th}$ element of the first sequence and a second element may correspond to an $n^{th}$ element of the second sequence. For example, when the first sequence is [1 0 0 1], and when the second sequence of which the elements are converted into the binary values is [1 0 0 0], the third sequence generated by aggregating the first sequence with the second sequence may be [[1 1][0 0][0 0][1 0]].

The sequence generator 520 may generate a base preamble sequence corresponding to the one or more bits of the preamble and repeat the base preamble sequence the predetermined number of times, thereby generating the third sequence. In this instance, the sequence generator 520 may repetitively expand the first sequence based on the ratio between the period of the first sequence and the period of the second sequence and multiply the expanded first sequence by the second sequence to generate the base preamble sequence. For example, the first sequence may be [1 0 1 0 0 1 0 1], and the second sequence may be [1 1 −1 1 1 −1 1 −1 1 1 1 1 −1 1 1 1 1 1 1 −1 1 1 1 −1 1 1 −1 1 1 1 1 1 1]. In this example, since the period N1 of the first sequence is 8 and the period N2 of the second sequence is 32, the ratio between the period N1 of the first sequence and the period N2 of the second sequence may be 4. Thus, the sequence generator 520 may repetitively expand the first sequence four times corresponding to the ratio between the period N1 and the period N2 and multiply the expanded first sequence [1 0 1 0 0 1 0 1 1 0 1 0 0 1 0 1 1 0 1 0 0 1 0 1 1 0 1 0 0 1 0 1] by the second sequence, thereby generating the base preamble sequence [1 0 −1 0 0 −1 0 −1 1 0 1 0 0 −1 0 1 1 0 1 0 0 −1 0 1 −1 0 1 0 0 1 0 1]. When the predetermined number of repetitions $N_{rep}$ is 8, the sequence generator 520 may generate a preamble sequence by repeating the base preamble sequence eight times and map the preamble sequence to the plurality of bits of the preamble.

As the foregoing, the transmitter 500 may extract the first sequence and the second sequence from the ternary preamble sequence, reconstruct the first sequence and the second sequence, and generate the third sequence. Accordingly, the transmitter 500 may pre-store the first sequence and the second sequence without need to fully store the ternary preamble sequence. Thus, an amount of data stored in the transmitter 500 may be reduced. Also, it is possible to flexibly react in response to a request for correcting a preamble sequence of one of the non-coherent receiver and the coherent receiver.

As indicated by the base preambles 411 through 413 of FIG. 4, the preamble may include a base preamble pattern having 32 elements or chips and the predetermined number of repetitions $N_{rep}$. In this example, two preamble formats P1 and P2 may be defined. The base preamble sequence may have the base preamble pattern and the number of repetitions $N_{rep}$ varying based on a preamble format as shown in Table 32.

TABLE 32

| Preamble format | Base preamble pattern | Number of repetitions ($N_{rep}$) |
|---|---|---|
| P1 | [1 0 0 1 1 0 0 1 1 0 0 1 1 0 0 −1 −1 0 0 1 −1 0 0 1− 1 0 0 1 −1 0 0 −1] | 4 |
| P2 | [1 0 −1 0 0 −1 0 −1 1 0 1 0 0 −1 0 1 1 0 1 0 0 −1 0 1 −1 0 1 0 0 1 0 1] | 8 |

The preamble formats P1 and P2 may include two 32 bits ternary sequences. Due to different complexity limitations of the coherent receiver and the non-coherent receiver, the base preamble sequences based on the preamble formats P1 and P2 may have different period to transmit a common sequence to the coherent receiver and the non-coherent receiver. For example, a preamble for the coherent receiver may be designed based on a repetitive expansion of a preamble for the non-coherent receiver. Thus, spreading factors of the preamble patterns P1 and P2 for the coherent receiver may each be 32. Also, spreading factors of the preamble factors P1 and P2 for the non-coherent receiver may be 4 and 8, and may correspond to a 4 bits binary sequence and an 8 bits binary sequence, for example, [1 0 0 1] and [1 0 1 0 0 1 0 1], which are orthogonal to each other. The preamble format may inherently classify a coding format for a PSDU associated with a throughput efficiency of a PSDU format and a spreading format or a spreading factor for an SFD/PHR. In this example, the first sequence, the period of the first sequence, the second sequence, and the period of the second sequence may have corresponding values based on the preamble format as shown in Table 33.

TABLE 33

| Preamble format | First sequence | Period of first sequence (N1) | Second sequence |
|---|---|---|---|
| P1 | [1 0 0 1] | 4 | [1 1 1 1 1 1 1 1 1 1 1 1 1 1 1 1 −1 −1 1 1 1 −1 1 1 1 −1 1 1 1 −1 1 1 1 −1 ] |
| P2 | [1 0 1 0 0 1 0 1] | 8 | [1 1 −1 1 1 −1 1 −1 1 1 1 1 1 −1 1 1 1 1 1 1 1 −1 1 1 1 −1 1 1 1 1 1 1 1 ] |

The transmitter 500 may include a frame transmitter (not shown). The frame transmitter (not shown) may generate a transmission frame including a preamble field, an SFD field, a PHR field, and a PSDU field. In this instance, the preamble field may include the third sequence generated by the sequence generator 520. The frame transmitter (not shown) may transmit the transmission frame to at least one of the non-coherent receiver and the coherent receiver.

Figure 6:
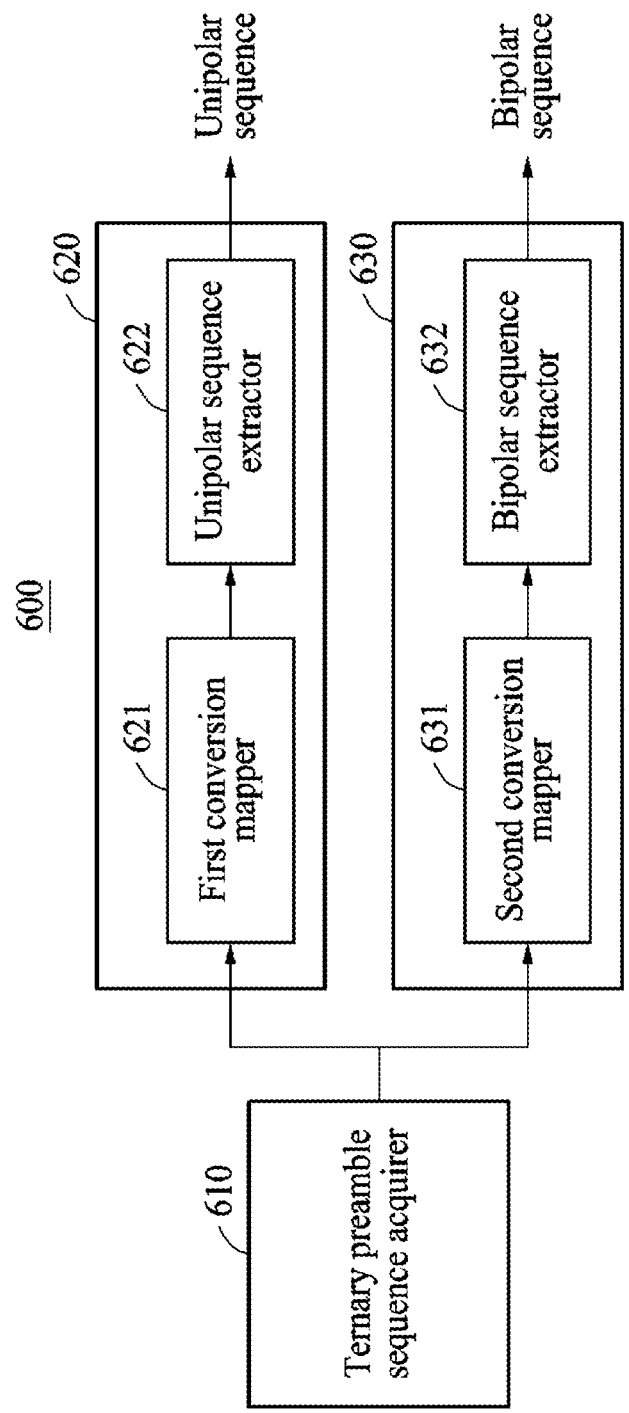
FIG. 6 is a block diagram illustrating a sequence extractor according to an exemplary embodiment of the present invention.

FIG. 6 is a block diagram illustrating a sequence extractor according to an exemplary embodiment of the present invention.

Referring to FIG. 6, a sequence extractor 600 may include a ternary preamble sequence acquirer 610, a first sequence extractor 620, and a second sequence extractor 630.

The ternary preamble sequence acquirer 610 may acquire a ternary preamble sequence. Here, the ternary preamble sequence may be a sequence including elements of −1, 0, and 1. The ternary preamble sequence may indicate an entire preamble sequence and also indicate a base preamble sequence included in a preamble. In an exemplary embodiment, the ternary preamble sequence acquirer 610 may receive the ternary preamble sequence from an external source, and also acquire the ternary preamble sequence from a storage in which the ternary preamble sequence is stored in advance.

The first sequence extractor 620 may include a first conversion mapper 621 and a unipolar sequence extractor 622. The first conversion mapper 621 may convert the elements of the ternary preamble sequence into absolute values. Consequently, the first conversion mapper 621 may convert an element −1 of the ternary preamble sequence into an element 1. The unipolar sequence extractor 622 may extract a unipolar sequence based on a period of the unipolar sequence. Here, the period of the unipolar sequence may be determined in advance. For example, when a sequence converted in the first conversion mapper 621 is [1 0 0 1 1 0 0 1 1 0 1 1 0 0 1 1 0 0 1 1 0 0 1 1 0 0 1 1 0 0 1], and when the period of the unipolar sequence is 4, the unipolar sequence extractor 622 may extract a unipolar sequence [1 0 0 1] from the converted sequence.

The second sequence extractor 630 may include a second conversion mapper 631 and a bipolar sequence extractor 632. The second conversion mapper 631 may convert an element 0 of the elements of the ternary preamble sequence into the element 1. The bipolar sequence extractor 632 may extract a bipolar sequence based on a period of the bipolar sequence. Here, the period of the bipolar sequence may be determined in advance. For example, when a sequence converted in the second conversion mapper 631 is [1 1 1 1 1 1 1 1 1 1 1 1 −1 −1 1 1 1 −1 1 1 −1 1 1 1 −1 1 1−1], and when the period of the bipolar sequence is 32, the bipolar sequence extractor 632 may extract the converted sequence to be the bipolar sequence.

Figure 7:
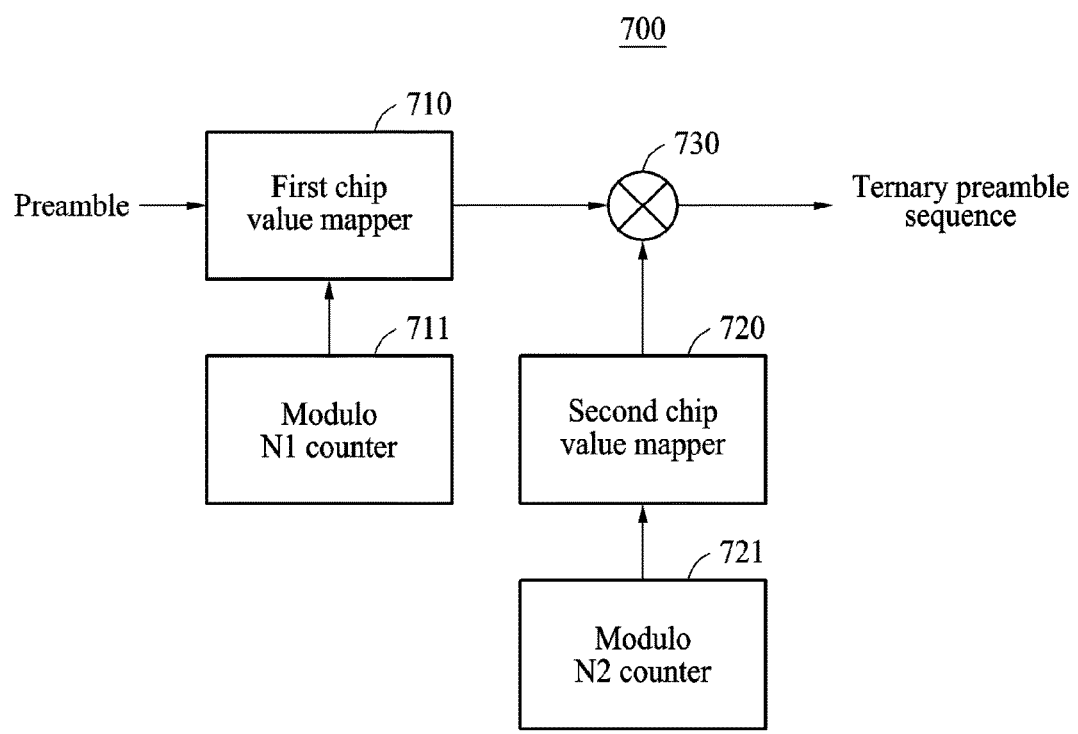
FIGS. 7 and 8 illustrate an example of a sequence generator according to an exemplary embodiment of the present invention.
Figure 8:
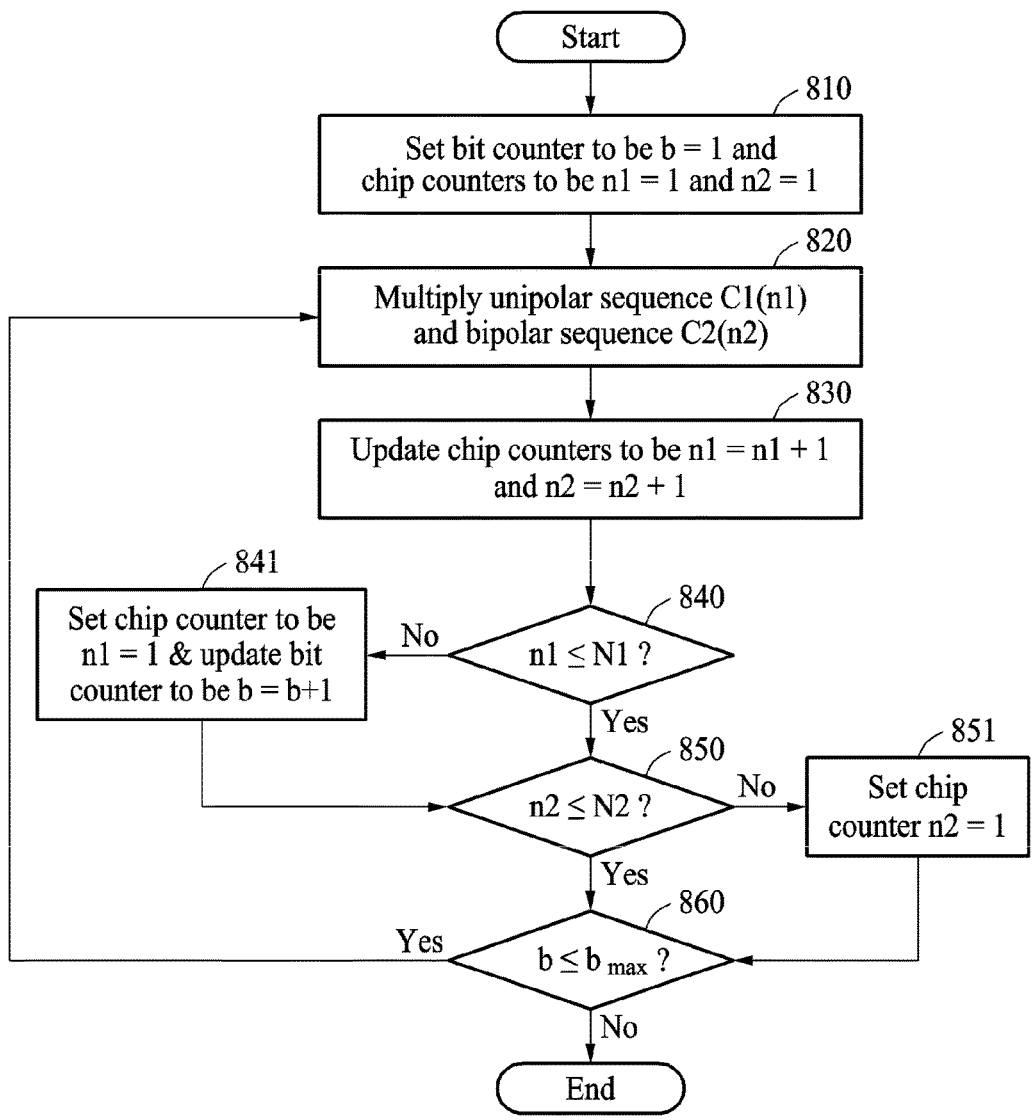

FIGS. 7 and 8 illustrate an example of a sequence generator according to an exemplary embodiment of the present invention.

FIG. 7 is a block diagram illustrating a sequence generator according to an exemplary embodiment of the present invention.

Referring to FIG. 7, a sequence generator 700 may include a first mapper 710, a modulo N1 counter 711, a second mapper 720, a modulo N2 counter 721, and a multiplier 730. Here, N1 denotes a period of a unipolar sequence, and N2 denotes a period of a bipolar sequence.

With respect to the plurality of bits in the preamble, the first mapper 710 may map a unipolar sequence to every one or more bits of the preamble. Here, the unipolar sequence may indicate a sequence recognizable in a non-coherent receiver and include elements or chips of 0 and 1. The first mapper 710 may map the unipolar sequence of one period to every one or more bits. The first mapper 710 may assign N1 elements to the one or more bits, N1 being a period of the unipolar sequence. Also, first mapper 710 may map an element corresponding to each index to the one or more bits while sequentially increasing an index. In this example, the first mapper 710 may use the modulo N1 counter 711 as an index counter to map the unipolar sequence to the one or more bits. For example, when the unipolar sequence is [1 0 0 1], a modulo N1 counter may set indices of the elements of the unipolar sequence to be 1, 2, 3, and 4 in sequence.

Based on the index, the first mapper 710 may sequentially map the elements 1, 0, 0, and 1 to one or more bits.

The second mapper 720 may provide a bipolar sequence to the multiplier 730. Here, the bipolar sequence may indicate a sequence recognizable in a coherent receiver and include elements or chips of −1 and 1. Although FIG. 7 illustrates the second mapper 720 separate from the multiplier 730 as an example, the second mapper 720 may also include the multiplier 730.

The second mapper 720 may provide the bipolar sequence to the multiplier 730 using the modulo N2 counter 721 as the index counter. For example, when the bipolar sequence is [1 1 1 1 1 1 1 1 1 1 1 1 1 1 −1 −1 1 1 1 −1 1 1 1 −1 1 1 1 −1 1 1 1 −1], the modulo N2 counter 721 may set indices of the elements of the bipolar sequence to be 1 through 32. Based on the index, the second mapper 720 may sequentially provide the elements of the bipolar sequence to the multiplier 730.

The multiplier 730 may generate the ternary preamble sequence or a ternary preamble chip sequence by multiplying the unipolar sequence that is mapped to every one or more bits by the bipolar sequence received from the second mapper 720.

FIG. 8 is a flowchart illustrating an operation of a sequence generator according to an exemplary embodiment of the present invention.

Referring to FIG. 8, in operation 810, a sequence generator may set a bit counter b to be 1, and set chip counters n1 and n2 to be 1. Here, a chip may be an element of a sequence. The chip counter n1 may correspond to an index of a unipolar sequence and the chip counter n2 may correspond to an index of a bipolar sequence.

In operation 820, the sequence generator may multiply a unipolar sequence C1(n1) and a bipolar sequence C2(n2). Since the chip counters n1 and n2 are set to be 1 in operation 810, the sequence generator may multiply a unipolar sequence C1(1) and a bipolar sequence C2(1). In operation 830, the sequence generator may update the chip counter n1 to be n1+1 and update the chip counter n2 to be n2+1. The updating may also be increasing each of an index of the unipolar sequence C1 and an index of the bipolar sequence C2 by 1.

In operation 840, the sequence generator may determine whether the chip counter n1 is less than or equal to N1. Here, N1 may be a period of the unipolar sequence. When the chip counter n1 is greater than N1, the sequence generator may set the chip counter n1 to be 1, update the bit counter b with a bit counter b+1, and perform operation 850.

In operation 850, when the chip counter n1 is less than or equal to N1, the sequence generator may determine whether the chip counter n2 is less than or equal to N2. Here, N2 may be a period of the bipolar sequence. When the chip counter n2 is greater than N2, the sequence generator may set the chip counter n2 to be 1 and perform operation 860.

In operation 860, when the chip counter n2 is less than or equal to N2, the sequence generator may determine whether the bit counter b is less than or equal to $b_{max}$. Here, $b_{max}$ may be a number of times that the unipolar sequence is repetitively mapped in all bits of a preamble. When the bit counter b is less than or equal to $b_{max}$, the sequence generator may repetitively perform operations 820 through 860. When the bit counter b is greater than $b_{max}$, the sequence generator may generate a ternary sequence by setting values obtained through the multiplication in operation 820 to be elements of the ternary sequence.

For example, when the unipolar sequence C1 is [1 0 0 1], and when the bipolar sequence C2 is [1 1 1 1 1 1 1 1 1 1 1 1 1 −1 −1 1 1 −1 1 1 1 −1 1 1 1 −1 1 1 1 −1 1 1 −1], the sequence generator may set each of the bit counter b, the chip counter n1, and the chip counter n2 to be 1. In operation 820, the sequence generator may multiply 1 corresponding to a first element of the unipolar sequence and 1 corresponding to a first element of the bipolar sequence C2. In operation 830, the sequence generator may update the chip counter n1 to be 2, and update the chip counter n2 to be 2. As a result of determining whether the chip counter n1 is less than or equal to N1 in operation 840, the chip counter n1 may be 2 and less than 4 corresponding to N1. Thus, the sequence generator may perform operation 850. As a result of determining whether the chip counter n2 is less than or equal to N2 in operation 850, the chip counter n2 may be 2 and less than 32 corresponding to N2. Thus, the sequence generator may perform operation 860. When $b_{max}$ is previously set as 32, a result of determining whether the bit counter b is less than or equal to $b_{max}$ in operation 860 may be 1 and less than $b_{max}$, 32. Thus, the sequence generator may repetitively perform operations 820 through 860.

Through repetition of the aforementioned procedure, when four elements of the unipolar sequence are multiplied by four elements of the bipolar sequence, the chip counter n1 may be 5. Accordingly, the chip counter n1 may be determined to be greater than N1 in operation 840, and the sequence generator may perform operation 841 to set the chip counter n1 to be 1 and update the bit counter b to be 2.

Through the repetition of the aforementioned procedure, when the unipolar sequence is repeated 8 times and multiplied by the bipolar sequence, the chip counter n2 may be 33. Accordingly, the chip counter n2 may be determined to be greater than N2 in operation 850, and the sequence generator may perform operation 850 to set the chip counter to be 1.

Through the repetition of the aforementioned procedure, when the unipolar sequence is repeated 32 times, the bipolar sequence is repeated 4 times, and the elements of the repeated unipolar sequence are multiplied by the elements of the bipolar sequence, the bit counter may be 5. In this example, the bit counter b may be determined to be greater than $b_{max}$ in operation 860 and thus, the sequence generator may generate a ternary sequence by setting values obtained through the multiplication in operation 820 to be elements of the ternary sequence. Accordingly, the ternary sequence may include 128 elements obtained by repeating the unipolar sequence 32 times and the bipolar sequence 4 times and multiplying the repeated unipolar sequence and the repeated bipolar sequence.

Figure 9:
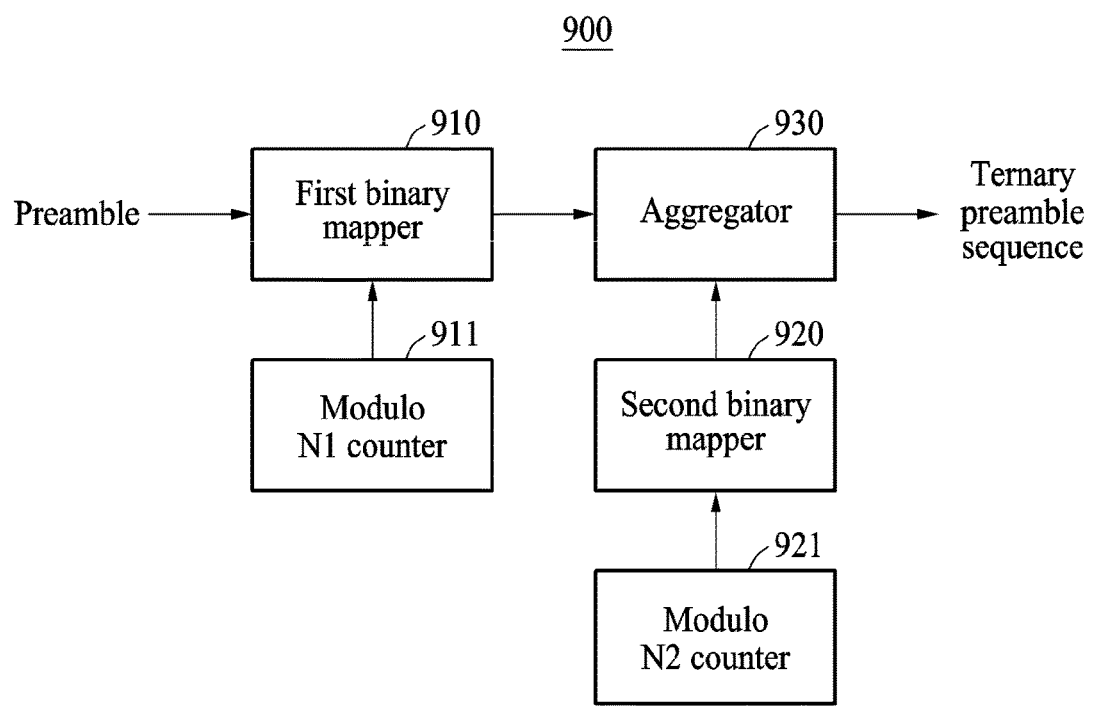
FIG. 9 illustrates another example of a sequence generator according to an exemplary embodiment of the present invention.

FIG. 9 illustrates another example of a sequence generator according to an exemplary embodiment of the present invention.

Referring to FIG. 9, a sequence generator 900 may include a first binary mapper 910, a modulo N1 counter 911, a second binary mapper 920, a modulo N2 counter 921, and an aggregator 930. Here, N1 denotes a period of a unipolar sequence, and N2 denotes a period of a bipolar sequence.

With respect to the plurality of bits in the preamble, the first binary mapper 910 may map the unipolar sequence to every one or more bits of the preamble. The first binary mapper 910 may map the unipolar sequence of one period to every one or more bits. The first binary mapper 910 may assign N1 elements to the one or more bits, N1 being a period of the unipolar sequence. Also, the first binary mapper 910 may map an element corresponding to each index to the one or more bits while sequentially increasing an index. In this example, the first binary mapper 910 may use the modulo N1 counter 911 as an index counter to map the unipolar sequence to the one or more bits.

The second binary mapper 920 may provide the bipolar sequence to the aggregator 930. Although FIG. 9 illustrates the second binary mapper 920 separate from the aggregator 930 as an example, the second binary mapper 920 may also include the aggregator 930. The second binary mapper 920 may convert elements of the bipolar sequence into binary values. In this example, the bipolar sequence may include the elements −1 and 1 and −1 is not a binary value. Thus, the second binary mapper 920 does not use the bipolar sequence.

Accordingly, the second binary mapper 920 may convert the bipolar sequence into the binary values by converting an element −1 into an element 1 and converting the element 1 into an element 0 in the bipolar sequence. The second binary mapper 920 may use the modulo N2 counter 921 to sequentially provide the converted bipolar sequence to the aggregator 930.

The aggregator 930 may generate a ternary preamble sequence or a ternary preamble chip sequence by aggregating the unipolar sequence mapped to every one or more bits of the preamble with the bipolar sequence received from the second binary mapper 920.

FIG. 10 is a diagram illustrating an example of generating a ternary sequence according to an exemplary embodiment of the present invention.

Referring to FIG. 10, a preamble format may be defined as P1 and P2. Based on the preamble format, a number of repetitions $N_{rep}$, a base preamble pattern, and a base preamble in a receiver may be determined in advance. For example, as shown in Table 1000, based on a preamble format P1, the number of repetitions $N_{rep}$ may be set to 4, and the base preamble pattern may be set to be [1 0 0 1 1 0 0 1 1 0 0 1 1 0 0 −1 −1 0 0 1 −1 0 0 1 −1 0 0 1 −1 0 0 −1]. Based on a preamble format P2, the number of repetitions $N_{rep}$ may be set to 8, and the base preamble pattern may be set to be [1 0 −1 0 0 −1 0 −1 1 0 1 0 0 −1 0 1 1 0 1 0 0 −1 0 1 −1 0 1 0 0 1 0 1]. The transmitter may extract a unipolar sequence and a bipolar sequence from the base preamble pattern. The transmitter may extract an equivalent base preamble pattern in a non-coherent receiver by converting elements of the base preamble pattern into absolute values, and extract an equivalent base preamble pattern in a coherent receiver by converting an element 0 among the elements of the base preamble pattern into an element 1. The transmitter may extract the unipolar sequence from the equivalent base preamble pattern in the non-coherent receiver, and extract the bipolar sequence from the equivalent base preamble pattern in the coherent receiver.

Also, the transmitter may generate a ternary preamble sequence by restructuring the unipolar sequence and the bipolar sequence. For example, when the preamble format is defined as P1, the transmitter may repeat a unipolar sequence 1011 thirty two times, repeat a bipolar sequence 1012 four times, and generate a ternary preamble sequence by restructuring the repeated unipolar sequence and bipolar sequence. Also, when the preamble format is defined as P2, the transmitter may repeat a unipolar sequence 1021 thirty two times, repeat a bipolar sequence 1022 eight times, and generate a ternary preamble sequence by restructuring the repeated unipolar sequence and bipolar sequence. The transmitter may transmit the generated ternary preamble sequence to the non-coherent receiver and the coherent receiver.

Figure 11:
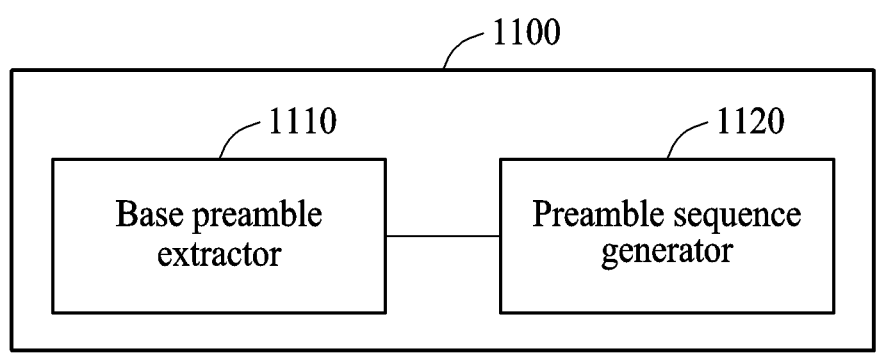
FIG. 11 is a block diagram illustrating another example of a transmitter according to an exemplary embodiment of the present invention.

FIG. 11 is a block diagram illustrating another example of a transmitter according to an exemplary embodiment of the present invention.

Referring to FIG. 11, a transmitter 1100 may include a base preamble extractor 1110 and a preamble sequence generator 1120.

The base preamble extractor 1110 may extract a base preamble pattern based on a preamble format of a preamble. In this example, the base preamble extractor 1110 may extract the base preamble pattern and a predetermined number of repetitions from Table 32 based on one of a preamble format P1 and a preamble format P2 of Table 32.

The preamble sequence generator 1120 may repeat the base preamble pattern a predetermined number of times to generate a preamble sequence supported in a non-coherent receiver and a coherent receiver.

Also, the transmitter 1100 may include a frame transmitter.

The frame transmitter may transmit a transmission frame including a preamble file including the preamble sequence, an SFD field, a PHR field, and a PSDU field to at least one of the non-coherent receiver or the coherent receiver.

Since the descriptions related to FIGS. 1 through 10 are also applicable here, repeated descriptions of the transmitter of FIG. 11 will be omitted.

Figure 12:
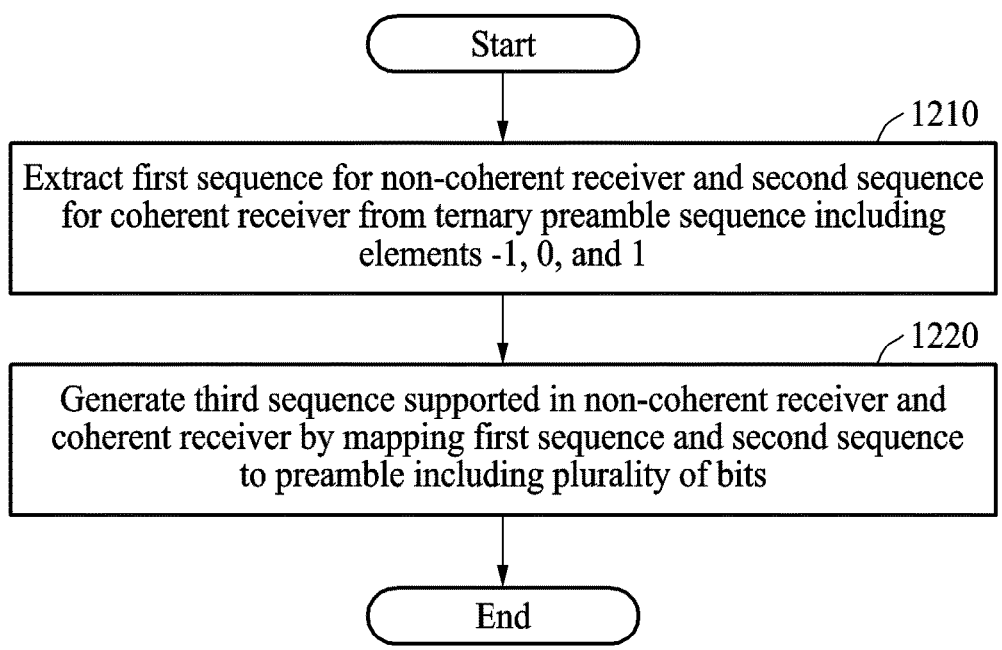
FIG. 12 is a flowchart illustrating a sequence transmitting method according to an exemplary embodiment of the present invention.

FIG. 12 is a flowchart illustrating a sequence transmitting method according to an exemplary embodiment of the present invention.

Referring to FIG. 12, in operation 1210, a transmitter may extract a first sequence for a non-coherent receiver and a second sequence for a coherent receiver from a ternary preamble sequence including elements −1, 0, and 1.

In operation 1220, the transmitter may generate a third sequence supported in the non-coherent receiver and the coherent receiver by mapping the first sequence and the second sequence to a preamble including a plurality of bits.

Since the descriptions related to FIGS. 1 through 10 are also applicable here, repeated descriptions of the sequence transmitting method in FIG. 12 will be omitted.

Figure 13:
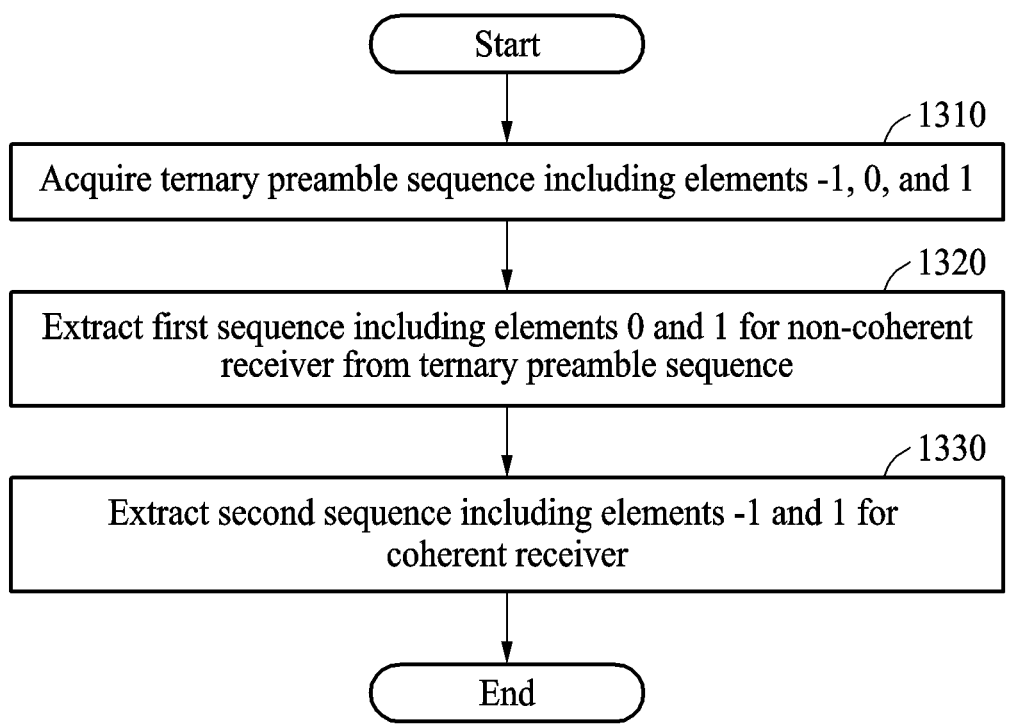
FIG. 13 is a flowchart illustrating a sequence extracting method according to an exemplary embodiment of the present invention.

FIG. 13 is a flowchart illustrating a sequence extracting method according to an exemplary embodiment of the present invention.

Referring to FIG. 13, in operation 1310, a sequence extracting device may acquire a ternary preamble sequence including elements −1, 0, and 1.

In operation 1320, the sequence extracting device may extract a first sequence including elements 0 and 1 for a non-coherent receiver from the ternary preamble sequence.

In operation 1330, the sequence extracting device may extract a second sequence including elements −1 and 1 for a coherent receiver.

Since the descriptions related to FIGS. 1 through 10 are also applicable here, repeated descriptions of the sequence extracting method in FIG. 13 will be omitted.

Figure 14:
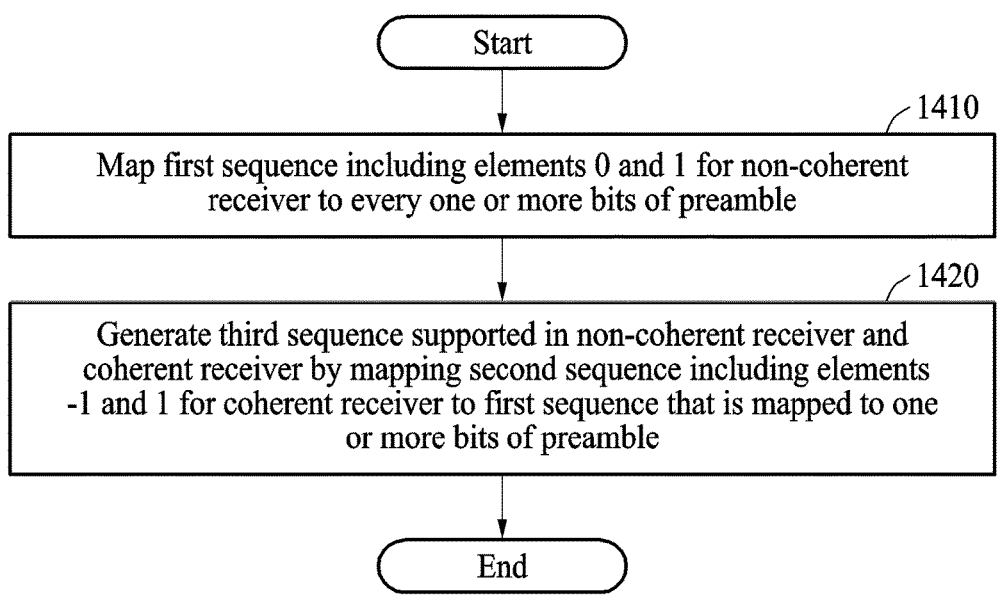
FIG. 14 is a flowchart illustrating a sequence generating method according to an exemplary embodiment of the present invention.

FIG. 14 is a flowchart illustrating a sequence generating method according to an exemplary embodiment of the present invention.

Referring to FIG. 14, in operation 1410, a sequence generating device may map a first sequence including elements 0 and 1 for a non-coherent receiver to every one or more bits of a preamble.

In operation 1420, the sequence generating device may generate a third sequence supported in the non-coherent receiver and a coherent receiver by mapping a second sequence including elements −1 and 1 for the coherent receiver to the first sequence that is mapped to the one or more bits of the preamble.

Since the descriptions related to FIGS. 1 through 10 are also applicable here, repeated descriptions of the sequence transmitting method in FIG. 14 will be omitted.

Figure 15:
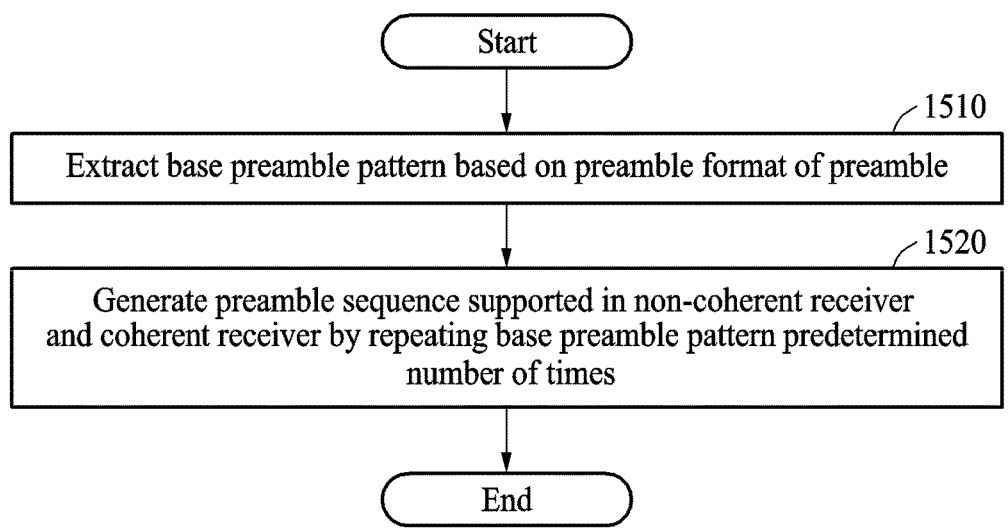
FIG. 15 is a flowchart illustrating a preamble sequence generating method according to an exemplary embodiment of the present invention.

FIG. 15 is a flowchart illustrating a preamble sequence generating method according to an exemplary embodiment of the present invention.

Referring to FIG. 15, in operation 1510, a transmitter may extract a base preamble pattern based on a preamble format of a preamble.

In operation 1520, the transmitter may generate a preamble sequence supported in a non-coherent receiver and a coherent receiver by repeating the base preamble pattern a predetermined number of times.

Since the descriptions related to FIGS. 1 through 10 are also applicable here, repeated descriptions of the preamble sequence generating method in FIG. 15 will be omitted.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts.

Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A transmitter comprising:
a sequence extractor configured to extract a first sequence for a non-coherent receiver and a second sequence for a coherent receiver from a ternary preamble sequence including elements −1, 0, and 1; and
a sequence generator configured to generate a third sequence supported by both the non-coherent receiver and the coherent receiver by mapping the first sequence and the second sequence to bits of a preamble,
wherein the sequence extractor is further configured to extract the first sequence by converting the elements of the ternary preamble sequence into absolute values, so that the first sequence comprises the elements 0 and 1, for the non-coherent receiver, and to extract the second sequence by converting the element 0 of the ternary preamble sequence into the element 1, so that the second sequence comprises the elements −1 and 1, for the coherent receiver.

2. The transmitter of claim 1, wherein the sequence generator includes:
a first mapper configured to map the first sequence to the bits of the preamble; and
a second mapper configured to generate the third sequence by mapping the second sequence to the first sequence that has been mapped to the bits of the preamble.

3. The transmitter of claim 2, wherein the first mapper is further configured to increase an index of the first sequence based on a modulo counter corresponding to a period of the first sequence and map an element of the first sequence corresponding to the index to a respective bit of the preamble.

4. The transmitter of claim 2, wherein the second mapper is further configured to increase an index of the second sequence based on a modulo counter corresponding to a period of the second sequence and map an element of the second sequence corresponding to the index to the mapped first sequence.

5. The transmitter of claim 2, wherein the second mapper is further configured to multiply the mapped first sequence by the second sequence.

6. The transmitter of claim 5, wherein the second mapper is further configured to repetitively expand the first sequence based on a ratio between a period of the first sequence and a period of the second sequence and multiply the expanded first sequence by the second sequence.

7. The transmitter of claim 1, wherein the sequence generator includes:
a first binary mapper configured to map the first sequence the bits in the preamble; and
a second binary mapper configured to convert the elements of the second sequence into binary values and aggregate the converted second sequence with the mapped first sequence.

8. The transmitter of claim 7, wherein the second binary mapper is further configured to convert the element −1 into the element 1 in the second sequence and to convert the element 1 into the element 0 in the second sequence.

9. The transmitter of claim 2, wherein a period of the first sequence is shorter than a period of the second sequence.

10. The transmitter of claim 1, wherein the sequence generator is further configured to generate a base preamble sequence corresponding to the bits of the preamble and generate the third sequence by repeating the base preamble sequence a number of times.

11. The transmitter of claim 10, wherein the sequence generator is further configured to generate the base preamble sequence by repetitively expanding the first sequence based on a ratio between a period of the first sequence and a period of the second sequence and multiplying the expanded first sequence by the second sequence.

12. The transmitter of claim 10, wherein a preamble format of the preamble is a first preamble format P1 or a second preamble format P2, and the base preamble sequence has a base preamble pattern and a number of repetitions based on the first preamble format P1 or the second preamble format P2.

13. The transmitter of claim 12, wherein each of the first sequence, a period of the first sequence, the second sequence, and a period of the second sequence has a value associated with the first preamble format P1 or the second preamble format P2, respectively.

14. The transmitter of claim 1, further comprising: a frame transmitter configured to transmit a transmission frame including a preamble field including the third sequence, a start frame delimiter (SFD) field, a physical layer header (PHR) field, and a physical service data unit (PSDU) field to the at least one among the non-coherent receiver and the coherent receiver.

15. A device for extracting a sequence and comprising a microprocessor, the microprocessor comprising:
a ternary preamble sequence acquirer configured to acquire a ternary preamble sequence including elements −1, 0, and 1;
a first sequence extractor configured to extract, from the ternary preamble sequence, a first sequence to be comprised of the elements 0 and 1, for a non-coherent receiver, by converting the elements of the ternary preamble sequence into absolute values; and
a second sequence extractor configured to extract, from the ternary preamble sequences, a second sequence to be comprised of the elements −1 and 1, for a coherent receiver, by converting the element 0 of the ternary preamble sequence into the element 1.

16. The device of claim 13, further comprising: a storage configured to store the first sequence and the second sequence.

17. A device for generating a sequence and comprising a microprocessor, the microprocessor comprising:
a first mapper configured to map a first sequence including elements 0 and 1 for a non-coherent receiver to bits of a preamble; and
a second mapper configured to generate a third sequence by mapping a second sequence including the elements −1 and 1 for a coherent receiver to the first sequence that has been mapped to the bits of the preamble,
wherein the first mapper is further configured to increase, with respect to the bits of the preamble, an index of the first sequence based on a modulo counter corresponding to a period of the first sequence and map an element of the first sequence corresponding to the index to the bits of the preamble, or
the second mapper is further configured to increase an index of the second sequence based on a modulo counter corresponding to a period of the second sequence and map an element of the second sequence corresponding to the index to the mapped first sequence.

18. The device of claim 17, wherein the first sequence and the second sequence are stored in advance.

19. The device of claim 17, wherein the second mapper is further configured to multiply the mapped first sequence by the second sequence.

20. A transmitter comprising:
a base preamble extractor configured to extract a base preamble pattern based on a preamble format of a preamble;
a preamble sequence generator configured to generate a preamble sequence supported in both a non-coherent receiver and a coherent receiver by repeating the base preamble pattern by a number of repetitions; and
a frame transmitter configured to transmit a transmission frame including a preamble field including the preamble sequence, a start frame delimiter (SFD) field, a physical layer header (PHR) field, and a physical service data unit (PSDU) field to at least one among the non-coherent receiver and the coherent receiver.

21. The transmitter of claim 20, wherein the base preamble extractor is further configured to extract the base preamble pattern and the certain number of repetitions based on a first preamble format P1 or a second preamble format P2 from a pre-stored table.

22. A transmitter comprising:
a base preamble extractor configured to extract a base preamble pattern and a number of repetitions based on a first preamble format P1 or a second preamble format P2 from a pre-stored table;
a preamble sequence generator configured to generate a preamble sequence supported by both a non-coherent receiver and a coherent receiver by repeating the base preamble pattern by the number of repetitions; and
a frame transmitter configured to transmit a transmission frame including a preamble field including the preamble sequence, a start frame delimiter (SFD) field, a physical layer header (PHR) field, and a physical service data unit (PSDU) field to at least one among the non-coherent receiver and the coherent receiver.

* * * * *